US012810185B2

(12) United States Patent
Naveh et al.

(10) Patent No.: US 12,810,185 B2
(45) Date of Patent: Nov. 24, 2026

(54) EFFICIENT HAMILTONIAN EXPONENTIATION IN A QUANTUM CIRCUIT

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Ofek Kirzner, Haifa (IL); Nir Minerbi, Haifa (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 728 days.

(21) Appl. No.: 18/360,079

(22) Filed: Jul. 27, 2023

(65) Prior Publication Data

US 2025/0036989 A1 Jan. 30, 2025

(51) Int. Cl.
*G06N 10/20* (2022.01)

(52) U.S. Cl.
CPC .................................... *G06N 10/20* (2022.01)

(58) Field of Classification Search
CPC ........ G06N 10/20; G06N 10/70; G06N 10/40; G06N 10/00; G06N 10/60; G06N 10/80; G06N 5/01; G06F 8/41; G06F 16/9027
See application file for complete search history.

(56) References Cited

U.S. PATENT DOCUMENTS

2023/0237361 A1* 7/2023 Cowtan .................... G06N 5/01 706/62

OTHER PUBLICATIONS

Furnas et al., "Multitrees: Enriching and Reusing Hierarchical Structure," Human Factors in Computing Sys (1994) (Year: 1994).*
Bravyi et al., "Trading Classical and Quantum Computational Resources," Physical Review X (2016) (Year: 2016).*
Peng et al., "Simulating Large Quantum Circuits on a Small Quantum Computer," arXiv (2020) (Year: 2020).*
Duncan et al., "Graph-Theoretic Simplification of Quantum Circuits with the ZX-calculus," arXiv (2020) (Year: 2020).*
Li et al., "Paulihedral: A Generalized Block-Wise Compiler Optimization Framework For Quantum Simulation Kernels," arXiv (2021) (Year: 2021).*

(Continued)

*Primary Examiner* — Kakali Chaki
*Assistant Examiner* — Kevin L. Smith
(74) *Attorney, Agent, or Firm* — Tutunjian & Bitetto, P.C.

(57) ABSTRACT

A method, apparatus, and computer product comprising: obtaining a multitree data structure that represents a plurality of ordered Pauli-terms, the plurality of ordered Pauli-terms representing an exponentiation module, wherein implementing a Pauli-term in a quantum circuit requires to implement a basis change stage and a parity summation stage, the multitree data structure comprises root nodes representing the plurality of Pauli-terms, leaf nodes representing qubits, and a non-leaf node; converting the multitree data structure to an ordered binary multitree that comprises an additional node; and synthesizing the quantum circuit based on the ordered binary multitree, whereby the quantum circuit comprises an implementation of the parity summation stage and an implementation of the basis change stage, whereby the quantum circuit implements at least one cancellation of a given CX gate of the parity summation stage.

21 Claims, 17 Drawing Sheets

(56) References Cited

OTHER PUBLICATIONS

Ghaderibaneh et al., "Efficient Quantum Network Communication using Optimized Entanglement-Swapping Trees," arXiv (2021) (Year: 2021).*
International Search Report from International Application No. PCT/IL2024/050596 dated Nov. 18, 2024, 11 pgs.
Mozafari Ghoraba, Fereshte. Optimizing Quantum Compilers: Efficient and Effective Algorithms, Thesis No. 9472 2023, EPFL (Swiss Federal Institute of Technology Lausanne), presented Apr. 27, 2023, pp. 1-129.

* cited by examiner

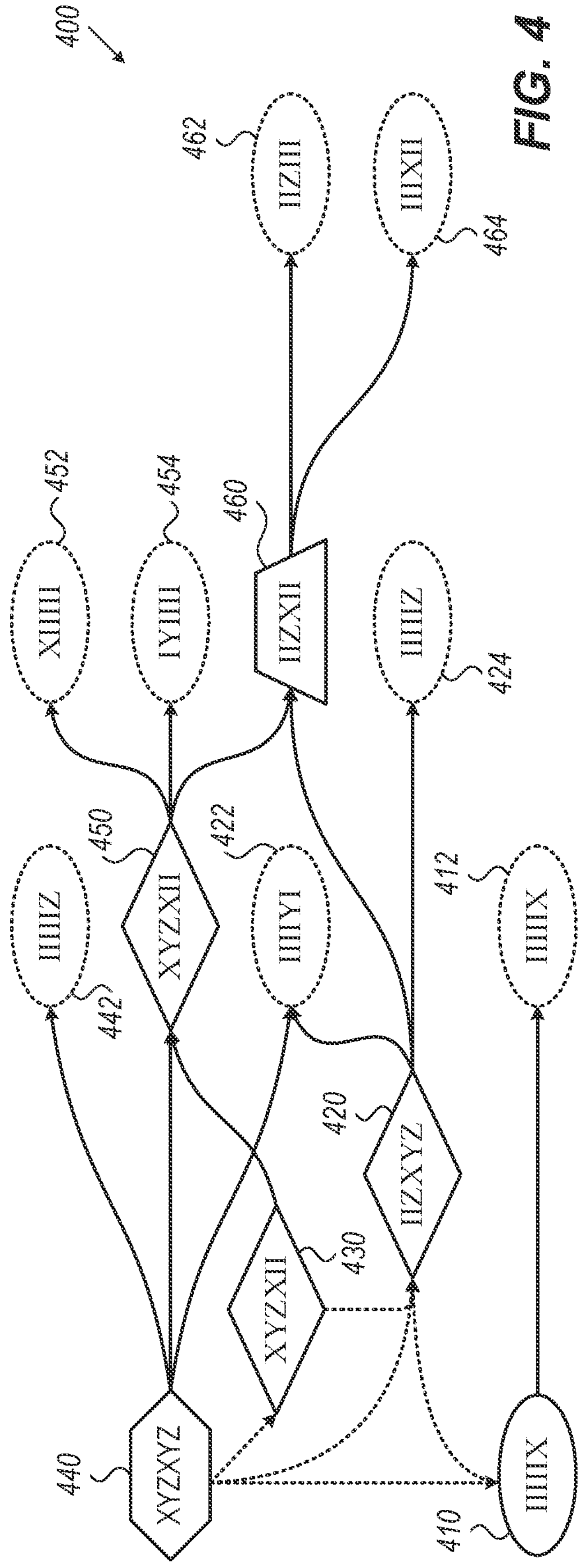
FIG. 4
FIG. 5A
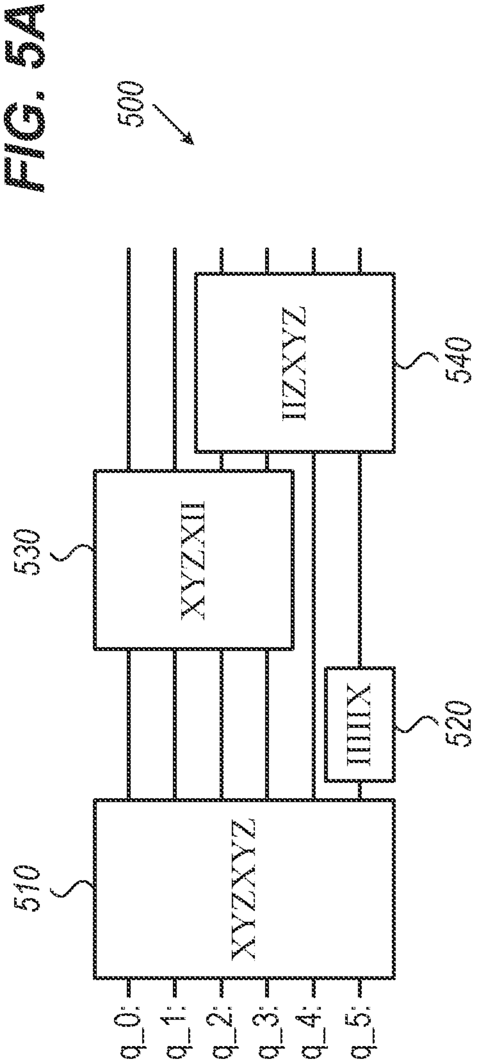

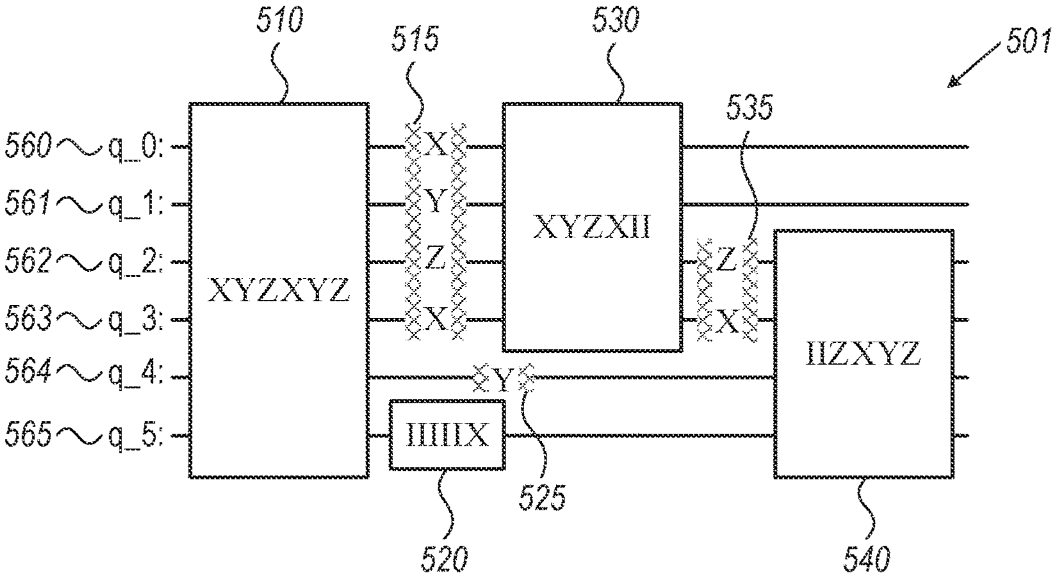
FIG. 5B
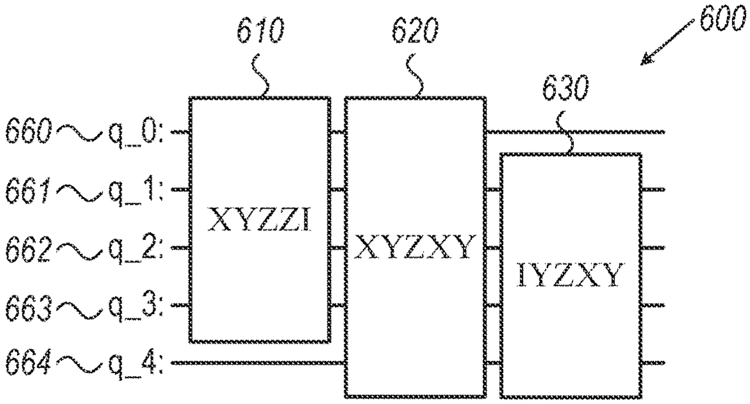
FIG. 6A
FIG. 6B
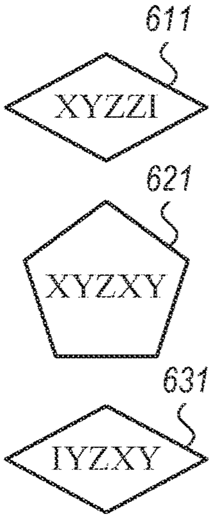

EFFICIENT HAMILTONIAN EXPONENTIATION IN A QUANTUM CIRCUIT

TECHNICAL FIELD

The present disclosure relates to quantum computing in general, and to implementing an exponentiation module in a quantum circuit, in particular.

BACKGROUND

Quantum computing is a computational paradigm that is fundamentally different from classical computing. In contrast to classical computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits.

A qubit is the physical carrier of quantum information, which is referred to as the 'quantum state' of the qubit. Qubits use the quantum mechanical phenomena of superposition to achieve a linear combination of two states. For example, a qubit can represent a state of value zero, a state of value one, or any proportion between the values one and zero in superposition of both states.

In some exemplary embodiments, various applications, programs, or the like, may utilize an exponentiation module, also referred to as a Hamiltonian-simulation module, such as in order to simulate time faster than the actual speed of time in a defined system, simulate a situation of a chemical or physical system for a defined number of time units, or the like.

BRIEF SUMMARY

One exemplary embodiment of the disclosed subject matter is a method comprising: obtaining a multitree data structure that represents a plurality of ordered Pauli-terms, the plurality of ordered Pauli-terms representing an exponentiation module, the plurality of ordered Pauli-terms are associated with a plurality of qubits, a Pauli-term of the plurality of ordered Pauli-terms defines at least one active qubit from the plurality of qubits, wherein implementing the Pauli-term in a quantum circuit requires to implement a basis change stage and a parity summation stage, the parity summation stage utilizing at least one Controlled-X (CX) gate to manipulate the at least one active qubit, wherein the multitree data structure comprises: a plurality of root nodes representing the plurality of Pauli-terms, respectively; a plurality of leaf nodes representing the plurality of qubits, respectively; and a non-leaf node representing a subset of active qubits of a parent node, the parent node is a parent of the non-leaf node, wherein every leaf node that represents an active qubit of a given Pauli-term is a descendant of a root node that represents the given Pauli-term, wherein every non-leaf node of the multitree data structure forms a connected tree that comprises all descendants of the non-leaf node; converting the multitree data structure to an ordered binary multitree, the ordered binary multitree comprising the plurality of leaf nodes, the ordered binary multitree comprising the plurality of root nodes, the ordered binary multitree comprising the non-leaf node, the ordered binary multitree comprising at least one additional node, wherein said converting comprises replacing two sibling nodes with a single parent node and connecting the two sibling nodes as child nodes of the single parent node, wherein the at least one additional node comprises the single parent node, wherein every root node of the ordered binary multitree and its descendants define a respective ordered binary tree, whereby defining a plurality of ordered binary trees; and synthesizing the quantum circuit based on the plurality of ordered binary trees, said synthesizing comprising interpreting an ordered binary tree of the plurality of ordered binary trees as a representation of the quantum circuit, wherein non-leaf nodes of the binary tree represent CX gates of the quantum circuit, wherein leaf nodes of the binary tree represent basis changes of the quantum circuit, wherein edges of the binary tree represent a target or a control of a CX gate, whereby the quantum circuit comprises an implementation of the parity summation stage and an implementation of the basis change stage, whereby the quantum circuit implements at least one cancellation of a given CX gate of the parity summation stage.

Optionally, said synthesizing comprises interpreting the plurality of ordered binary trees as a plurality of respective representations of quantum circuits, and synthesizing the quantum circuit from the plurality of respective representations of the quantum circuits.

Optionally, every node of the multitree data structure complies with an exhaustiveness requirement requiring that no two nodes of the multitree data structure can share more than one child node.

Optionally, every node of the multitree data structure complies with a succinecy requirement requiring that no non-leaf node can have exactly one parent node.

Optionally, every node of the multitree data structure corresponds to a respective node in the ordered binary tree.

Optionally, the at least one cancellation of the given CX gate of the parity summation stage comprises a cancellation of a second CX gate of an inverse parity summation stage, the given CX gate and the second CX gate cancelling each other.

Optionally, said converting the multitree data structure to the ordered binary multitree comprises iteratively adding non-leaf nodes to the ordered binary multitree for every two nodes in the multitree data structure that share more than one child node.

Optionally, the Pauli-term defines the at least one active qubit by defining for the at least one active qubit a respective Pauli operator that is selected from the group consisting of X, Y and Z.

Optionally, a Pauli-term of the plurality of ordered Pauli-terms is defined using a parameter t and at least one Pauli operator that is selected from a group consisting of X, Y and Z.

Optionally, a Pauli-term of the plurality of ordered Pauli-terms is represented by a parameter t and a string that defines for each qubit of the plurality of qubits a Pauli operator selected from the group consisting of X, Y, Z and I, wherein the string defines for at least one qubit a non-/Pauli-operator.

Optionally, said converting and said synthesizing are performed on a classical computer, and the method further comprises executing the quantum circuit on a quantum computer.

Optionally, the plurality of ordered Pauli-terms are ordered according to a defined order.

Another exemplary embodiment of the disclosed subject matter is an apparatus comprising a processor and coupled memory, said processor being adapted to: obtain a multitree data structure that represents a plurality of ordered Pauli-terms, the plurality of ordered Pauli-terms representing an exponentiation module, the plurality of ordered Pauli-terms are associated with a plurality of qubits, a Pauli-term of the plurality of ordered Pauli-terms defines at least one active qubit from the plurality of qubits, wherein implementing the Pauli-term in a quantum circuit requires to implement a basis change stage and a parity summation stage, the parity summation stage utilizing at least one Controlled-X (CX) gate to manipulate the at least one active qubit, wherein the multitree data structure comprises: a plurality of root nodes representing the plurality of Pauli-terms, respectively; a plurality of leaf nodes representing the plurality of qubits, respectively; and a non-leaf node representing a subset of active qubits of a parent node, the parent node is a parent of the non-leaf node, wherein every leaf node that represents an active qubit of a given Pauli-term is a descendant of a root node that represents the given Pauli-term, wherein every non-leaf node of the multitree data structure forms a connected tree that comprises all descendants of the non-leaf node; convert the multitree data structure to an ordered binary multitree, the ordered binary multitree comprising the plurality of leaf nodes, the ordered binary multitree comprising the plurality of root nodes, the ordered binary multitree comprising the non-leaf node, the ordered binary multitree comprising at least one additional node, wherein said converting comprises replacing two sibling nodes with a single parent node and connecting the two sibling nodes as child nodes of the single parent node, wherein the at least one additional node comprises the single parent node, wherein every root node of the ordered binary multitree and its descendants define a respective ordered binary tree, whereby defining a plurality of ordered binary trees; and synthesize the quantum circuit based on the plurality of ordered binary trees, said synthesizing comprising interpreting an ordered binary tree of the plurality of ordered binary trees as a representation of the quantum circuit, wherein non-leaf nodes of the binary tree represent CX gates of the quantum circuit, wherein leaf nodes of the binary tree represent basis changes of the quantum circuit, wherein edges of the binary tree represent a target or a control of a CX gate, whereby the quantum circuit comprises an implementation of the parity summation stage and an implementation of the basis change stage, whereby the quantum circuit implements at least one cancellation of a given CX gate of the parity summation stage.

Yet another exemplary embodiment of the disclosed subject matter is a computer program product comprising a non-transitory computer readable medium retaining program instructions, which program instructions when read by a processor, cause the processor to: obtain a multitree data structure that represents a plurality of ordered Pauli-terms, the plurality of ordered Pauli-terms representing an exponentiation module, the plurality of ordered Pauli-terms are associated with a plurality of qubits, a Pauli-term of the plurality of ordered Pauli-terms defines at least one active qubit from the plurality of qubits, wherein implementing the Pauli-term in a quantum circuit requires to implement a basis change stage and a parity summation stage, the parity summation stage utilizing at least one Controlled-X (CX) gate to manipulate the at least one active qubit, wherein the multitree data structure comprises: a plurality of root nodes representing the plurality of Pauli-terms, respectively; a plurality of leaf nodes representing the plurality of qubits, respectively; and a non-leaf node representing a subset of active qubits of a parent node, the parent node is a parent of the non-leaf node, wherein every leaf node that represents an active qubit of a given Pauli-term is a descendant of a root node that represents the given Pauli-term, wherein every non-leaf node of the multitree data structure forms a connected tree that comprises all descendants of the non-leaf node; convert the multitree data structure to an ordered binary multitree, the ordered binary multitree comprising the plurality of leaf nodes, the ordered binary multitree comprising the plurality of root nodes, the ordered binary multitree comprising the non-leaf node, the ordered binary multitree comprising at least one additional node, wherein said converting comprises replacing two sibling nodes with a single parent node and connecting the two sibling nodes as child nodes of the single parent node, wherein the at least one additional node comprises the single parent node, wherein every root node of the ordered binary multitree and its descendants define a respective ordered binary tree, whereby defining a plurality of ordered binary trees; and synthesize the quantum circuit based on the plurality of ordered binary trees, said synthesizing comprising interpreting an ordered binary tree of the plurality of ordered binary trees as a representation of the quantum circuit, wherein non-leaf nodes of the binary tree represent CX gates of the quantum circuit, wherein leaf nodes of the binary tree represent basis changes of the quantum circuit, wherein edges of the binary tree represent a target or a control of a CX gate, whereby the quantum circuit comprises an implementation of the parity summation stage and an implementation of the basis change stage, whereby the quantum circuit implements at least one cancellation of a given CX gate of the parity summation stage.

One exemplary embodiment of the disclosed subject matter is a method for constructing a multitree data structure, the multitree data structure representing a plurality of Pauli-terms, the method comprising: obtaining the plurality of Pauli-terms, the plurality of Pauli-terms are associated with a plurality of qubits, wherein each Pauli-term of the plurality of Pauli-terms defines at least one active qubit from the plurality of qubits, the plurality of Pauli-terms are ordered according to a defined order; generating an auxiliary graph that represents the plurality of Pauli-terms, the auxiliary graph comprising a plurality of graph nodes that represent the plurality of Pauli-terms, respectively, wherein the plurality of graph nodes are ordered consecutively according to the defined order, wherein an interface between first and second consecutive graph nodes of the plurality of graph nodes represents a set of active qubits, the set of active qubits is active in first and second Pauli-terms from the plurality of Pauli-terms, the first and second Pauli-terms are represented by the first and second consecutive graph nodes, respectively; and generating the multitree data structure based on the auxiliary graph, said generating comprising: generating a plurality of root nodes of the multitree data structure, the plurality of root nodes representing the plurality of Pauli-terms, respectively, the plurality of root nodes comprising first and second root nodes that represent the first and second Pauli-terms, respectively; determining a candidate list that represents a plurality of maximal interfaces between nodes of the auxiliary graph; selecting a widest interface from the candidate list, the widest interface interfacing between the first and second consecutive graph nodes of the auxiliary graph, the widest interface representing a largest number of active qubits compared to any remaining interface in the candidate list; adding a new interface node to the multitree data structure, the new interface node representing the widest interface, the new interface node is configured to be a descendant node of the first and second root nodes; removing the widest interface from the candidate list; iteratively performing said selecting, said adding, and said removing, until the candidate list is empty; in response to a determination that the candidate list is empty, determining for each node of the multitree data structure whether or not all active qubits of the each node are represented by descendant nodes of the each node; and in case an active qubit of the each node is not represented by any of the descendant nodes, adding a leaf node to the multitree data structure, the leaf node representing the active qubit, said adding the leaf node comprises adding the leaf node as a child node of the each node, whereby no two nodes of the multitree data structure share more than one child node, whereby no non-leaf node of the multitree data structure has exactly one parent node, whereby every root node of the multitree data structure is an ancestor of all its active qubits.

Optionally, the method further comprises: in response to a determination that the widest interface shares one or more active qubits with a second interface of the candidate list, and the second interface comprises one or more remaining active qubits that are excluded from the widest interface, splitting the second interface into two candidate interfaces, the two candidate interfaces comprising a first candidate interface that represents the one or more active qubits, and a second candidate interface that represents the one or more remaining active qubits of the second interface, whereby the candidate list is modified to comprise the two candidate interfaces and to exclude the second interface.

Optionally, the method further comprises analyzing the candidate list iteratively, as part of said iteratively performing, to determine whether said splitting should be performed for each interface of the candidate list.

Optionally, in case that the widest interface shares an active qubit with a third interface of the candidate list, and the third interface does not comprise any active qubits that are excluded from the widest interface, retaining the third interface without splitting the third interface into two candidate interfaces, whereby the third interface in the candidate list is not modified.

Optionally, the method further comprises synthesizing, based on the multitree data structure, a quantum circuit that implements an exponentiation module represented by the plurality of Pauli-terms.

Optionally, said generating the multitree data structure is performed by a classical computer, wherein the method further comprises executing the quantum circuit on a quantum computer.

Optionally, a qubit of a Pauli-term of the plurality of Pauli-terms is considered an active qubit of the Pauli-term in case that the qubit is not marked by the Pauli-term as an identity gate.

Optionally, each parent node of the new interface node must represent all active qubits of the widest interface, wherein the new interface node is configured to have a greatest distance from the first root node and from the second root node.

Optionally, said determining for the each node and said adding the leaf node are performed iteratively, from a top of the multitree data structure and downwards.

Optionally, the descendant nodes of the each node comprise at least one non-leaf node.

Optionally, the candidate list is stored in a sorted dictionary that is sorted according to a size parameter, the size parameter associated with a number of active qubits in a respective interface.

Optionally, the auxiliary graph is a Directed Acyclic Graph (DAG).

Optionally, the defined order is stored in a multi-directed graph.

Another exemplary embodiment of the disclosed subject matter is an apparatus comprising a processor and coupled memory, said processor being adapted to perform a method for constructing a multitree data structure, the multitree data structure representing a plurality of Pauli-terms, the method comprising: obtaining the plurality of Pauli-terms, the plurality of Pauli-terms are associated with a plurality of qubits, wherein each Pauli-term of the plurality of Pauli-terms defines at least one active qubit from the plurality of qubits, the plurality of Pauli-terms are ordered according to a defined order; generating an auxiliary graph that represents the plurality of Pauli-terms, the auxiliary graph comprising a plurality of graph nodes that represent the plurality of Pauli-terms, respectively, wherein the plurality of graph nodes are ordered consecutively according to the defined order, wherein an interface between first and second consecutive graph nodes of the plurality of graph nodes represents a set of active qubits, the set of active qubits is active in first and second Pauli-terms from the plurality of Pauli-terms, the first and second Pauli-terms are represented by the first and second consecutive graph nodes, respectively; and generating the multitree data structure based on the auxiliary graph, said generating comprising: generating a plurality of root nodes of the multitree data structure, the plurality of root nodes representing the plurality of Pauli-terms, respectively, the plurality of root nodes comprising first and second root nodes that represent the first and second Pauli-terms, respectively; determining a candidate list that represents a plurality of maximal interfaces between nodes of the auxiliary graph; selecting a widest interface from the candidate list, the widest interface interfacing between the first and second consecutive graph nodes of the auxiliary graph, the widest interface representing a largest number of active qubits compared to any remaining interface in the candidate list; adding a new interface node to the multitree data structure, the new interface node representing the widest interface, the new interface node is configured to be a descendant node of the first and second root nodes; removing the widest interface from the candidate list; iteratively performing said selecting, said adding, and said removing, until the candidate list is empty; in response to a determination that the candidate list is empty, determining for each node of the multitree data structure whether or not all active qubits of the each node are represented by descendant nodes of the each node; and in case an active qubit of the each node is not represented by any of the descendant nodes, adding a leaf node to the multitree data structure, the leaf node representing the active qubit, said adding the leaf node comprises adding the leaf node as a child node of the each node, whereby no two nodes of the multitree data structure share more than one child node, whereby no non-leaf node of the multitree data structure has exactly one parent node, whereby every root node of the multitree data structure is an ancestor of all its active qubits.

Yet another exemplary embodiment of the disclosed subject matter is a computer program product comprising a non-transitory computer readable medium retaining program instructions, which program instructions when read by a processor, cause the processor to perform a method for constructing a multitree data structure, the multitree data structure representing a plurality of Pauli-terms, the method comprising: obtaining the plurality of Pauli-terms, the plurality of Pauli-terms are associated with a plurality of qubits, wherein each Pauli-term of the plurality of Pauli-terms defines at least one active qubit from the plurality of qubits, the plurality of Pauli-terms are ordered according to a defined order; generating an auxiliary graph that represents the plurality of Pauli-terms, the auxiliary graph comprising a plurality of graph nodes that represent the plurality of Pauli-terms, respectively, wherein the plurality of graph nodes are ordered consecutively according to the defined order, wherein an interface between first and second consecutive graph nodes of the plurality of graph nodes represents a set of active qubits, the set of active qubits is active in first and second Pauli-terms from the plurality of Pauli-terms, the first and second Pauli-terms are represented by the first and second consecutive graph nodes, respectively; and generating the multitree data structure based on the auxiliary graph, said generating comprising: generating a plurality of root nodes of the multitree data structure, the plurality of root nodes representing the plurality of Pauli-terms, respectively, the plurality of root nodes comprising first and second root nodes that represent the first and second Pauli-terms, respectively; determining a candidate list that represents a plurality of maximal interfaces between nodes of the auxiliary graph; selecting a widest interface from the candidate list, the widest interface interfacing between the first and second consecutive graph nodes of the auxiliary graph, the widest interface representing a largest number of active qubits compared to any remaining interface in the candidate list; adding a new interface node to the multitree data structure, the new interface node representing the widest interface, the new interface node is configured to be a descendant node of the first and second root nodes; removing the widest interface from the candidate list; iteratively performing said selecting, said adding, and said removing, until the candidate list is empty; in response to a determination that the candidate list is empty, determining for each node of the multitree data structure whether or not all active qubits of the each node are represented by descendant nodes of the each node; and in case an active qubit of the each node is not represented by any of the descendant nodes, adding a leaf node to the multitree data structure, the leaf node representing the active qubit, said adding the leaf node comprises adding the leaf node as a child node of the each node, whereby no two nodes of the multitree data structure share more than one child node, whereby no non-leaf node of the multitree data structure has exactly one parent node, whereby every root node of the multitree data structure is an ancestor of all its active qubits.

One exemplary embodiment of the disclosed subject matter is a method comprising: obtaining a multitree data structure that represents a plurality of Pauli-terms, the plurality of Pauli-terms represent an exponentiation module, wherein the plurality of Pauli-terms are associated with a plurality of qubits, the multitree data structure comprising: a plurality of root nodes representing the plurality of Pauli-terms, respectively; and a plurality of leaf nodes representing the plurality of qubits, respectively, wherein every leaf node that represents a qubit of a Pauli-term is a descendant of a root node that represents the Pauli-term, wherein every non-leaf node of the multitree data structure forms a connected tree that comprises all descendants of the non-leaf node; converting the multitree data structure to an ordered binary multitree, wherein the ordered binary multitree represents a quantum circuit that implements the exponentiation module, the ordered binary multitree comprising the plurality of leaf nodes, the ordered binary multitree comprising the plurality of root nodes, the ordered binary multitree comprising at least one additional node, wherein said converting comprising: inserting representations of the plurality of root nodes of the multitree data structure to a stack in any order, thereby obtaining a stack with candidate nodes; iterating over the candidate nodes to determine whether the candidate nodes have one or more child nodes in the multitree data structure that are not instantiated, wherein a given leaf node is instantiated; upon identifying, during said iterating, a first candidate node that has at least one child node in the multitree data structure that is not instantiated, inserting representations of the at least one child node to the stack; upon determining, during said iterating, that all child nodes of a second candidate node are instantiated, generating an ordered collection of child trees associated with the child nodes, respectively, the ordered collection is ordered according to scores of the child trees; and instantiating the ordered collection of the child trees at least by iteratively performing: in case the child trees comprises a single tree, outputting the single tree; and in case the child trees comprises two or more trees, iteratively performing: selecting a first tree from the child trees, the first tree is ordered first in the ordered collection, the first tree having a largest score compared to remaining trees of the child trees; removing the first tree from the ordered collection; adding the first tree as a first child of a newly generated root node of a new binary tree; selecting one or more second trees from the child trees, the one or more second trees are ordered subsequently to the first tree in the ordered collection, wherein a sum of widths of the one or more second trees is lesser or equal than a width of the first tree; removing the one or more second trees from the ordered collection; generating an auxiliary ordered binary tree from the one or more second trees, the auxiliary ordered binary tree comprising a single ordered binary tree; adding the auxiliary ordered binary tree as a second child of the newly generated root node of the new binary tree; and adding the new binary tree to the ordered collection.

Optionally, the ordered binary multitree comprises a plurality of ordered binary trees, the plurality of ordered binary trees comprising the new binary tree.

Optionally, the ordered binary multitree is maximally imbalanced amongst all trees having a minimum depth.

Optionally, a sorting algorithm is used for ordering the child trees according to the scores.

Optionally, a width of a tree comprises a maximal width of a full binary tree that corresponds to the tree.

Optionally, a score of a tree is based on a maximal depth of paths of the tree.

Optionally, a score of a tree is based on an assigned weight of a leaf node in a path of the tree.

Optionally, said generating the auxiliary ordered binary tree comprises performing said instantiating the ordered collection with respect to the one or more second trees.

Optionally, in case the one or more second trees comprise a single second tree, said generating the auxiliary ordered binary tree comprises providing the single second tree.

Optionally, the method further comprises, upon determining that a third candidate node is instantiated, removing the third candidate node from the stack.

Optionally, said instantiating the ordered collection is performed until the stack is empty.

Optionally, the method further comprises synthesizing the quantum circuit based on the ordered binary multitree, said synthesizing comprising interpreting non-leaf nodes of a binary tree within the ordered binary multitree as CX gates of the quantum circuit, said synthesizing comprising interpreting leaf nodes of the binary tree as basis changes of the quantum circuit, said synthesizing comprising interpreting edges of the binary tree as a target or a control of a CX gate.

Optionally, said interpreting the edges comprises interpreting an edge of the binary tree as the target of the CX gate or as the control of the CX gate based on whether the edge is associated with a first child node or with a second child node.

Optionally, said inserting the representations of the at least one child node to the stack is performed in any order.

Another exemplary embodiment of the disclosed subject matter is a computer program product comprising a non-transitory computer readable medium retaining program instructions, which program instructions when read by a processor, cause the processor to perform steps of: obtaining a multitree data structure that represents a plurality of Pauli-terms, the plurality of Pauli-terms represent an exponentiation module, wherein the plurality of Pauli-terms are associated with a plurality of qubits, the multitree data structure comprising: a plurality of root nodes representing the plurality of Pauli-terms, respectively; and a plurality of leaf nodes representing the plurality of qubits, respectively, wherein every leaf node that represents a qubit of a Pauli-term is a descendant of a root node that represents the Pauli-term, wherein every non-leaf node of the multitree data structure forms a connected tree that comprises all descendants of the non-leaf node; converting the multitree data structure to an ordered binary multitree, wherein the ordered binary multitree represents a quantum circuit that implements the exponentiation module, the ordered binary multitree comprising the plurality of leaf nodes, the ordered binary multitree comprising the plurality of root nodes, the ordered binary multitree comprising at least one additional node, wherein said converting comprising: inserting representations of the plurality of root nodes of the multitree data structure to a stack in any order, thereby obtaining a stack with candidate nodes; iterating over the candidate nodes to determine whether the candidate nodes have one or more child nodes in the multitree data structure that are not instantiated, wherein a given leaf node is instantiated; upon identifying, during said iterating, a first candidate node that has at least one child node in the multitree data structure that is not instantiated, inserting representations of the at least one child node to the stack; upon determining, during said iterating, that all child nodes of a second candidate node are instantiated, generating an ordered collection of child trees associated with the child nodes, respectively, the ordered collection is ordered according to scores of the child trees; and instantiating the ordered collection of the child trees at least by iteratively performing: in case the child trees comprises a single tree, outputting the single tree; and in case the child trees comprises two or more trees, iteratively performing: selecting a first tree from the child trees, the first tree is ordered first in the ordered collection, the first tree having a largest score compared to remaining trees of the child trees; removing the first tree from the ordered collection; adding the first tree as a first child of a newly generated root node of a new binary tree; selecting one or more second trees from the child trees, the one or more second trees are ordered subsequently to the first tree in the ordered collection, wherein a sum of widths of the one or more second trees is lesser or equal than a width of the first tree; removing the one or more second trees from the ordered collection; generating an auxiliary ordered binary tree from the one or more second trees, the auxiliary ordered binary tree comprising a single ordered binary tree; adding the auxiliary ordered binary tree as a second child of the newly generated root node of the new binary tree; and adding the new binary tree to the ordered collection.

Yet another exemplary embodiment of the disclosed subject matter is an apparatus comprising a processor and coupled memory, said processor being adapted to perform steps of: obtaining a multitree data structure that represents a plurality of Pauli-terms, the plurality of Pauli-terms represent an exponentiation module, wherein the plurality of Pauli-terms are associated with a plurality of qubits, the multitree data structure comprising: a plurality of root nodes representing the plurality of Pauli-terms, respectively; and a plurality of leaf nodes representing the plurality of qubits, respectively, wherein every leaf node that represents a qubit of a Pauli-term is a descendant of a root node that represents the Pauli-term, wherein every non-leaf node of the multitree data structure forms a connected tree that comprises all descendants of the non-leaf node; converting the multitree data structure to an ordered binary multitree, wherein the ordered binary multitree represents a quantum circuit that implements the exponentiation module, the ordered binary multitree comprising the plurality of leaf nodes, the ordered binary multitree comprising the plurality of root nodes, the ordered binary multitree comprising at least one additional node, wherein said converting comprising: inserting representations of the plurality of root nodes of the multitree data structure to a stack in any order, thereby obtaining a stack with candidate nodes; iterating over the candidate nodes to determine whether the candidate nodes have one or more child nodes in the multitree data structure that are not instantiated, wherein a given leaf node is instantiated; upon identifying, during said iterating, a first candidate node that has at least one child node in the multitree data structure that is not instantiated, inserting representations of the at least one child node to the stack; upon determining, during said iterating, that all child nodes of a second candidate node are instantiated, generating an ordered collection of child trees associated with the child nodes, respectively, the ordered collection is ordered according to scores of the child trees; and instantiating the ordered collection of the child trees at least by iteratively performing: in case the child trees comprises a single tree, outputting the single tree; and in case the child trees comprises two or more trees, iteratively performing: selecting a first tree from the child trees, the first tree is ordered first in the ordered collection, the first tree having a largest score compared to remaining trees of the child trees; removing the first tree from the ordered collection; adding the first tree as a first child of a newly generated root node of a new binary tree; selecting one or more second trees from the child trees, the one or more second trees are ordered subsequently to the first tree in the ordered collection, wherein a sum of widths of the one or more second trees is lesser or equal than a width of the first tree; removing the one or more second trees from the ordered collection; generating an auxiliary ordered binary tree from the one or more second trees, the auxiliary ordered binary tree comprising a single ordered binary tree; adding the auxiliary ordered binary tree as a second child of the newly generated root node of the new binary tree; and adding the new binary tree to the ordered collection.

One exemplary embodiment of the disclosed subject matter is a method for scheduling a plurality of Pauli-terms, said scheduling comprising selecting an order for the plurality of Pauli-terms, the method comprising: obtaining first and second ordered sets of one or more Pauli-terms of the plurality of Pauli-terms; obtaining first and second multitree data structures for the first and second ordered sets, respectively, the first and second multitree data structures representing the first and second ordered sets, respectively, wherein a given multitree data structure of a set of Pauli-terms comprises: a set of root nodes representing the set of Pauli-terms, respectively; and a plurality of leaf nodes representing a plurality of qubits associated with the set of Pauli-terms, wherein every leaf node that represents a qubit of a Pauli-term is a descendant of a root node that represents the Pauli-term, wherein every non-leaf node of the multitree data structure forms a connected tree that comprises all descendants of the non-leaf node; and determining whether or not the first and second ordered sets should be concatenated by: generating a third multitree data structure that represents all Pauli-terms of the first and second ordered sets; calculating a difference between a resource utilization score of the third multitree data structure and between resource utilization scores of the first and second multitree data structures, wherein a resource utilization score of a multitree data structure is determined based on a number of Controlled-X (CX) gates in the multitree data structure; and based on the difference, determining whether or not the first and second ordered sets should be concatenated.

Optionally, said generating the third multitree data structure is performed from scratch based on the first and second ordered sets.

Optionally, said generating the third multitree data structure comprises utilizing the first multitree data structure as a basis and modifying the first multitree data structure according to the second ordered set.

Optionally, the first multitree data structure is greater in size than the second multitree data structure.

Optionally, the method further comprises calculating the difference by subtracting a sum of the resource utilization scores of the first and second multitree data structures from the resource utilization score of the third multitree data structure.

Optionally, said determining whether or not the first and second ordered sets should be concatenated is performed based on whether or not the difference complies with a threshold.

Optionally, the method further comprises generating a plurality of multitree data structures for the plurality of Pauli-terms, respectively; based on one or more properties of the plurality of multitree data structures, determining a plurality of priority scores for the plurality of multitree data structures, respectively; selecting two candidate multitree data structures from the plurality of multitree data structures based on the plurality of priority scores; and performing said obtaining the first and second ordered sets with the two candidate multitree data structures.

Optionally, said selecting the two candidate multitree data structures comprises selecting matching multitree data structures that have a greatest number of overlapping active qubits as the first and second ordered sets.

Optionally, a priority score of a multitree data structure is determined based on a number of child nodes of each non-leaf node in the multitree data structure.

Optionally, the priority score is calculated as: $\Sigma_{n \in N} 2(\text{child}(n)-1)$, wherein n is a non-leaf node selected from a set of non-leaf nodes, N, and wherein child (n) is the number of child nodes of the non-leaf node n.

Optionally, the method further comprises determining to concatenate the first and second ordered sets, thereby obtaining a concatenated ordered set; modifying the plurality of multitree data structures to exclude the first and second multitree data structures and include the third multitree data structure, thereby obtaining a modified plurality of multitree data structures; and performing said selecting the two candidate multitree data structures from the modified plurality of multitree data structures.

Optionally, the method further comprises iteratively performing said determining whether or not the first and second ordered sets should be concatenated for one or more pairs of Pauli-terms represented by respective pairs of multitree data structures from the two candidate multitree data structures.

Optionally, the one or more pairs are selected based on sizes of the respective pairs of multitree data structures.

Optionally, the resource utilization score of a multitree data structure is determined based on an estimated depth of a quantum circuit that can be synthesized from the multitree data structure.

Another exemplary embodiment of the disclosed subject matter is an apparatus comprising a processor and coupled memory, said processor being adapted to schedule a plurality of Pauli-terms, said scheduling comprising selecting an order for the plurality of Pauli-terms, said processor is adapted to: obtain first and second ordered sets of one or more Pauli-terms of the plurality of Pauli-terms; obtain first and second multitree data structures for the first and second ordered sets, respectively, the first and second multitree data structures representing the first and second ordered sets, respectively, wherein a given multitree data structure of a set of Pauli-terms comprises: a set of root nodes representing the set of Pauli-terms, respectively; and a plurality of leaf nodes representing a plurality of qubits associated with the set of Pauli-terms, wherein every leaf node that represents a qubit of a Pauli-term is a descendant of a root node that represents the Pauli-term, wherein every non-leaf node of the multitree data structure forms a connected tree that comprises all descendants of the non-leaf node; and determine whether or not the first and second ordered sets should be concatenated by: generating a third multitree data structure that represents all Pauli-terms of the first and second ordered sets; calculating a difference between a resource utilization score of the third multitree data structure and between resource utilization scores of the first and second multitree data structures, wherein a resource utilization score of a multitree data structure is determined based on a number of Controlled-X (CX) gates in the multitree data structure; and based on the difference, determining whether or not the first and second ordered sets should be concatenated.

Yet another exemplary embodiment of the disclosed subject matter is an apparatus comprising a processor and coupled memory, said processor being adapted to schedule a plurality of Pauli-terms, said scheduling comprising selecting an order for the plurality of Pauli-terms, said processor is adapted to: obtain first and second ordered sets of one or more Pauli-terms of the plurality of Pauli-terms; obtain first and second multitree data structures for the first and second ordered sets, respectively, the first and second multitree data structures representing the first and second ordered sets, respectively, wherein a given multitree data structure of a set of Pauli-terms comprises: a set of root nodes representing the set of Pauli-terms, respectively; and a plurality of leaf nodes representing a plurality of qubits associated with the set of Pauli-terms, wherein every leaf node that represents a qubit of a Pauli-term is a descendant of a root node that represents the Pauli-term, wherein every non-leaf node of the multitree data structure forms a connected tree that comprises all descendants of the non-leaf node; and determine whether or not the first and second ordered sets should be concatenated by: generating a third multitree data structure that represents all Pauli-terms of the first and second ordered sets; calculating a difference between a resource utilization score of the third multitree data structure and between resource utilization scores of the first and second multitree data structures, wherein a resource utilization score of a multitree data structure is determined based on a number of Controlled-X (CX) gates in the multitree data structure; and based on the difference, determining whether or not the first and second ordered sets should be concatenated.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 depicts an exemplary multitree data structure, in accordance with some exemplary embodiments of the disclosed subject matter;

FIG. 5A depicts an exemplary Directed Acyclic Graph (DAG) for ordered Pauli-terms, in accordance with some exemplary embodiments of the disclosed subject matter;

FIG. 5B depicts exemplary DAG interfaces, in accordance with some exemplary embodiments of the disclosed subject matter;

FIGS. 6A-6I depict an exemplary generation of a multitree data structure, in accordance with some exemplary embodiments of the disclosed subject matter;

DETAILED DESCRIPTION

Figure 1A:
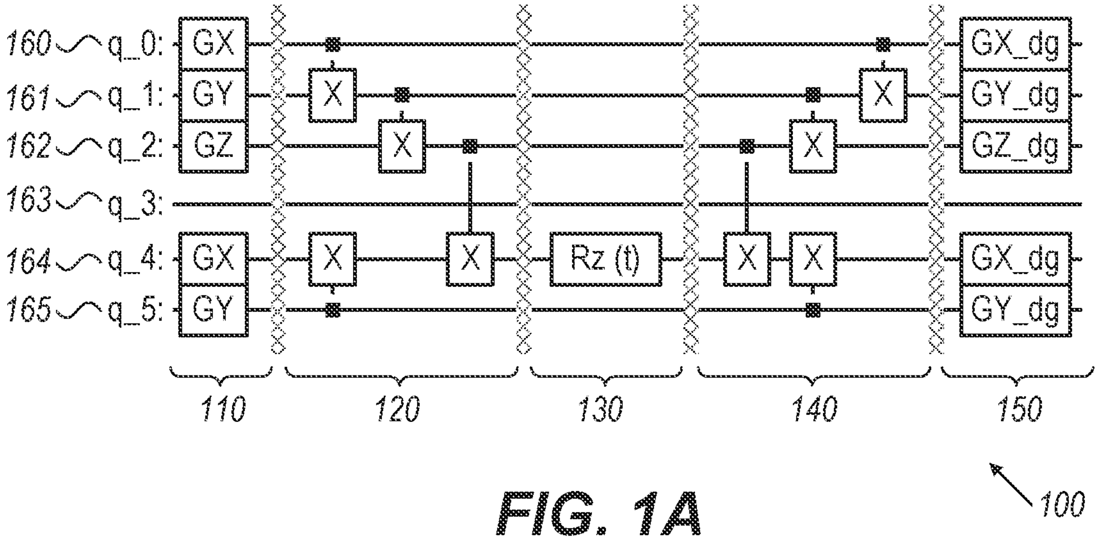
FIGS. 1A-1B depict exemplary implementations of a Pauli-term, in accordance with some exemplary embodiments of the disclosed subject matter.

One technical problem dealt with by the disclosed subject matter is to reduce a number of resources that are used for implementing an exponentiation module in a quantum circuit. It is noted that the "number of resources", as used herein, may refer to one or more weighted or non-weighted combinations of resources. For example, the number of resources that are used by a quantum circuit may refer to a number of cycles in the quantum circuit, a number of quantum gates in the quantum circuit, a number of a defined type of quantum gate in the quantum circuit, or the like. In some cases, it may be desired to generally reduce the number of resources, or to reduce a usage of a specific type of resource, such as the number of Controlled-NOT gates (CX or CNOT) used by the joint quantum circuit.

In some exemplary embodiments, various quantum applications, programs, or the like, may utilize an exponentiation module, also referred to as a Hamiltonian-simulation module, such as in order to simulate time faster than the actual speed of time in a defined system, simulate a situation of a chemical or physical system for a defined number of time units, or the like. For example, the Hamiltonian-simulation module may comprise an exponentiation matrix that may be used to simulate a system's behavior over five hours, during a timeframe that is much shorter than five hours, e.g., a few minutes. The Lie-Trotter-Suzuki formula may enable to dismantle the Hamiltonian-simulation module to respective components of Pauli-terms, e.g., as follows:

$$\text{Hamiltoniam matrix} = \sum_i \text{Pauli term}_i \tag{1}$$

In some exemplary embodiments, in order to implement the exponentiation module, each Pauli-term may be synthesized to a respective quantum circuit, and a joint quantum circuit may be created from the respective quantum circuits. In some exemplary embodiments, there may be an exponential number of possible realizations of each Pauli-term as a quantum circuit. For example, as disclosed in U.S. patent application Ser. No. 17/450,583, titled "Functional-Level Processing Component for Quantum Computers", filed Oct. 12, 2021, which is hereby incorporated by reference in its entirety for all purposes without giving rise to disavowment, a single quantum program may have multiple alternative quantum implementations, all of which properly implement the same quantum program. In some exemplary embodiments, a realization of a Pauli-term may refer to a generated quantum circuit, e.g., a logical representation of a quantum circuit that can be simulated by a classical computer or engine, an executable quantum circuit such as a machine representation of a quantum circuit that can be executed by a quantum hardware compiler, or the like.

In some exemplary embodiments, each dismantled Pauli-term of the Hamiltonian-simulation module may be implemented by a quantum program that comprises compute and uncompute portions, e.g., as part of parity summation and inverse parity summation stages of a quantum circuit, as part of basis change and inverse basis change stages, or the like. In some exemplary embodiments, it may be desired to select realizations of the Pauli-terms in a manner that reduces a size of a resulting quantum circuit, thereby reducing a number of resources used by the resulting joint quantum circuit. For example, it may be desired to select, for each Pauli-term, a quantum implementation that is smallest in size, e.g., including less gates and cycles than other circuits implementing the exponentiation module. As another example, it may be desired to select quantum implementations of the dismantled Pauli-terms, in a manner that increases mutual gate cancellations between compute and uncompute portions of a resulting quantum circuit. In some cases, selecting optimal realizations of the Pauli-terms may be an NP-complete (NPC) problem, and thus may be computationally challenging.

Another technical problem dealt with by the disclosed subject matter is to select an order between the dismantled Pauli-terms of the exponentiation module, in a manner that reduces a number of resources used by a resulting quantum circuit. For example, an optimal implementation may refer to an implementation that results with a shorter quantum circuit (e.g., in terms of cycles), that reduces the usage of gates, or the like.

In some exemplary embodiments, an order by which the Pauli-terms are ordered may affect the resulting joint quantum circuit, resources utilized by the joint quantum circuit, or the like. For example, after selecting a quantum implementation for each Pauli-term, the resulting circuits may be ordered to create a joint circuit. In some exemplary embodiments, there may be an exponential number of possible orderings of the Pauli-terms between themselves, all of which may provide a valid implementation of the exponentiation module.

One technical solution provided by the disclosed subject matter comprises representing the Pauli-terms of the exponentiation module with a designated multitree data structure (referred to herein as the "multitree data structure"). In some exemplary embodiments, the multitree data structure may be designed to hold abstract properties of computation steps and uncomputation steps of a set of Pauli-terms of an exponentiation module. In some exemplary embodiments, the multitree data structure may be designed such that any realization of a quantum circuit that adheres to the multitree data structure will retain a consistent gate count. For example, the multitree data structure may adhere to one or more constraints, which may ensure that the multitree data structure possesses a consistent gate count property. The consistent gate count property may define that all realizations of a Pauli-term that adheres to the multitree data structure may, by construction, have a same gate count. In some cases, the gate count may refer to any quantum gates, to specific quantum gates, e.g., CX gates, or the like. For example, the multitree data structure may retain a consistent CX gate count (also referred to as 'CX-count'), ensuring that all realizations of Pauli-terms that adhere to the multitree data structure will, by construction, have a same CX-count.

In some exemplary embodiments, the Lie-Trotter-Suzuki formula may be utilized for disassembling the exponentiation module to respective Pauli-terms. For example, such operations that utilize the Lie-Trotter-Suzuki formula may be disclosed in K. Gui, Term Grouping and Travelling Salesperson for Digital Quantum Simulation. arXiv: 2001.05983 (January 2020), and in G. Li, Paulihedral: A Generalized Block-Wise Compiler Optimization Framework For Quantum Simulation Kernels. arXiv: 2109.03371 (September 2021), which are hereby incorporated by reference in their entirety for all purposes without giving rise to disavowment.

In some exemplary embodiments, using the Lie-Trotter-Suzuki formula, a plurality of Pauli-terms of the exponentiation module may be obtained. In some exemplary embodiments, each Pauli-term may be represented by a plurality of Pauli operators selected from the set of: "X", "Y", "Z", and "I", and by a single parameter "1". For example, a Pauli-term may be denoted as: {"YZYYYI", t}, or in short, as "YZYYYI". In the disclosed subject matter, every Pauli-term comprises a respective t parameter, even if not mentioned or indicated explicitly. For example, in case the string "YZXYX" is referred to, in the disclosed subject matter, as a Pauli-term, a respective t parameter may be inferred to be included although not mentioned explicitly.

In some exemplary embodiments, each Pauli-term may be associated with a set of one or more qubits. In some exemplary embodiments, a Pauli-term may define, for each associated qubit, a respective Pauli operator and a respective qubit index. In some exemplary embodiments, the term 'qubit', as used herein, may refer to one individual qubit, or to a qubit register (e.g., a group of qubits).

In some exemplary embodiments, the Pauli operators: "X", "Y", "Z" may represent active qubits of a Pauli-term, while the Pauli operator "I" may represent a non-active qubit. For example, the Pauli operator "X" may represent an active qubit that is configured to be manipulated by a basis change operation that is defined for the Pauli operator "X". For example, the basis change operation may comprise applying one or more defined gates on the qubits that are represented by the Pauli operator "X". Different or same basis change operations may be defined for active qubits represented by the Pauli operators: "Y" and "Z".

In some exemplary embodiments, a Pauli-term may define an index of a qubit according to its order in the Pauli-term. For example, the Pauli-term: {"YZYYYT", t}, indicates that a qubit at index '0' undergoes a basis change operation of Pauli operator "Y", that a qubit at index '1' undergoes a basis change operation of Pauli operator "Z", that a qubit at index '2' undergoes a basis change operation of Pauli operator "Y", and so on. In other cases, the index may be initialized with any other number. For example, the first qubit may have an index of '1', the second qubit may have an index of '2', and so on.

In some exemplary embodiments, a single Pauli-term may have multiple alternative implementations. In some exemplary embodiments, although Pauli-terms may be implemented in various manners, all potential implementations may have a same structure. In some exemplary embodiments, an implementation structure of a Pauli-term may comprise five consecutive Pauli-term stages. In some exemplary embodiments, a first stage may comprise a basis change stage, during which quantum states are set on respective qubits, according to a type of Pauli operator that represents each qubit in the respective Pauli-term. In some exemplary embodiments, a second stage may comprise a parity summation stage, during which a parity summation of the active qubits' states may be performed. In some exemplary embodiments, a third stage may comprise a Z-rotation stage, which may apply an exponentiation matrix on an output qubit of the parity summation, e.g., in order to simulate an increased time speed. In some exemplary embodiments, a fourth stage may an inverse parity summation, which may comprise an inverse of the second stage, e.g., the parity summation stage. In some exemplary embodiments, a fifth stage may comprise an inverse basis change which may comprise an inverse of the first stage, e.g., the basis change stage.

In some cases, the parity summation stage of a single Pauli-term may have multiple alternative implementations, all of which may be valid, proper implementations of the Pauli-term. For example, FIGS. 1A-1B depict two different alternative implementations of the same Pauli-term: {"XYZIXY", 1}.

Figure 1B:
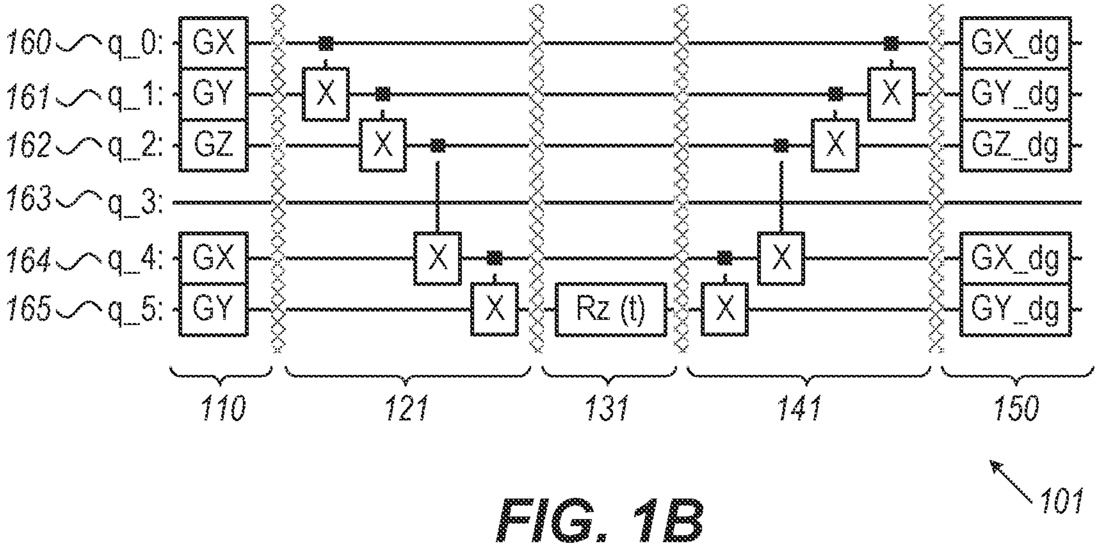

Referring now to FIGS. 1A-1B, showing exemplary implementations of a Pauli-term, in accordance with some exemplary embodiments of the disclosed subject matter.

In some exemplary embodiments, the Pauli-term {"XYZIXY", t} may represent six qubits: Qubits 160-165. In some cases, the Pauli-term may indicate that a first qubit represented thereby, Qubit 160 (denoted q_0), is active, has an index of zero, and has a basis change operation of type "X". Similarly, the Pauli-term may indicate that a second qubit represented thereby, Qubit 161 (denoted q_1), is active, has an index of one, and has a basis change operation of type "Y". The Pauli-term may indicate that a third qubit represented thereby, Qubit 162 (denoted q_2), is active, has an index of two, and has a basis change operation of type "Z". The Pauli-term may indicate that a fourth qubit represented thereby, Qubit 163 (denoted q_3), is not active, has an index of three, and has a basis change operation of type "I". For example, the Pauli operator "I" may represent an identity gate, and associated qubits may not be active. The Pauli-term may indicate that a fifth qubit represented thereby, Qubit 164 (denoted q_4), is active, has an index of four, and has a basis change operation of type "X". The Pauli-term may indicate that a sixth qubit represented thereby, Qubit 165 (denoted q_5), is active, has an index of five, and has a basis change operation of type "Y".

In some exemplary embodiments, as depicted in FIG. 1A, the Pauli-term {"XYZIXY", 1} may be implemented by Quantum Implementation 100. In some exemplary embodiments, Quantum Implementation 100 includes a first stage, e.g., Basis Change Stage 110, during which the active qubits of the Pauli-term, including Qubits 160, 161, 162, 164, and 165, are set with respective quantum states, according to their type of Pauli operator. In some exemplary embodiments, quantum states may include various types of states such as maximally-mixed states, maximally-entangled states, highly-entangled states, e.g., as disclosed in U.S patent application Ser. No. 17/752,282, tiled "Auxiliary Qubit Verification In Quantum Circuits", filed May 24, 2022, which is hereby incorporated by reference in its entirety without giving rise to disavowment.

In some cases, a first set of one or more gates may be applied in active qubits with a basis change of type "X", a second set of one or more gates may be applied in active qubits with a basis change of type "Y", and a third set of one or more gates may be applied in active qubits with a basis change of type "Z". In some cases, the first, second and third sets of gates may set different quantum states on the respective qubits. In other cases, same quantum states may be set to more than one type of Pauli operator, e.g., on qubits with a basis change of types "X" and "Y".

Figure 2:
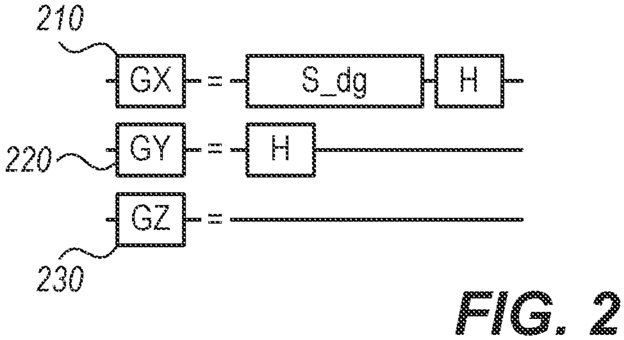
FIG. 2 depicts exemplary basis changes, in accordance with some exemplary embodiments of the disclosed subject matter.

For example, the basis changes of the Pauli operators may be set according to the configuration of FIG. 2, or according to any other configuration. Referring now to FIG. 2, depicting exemplary basis changes of Pauli operators, in accordance with some exemplary embodiments of the disclosed subject matter. As depicted in FIG. 2, Pauli Operator 210 represents a basis change associated with the Pauli operator "Y", and comprises two gates, denoted Clifford gate "S_dg" and denoted Hadamard Gate "H". For example, during a basis change stage, any qubit represented by the Pauli operator "Y", may be manipulated by the Clifford gate and the Hadamard Gate. In some exemplary embodiments, Pauli Operator 220 represents a basis change associated with the Pauli operator "X", and comprises a single Hadamard Gate. For example, during a basis change stage, any qubit represented by the Pauli operator "X", may be manipulated by the Hadamard Gate. In some exemplary embodiments, Pauli Operator 230 represents a basis change associated with the Pauli operator "Z", and is blank, empty, or the like. According to this example, during a basis change stage, any qubit represented by the Pauli operator "Z" may not be manipulated by any gate. In other cases, the basis change configurations of the Pauli Operators "Y", "X", and "Z" may comprise any other gate implementations.

Referring back to FIG. 1A, qubits that are not active, such as Qubit 163 that is represented by the Pauli operator "I", may be excluded from the Basis Change Stage 110.

In some exemplary embodiments, Quantum Implementation 100 may comprise a second stage, e.g., Parity Summation Stage 120, during which a sum of the parities of the active qubits is calculated, determined, or the like, and stored in a designated qubit, e.g., Qubit 164. In some cases, all the gates used by Parity Summation Stage 120 may comprise CX gates. As depicted in FIG. 1A, the parity summation is calculated by first summing the states of Qubits 160 and 161 into Qubit 161, and summing the states of Qubits 164 and 165 into Qubit 164. In some cases, in a subsequent portion of Parity Summation Stage 120, the states of Qubits 161 and 162 are summed into Qubit 162. In some cases, in a subsequent portion of Parity Summation Stage 120, the states of Qubits 162 and 164 are summed into Qubit 164. In such cases, the state of Qubit 164 holds the parity summation of all the active qubits. In some exemplary embodiments, similarly to the Basis Change Stage 110, qubits that are not active, such as Qubit 163, may not participate in the Parity Summation Stage 120 and their states may not be summed and held by an output qubit such as Qubit 164.

In some exemplary embodiments, Quantum Implementation 100 includes a third stage, e.g., Z-Rotation Stage 130, which may apply an exponentiation matrix on Qubit 164. In some exemplary embodiments, after Z-Rotation Stage 130, one or more inverse stages may be performed. For example, Quantum Implementation 100 may comprise a fourth stage, e.g., Inverse Parity Summation 140, during which Parity Summation Stage 120 may be inversed on the active qubits. In some exemplary embodiments, Quantum Implementation 100 may comprise a fifth stage, e.g., Inverse Basis Change 150, during which Basis Change Stage 110 may be inversed on the active qubits.

In some exemplary embodiments, as depicted in FIG. 1B, the Pauli-term ("XYZIXY", t) may be implemented by a different, alternative quantum implementation, e.g., Quantum Implementation 101. In some exemplary embodiments, Quantum Implementation 101 may have the same basis change phases as Quantum Implementation 100, e.g., Basis Change Stage 110 and Inverse Basis Change 150. In some exemplary embodiments, Quantum Implementation 101 may have different parity summation stages than Quantum Implementation 100, which may or may not affect the Z-rotation stage.

As depicted in FIG. 1B, Parity Summation Stage 121 may comprise summing Qubits 160 and 161 into Qubit 161. In some cases, in a subsequent portion of Parity Summation Stage 121, the states of Qubits 161 and 162 are summed into Qubit 162. In some cases, in a subsequent portion of Parity Summation Stage 121, the states of Qubits 162 and 164 are summed into Qubit 164. In a subsequent portion of Parity Summation Stage 121, the states of Qubits 164 and 165 are summed into Qubit 165. In such cases, the state of Qubit 165 holds the parity summation of all the active qubits. In some exemplary embodiments, similarly to Parity Summation Stage 120, Qubit 163 may not participate in the Parity Summation Stage 121 and its state may not be summed and held by Qubit 165.

In some exemplary embodiments, each inverse parity summation stage may correspond to its respective parity summation stage, and thus the inverse of Parity Summation Stage 121. Inverse Parity Summation 141, may differ from the inverse of Parity Summation Stage 120, Inverse Parity Summation 140.

In some cases, the different implementations of Parity Summation Stage 121 may or may not affect the implementation of the Z-rotation stage. In some exemplary embodiments, the Z-rotation stage may be applied on an output qubit of a parity summation stage, which holds the parity summation value, and therefore may be applied on different qubits for different parity summation stages. For example, in case two different implementations of the parity summation stage result with a same qubit that holds the parity summation value, the Z-rotation stage in both Pauli-term implementations may be identical. As another example, as depicted in FIGS. 1A-1B, the Z-rotation stage may be applied on different qubits in case different qubits (having a different index) hold the parity summation value. As depicted in Parity Summation Stage 120, Qubit 164 holds the parity summation value of Parity Summation Stage 120, causing Z-Rotation Stage 130 to be applied on Qubit 164. As depicted in Parity Summation Stage 121, Qubit 165 holds the parity summation value of Parity Summation Stage 121, causing Z-Rotation Stage 131 to be applied on Qubit 165.

In some exemplary embodiments, although the parity summation stages of Quantum Implementations 100 and 101 are different from each other, they may both comprise valid implementations of a same Pauli-term, e.g., their outcome quantum state may be identical. In some exemplary embodiments, implementations of a single Pauli-term, e.g., Quantum Implementations 100 and 101, may all have a same gate count.

Figure 3A:
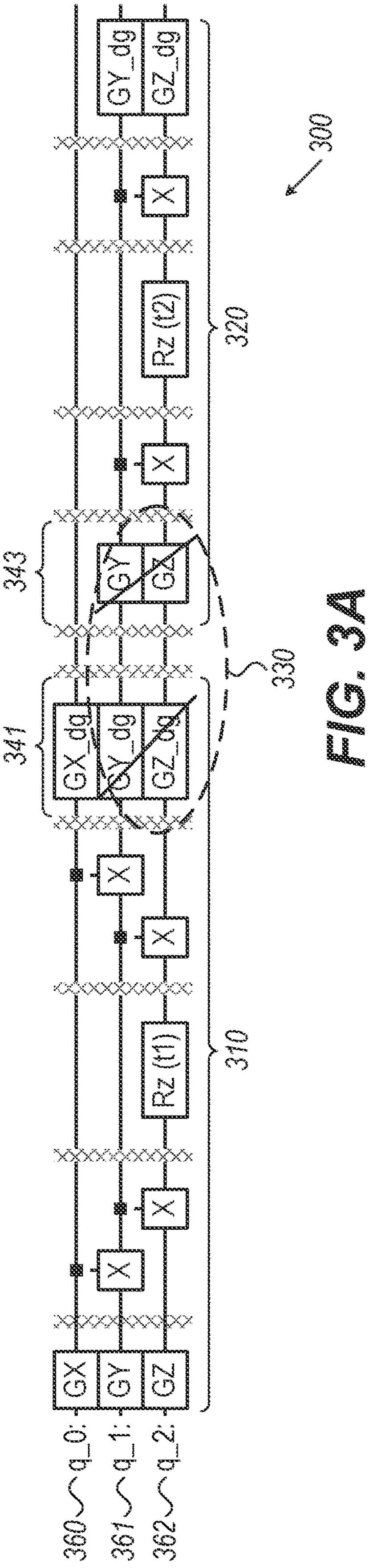
FIGS. 3A-3D depict exemplary implementations of Pauli-terms, in accordance with some exemplary embodiments of the disclosed subject matter.

In some exemplary embodiments, when combining multiple Pauli-term implementations to form a joint quantum circuit, the resulting gate count may be varied. In some exemplary embodiments, a selection of an implementation of each Pauli-term may affect a resource utilization of the joint quantum circuit, e.g., as depicted in FIGS. 3A-3D. For example, one or more mutual cancellation may be enabled to be performed for certain selections of Pauli-term implementations. In some cases, different ordering of Pauli-terms may cause portions of the basis change stage to become redundant in certain scenarios, thus resulting with mutual cancellations within the basis change stages, e.g., as depicted in FIG. 3A. In some cases, different selections of Pauli-term implementations may result with mutual gate cancellations within the parity summation stages, e.g., as depicted in FIG. 3C, thereby reducing the CX-count of the circuit.

Referring now to FIGS. 3A-3D, depicting exemplary implementations of Pauli-terms, in accordance with some exemplary embodiments of the disclosed subject matter.

Quantum Circuit 300, depicted in FIG. 3A, may comprise a joint quantum circuit that implements two Pauli-terms: the Pauli-terms {"XYZ", 't1'} and {"IYZ", 't2'}. In some exemplary embodiments, Quantum Circuit 300 comprises Sub-Circuits 310 and 320, each of which associated to a respective Pauli-term. For example, Sub-Circuit 310 may comprise an implementation of the Pauli-term {"XYZ", 't1'}, while Sub-Circuit 320 may comprise an implementation of the Pauli-term {"IYZ", 't2'}. In some exemplary embodiments, each of Sub-Circuits 310 and 320 may implement all five Pauli-term stages.

In some exemplary embodiments, the parity summation stage of Sub-Circuit 310 may be configured to sum the states of Qubits 360 and 361 into Qubit 361, and then to sum the states of Qubits 361 and 362 into Qubit 362. The parity summation stage of Sub-Circuit 320 may be configured to sum the states of Qubits 361 and 362 into Qubit 362.

In some exemplary embodiments, one or more portions of the basis change stages of Sub-Circuits 310 and 320 may mutually cancel out. In some cases, Portion 330 may comprise portions that cancel out one another. For example, Quantum Circuit 300 may comprise a First Portion 341 applying an inverse basis changes "X", "Y" and "Z" on Qubits 360-362, and a Second Portion 343 applying basis changes "Y" and "Z" on Qubits 361-362. According to this example, the inverse basis changes "Y" and "Z" on Qubits 361-362 may cancel out with the basis changes "Y" and "Z" on Qubits 361-362, causing Portion 330 to be redundant. According to this example, Portion 330 may be removed from Quantum Circuit 300, resulting with Quantum Circuit 301.

Figure 3B:
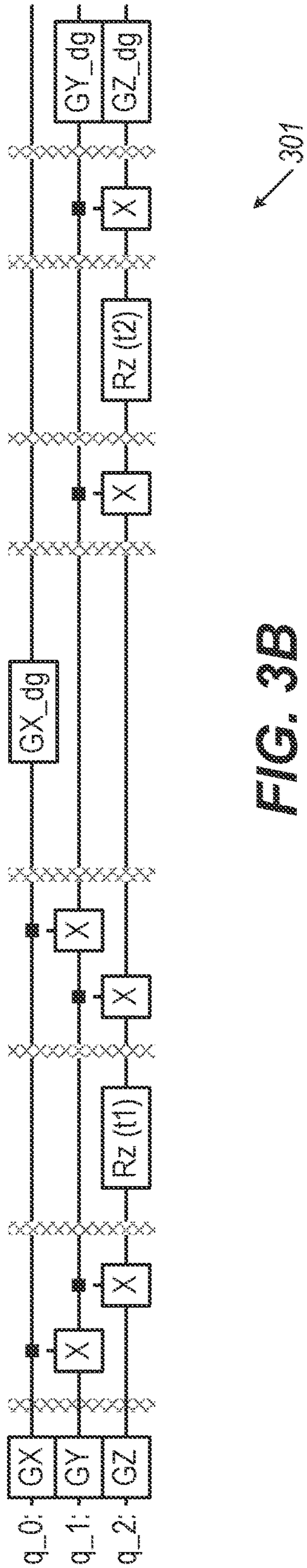
Figure 3C:
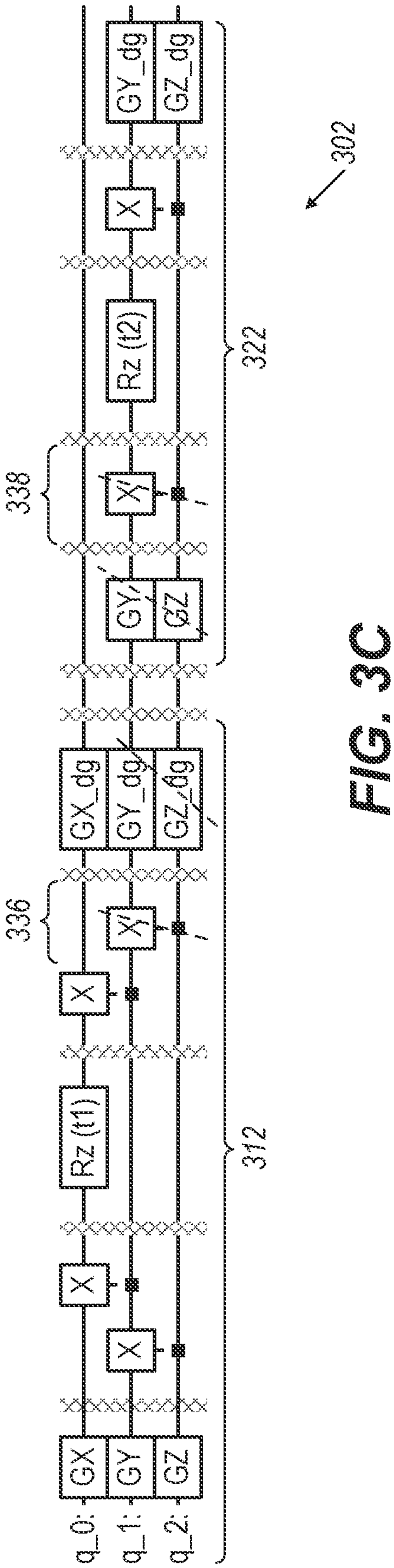
Figure 3D:
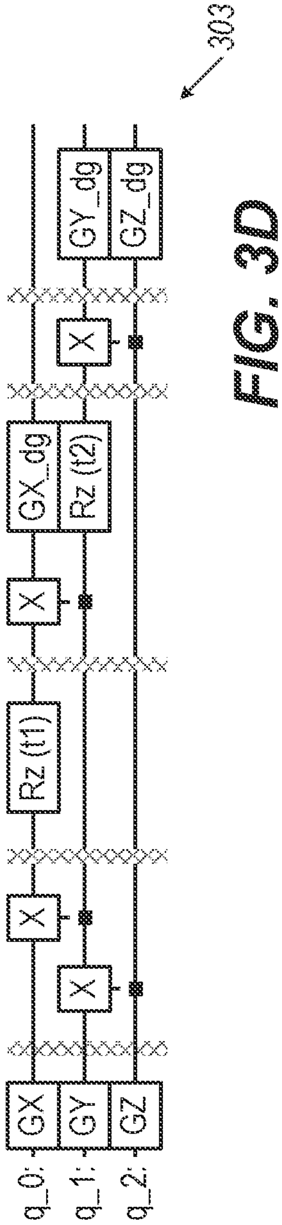

As depicted in FIG. 3B, Quantum Circuit 301 may correspond to Quantum Circuit 300, after removing Portion 330 from Quantum Circuit 300. In some exemplary embodiments, removing Portion 330 may reduce resources used by the circuit. For example, resources used by Portion 330, such as gates, cycles, or the like, may be conserved in Quantum Circuit 301, which does not comprise Portion 330. In some exemplary embodiments, the resource saving in Quantum Circuit 301 may result from the order between the Pauli-terms {"XYZ", 't1'} and {"IYZ", 't2'}.

In some cases, it may be desired to reduce resources that are used by parity summation stages, in addition or instead of reducing resources that are used for the basis change stages. In some cases, selections of certain implementations of the Pauli-terms {"XYZ", 't1'} and {"IYZ", 't2'} may result with greater resource savings than others, thereby yielding a shorter circuit with a lower gate-count. In some cases, a selection of certain implementations of the Pauli-terms may result with portions of the parity summation stages mutually cancelling out.

For example, in FIG. 3C, Quantum Circuit 302 implements the same Pauli-terms {"XYZ", 't1'} and {"IYZ", 't2'}, using different implementations of the parity summation stages than the implementations used by Quantum Circuit 300 and Quantum Circuit 301. For example, Quantum Circuit 302 may utilize an implementation that is selected according to the disclosed subject matter, e.g., according to the methods of FIGS. 11-12.

Quantum Circuit 302 may comprise Sub-Circuits 312 and 322, which implement the respective Pauli-terms. In the depicted scenario, the parity summation stage of Sub-Circuit 312 is configured to sum the states of Qubits 361 and 362 into Qubit 361, and then to sum the states of Qubits 360 and 361 into Qubit 360 (e.g., in contrast to FIGS. 3A and 3B, where the states of Qubits 360 and 361 are summed in Qubit 361, and then the states of Qubit 361 and 362 are summed into Qubit 362). In the depicted scenario, the parity summation stage of Sub-Circuit 322 is configured to sum the states of Qubits 361 and 362 into Qubit 361.

In some exemplary embodiments, when implementing both Pauli-terms in a single quantum circuit, changing the implementations of the parity summation stages may result with an enhanced quantum circuit, e.g., Quantum Circuit 302, in which portions of the parity summation stages may cancel out. For example, during a first phase, the inverse basis changes "Y" and "Z" on Qubits 361-362 may cancel out with the basis changes "Y" and "Z" on Qubits 361-362, enabling to remove both portions. According to this example, after the inverse basis changes and the respective basis changes on Qubits 361-362 are removed, similarly to the cancellation of Portion 330, a further gate cancellation may be provided. For example, Portions 336 and 338 may become adjacent to each other, due to the previous cancellation, enabling a mutual cancellation of Portions 336 and 338. According to this example, Portion 336 may apply a CX gate on Qubits 361 and 362, and Portion 338 may comprise an inverse of Portion 336, thus mutually cancelling out each other, and resulting with Quantum Circuit 303 depicted in FIG. 3D.

In some exemplary embodiments, Quantum Circuit 303 may be enhanced compared to Quantum Circuit 301, at least since it may utilize less resources than Quantum Circuit 301, e.g., CX gate resources. For example, removing Portions 336 and 338 enabled to remove two CX gates, which are retained in Quantum Circuit 301.

In some exemplary embodiments, in the disclosed subject matter, a 'tree' may refer to a directed tree, and an 'interior node' or a 'non-leaf node' may refer to any node that is not a leaf node (e.g., root or non-root nodes). In some exemplary embodiments, an 'ancestor' may refer to a node reachable by repeated proceeding from child to parent, while a 'descendant' may refer to a node reachable by repeated proceeding from parent to child. In some exemplary embodiments, a 'multitree' may refer to a Directed Acyclic Graph (DAG) in which there is at most one directed path between any two vertices. Put differently, a multitree may describe a DAG in which the subgraph that is reachable from any vertex induces an undirected tree. In some exemplary embodiments, in a multitree, nodes may be enabled to have multiple parent nodes.

In some exemplary embodiments, in order to provide a selection of efficient implementations for the parity summation stages of a plurality of Pauli-terms, such as the implementations of Quantum Circuit 302 which result with a quantum circuit that utilizes a reduced number of resources, a designated multitree data structure may be defined and utilized. In some exemplary embodiments, the multitree data structure may represent one or more efficient implementations of any given ordered set of a plurality of Pauli-terms. In some exemplary embodiments, each Pauli-term of the plurality of Pauli-terms may be represented by a root node of the multitree data structure, and each active qubit of each Pauli-term may be represented by a leaf node of the multitree.

In some exemplary embodiments, the multitree data structure may comprise a multitree, as defined above, with additional constraints, definitions, or the like. In some exemplary embodiments, the additional constraints may define that every leaf node that represents an active qubit of a given Pauli-term must be a descendant of a root node that represents the given Pauli-term, e.g., a first constraint. In some exemplary embodiments, additional constraints may define that every non-leaf node of the multitree data structure must form a connected tree that comprises all descendants of the non-leaf node, e.g., a second constraint. For example, every node of the multitree data structure may define a tree in which the node is the root node of the tree, and all its descendant are within the tree. In some exemplary embodiments, the additional constraints may require each Pauli-term of the plurality of Pauli-terms to have one or more active qubits, which are not represented by the Pauli operator "I".

In some cases, a 'full subtree' of a non-leaf node of the multitree data structure may refer to the non-leaf node and a tree formed thereby. For example, the tree may comprise the non-leaf node as the root node and all of the descendants of the non-leaf node, which may be connected to the non-leaf node in accordance with the second constraint. In some exemplary embodiments, when complying with the second constraint, there may not be a descendent of the non-leaf node that is not included in the tree formed by the non-leaf node. In some exemplary embodiments, every node of the multitree data structure may form a respective full subtree, by interpreting the node as a root of a respective full subtree.

In some exemplary embodiments, the additional constraints may be applied on the multitree data structure in order to retain the consistent gate count property, ensuring that any implementation of a Pauli-term that adheres to the multitree data structure will, by construction, have a same gate count, a same CX count, or the like. In some exemplary embodiments, the multitree data structure may be designed, by the additional constraints, to uphold the consistent gate property.

In some exemplary embodiments, although applying the additional constraints on the multitree data structure may enable to retain the consistent gate count property, one or more advantageous requirements may be applied on the multitree data structure in order to reduce a gate count of a resulting quantum circuit. For example, the advantageous requirements may comprise an exhaustiveness requirement, requiring that no two nodes of the multitree data structure may share more than one child node. As another example, the advantageous requirements may comprise a succinecy requirement, indicating that no internal node (e.g., a non-leaf node that is not a root node) may have exactly one parent node.

In some exemplary embodiments, a multitree that complies with the additional constraints and the advantageous requirements may be referred to herein as a 'compliant multitree data structure'. In some exemplary embodiments, every multitree data structure that does not comply with the additional constraints, definitions, or the like, described above, may be transformable to a compliant multitree data structure, e.g., after creating the multitree data structure, during its creation process, or the like. For example, a tree may be transformed to a compliant multitree data structure by iteratively adding an internal node for every two nodes that share more than one child node, and adding the two nodes as child nodes of the internal node (e.g., to comply with the exhaustiveness requirement). As another example, a tree may be transformed to a compliant multitree data structure by removing non-leaf nodes that have single child nodes (e.g., to comply with the succinecy requirement).

In some exemplary embodiments, the compliant multitree data structure may be utilized for implementing the Pauli-terms in a quantum circuit. In some exemplary embodiments, the multitree data structure may be defined to comprise a plurality of root nodes representing the plurality of Pauli-terms, respectively, and a plurality of leaf nodes representing active qubits of each Pauli-term. In some exemplary embodiments, realizations of the plurality of Pauli-terms may be obtained by transforming the multitree data structure to an ordered binary multitree, and synthesizing one or more quantum circuits according to the ordered binary multitree.

Referring now to FIG. 4, showing an exemplary multitree data structure, in accordance with some exemplary embodiments of the disclosed subject matter.

In some exemplary embodiments, Multitree Data Structure 400 may be defined for the ordered Pauli-terms, "XYZXYZ", "IIIIIX", "XYZXII", "IIZXYZ", respectively, each of which comprising a respective t parameter (not depicted). In some exemplary embodiments, Multitree Data Structure 400 may comprise Root Nodes 410, 420, 430, and 440, each of which corresponding to a respective Pauli-term. In some exemplary embodiments, Multitree Data Structure 400 may comprise Leaf Nodes 412, 422, 424, 442, 452, 454, 462, and 464, each of which corresponding to an active qubit of one or more of the ordered Pauli-terms. In some exemplary embodiments, every leaf node may represent a basis change of the respective active qubit, which may correspond to one of the Pauli operators: "Y", "X", and "Z". In some exemplary embodiments, non-leaf nodes of Multitree Data Structure 400, such as Internal Nodes 450 and 460, may not constitute leaf nodes nor root nodes. In some exemplary embodiments, the non-leaf nodes may represent a set of one or more active qubits, which may not constitute a Pauli-term, as it may lack the "t" parameter. In some exemplary embodiments, the dashed edges between Root Nodes 410, 420, 430, and 440 are shown for illustrative purposes only, although they are not part of Multitree Data Structure 400, and illustrate a defined order between the Pauli-terms.

In some exemplary embodiments, every node of Multitree Data Structure 400 may define a respective full subtree. For example, Node 450 may form a full subtree that comprises all of its descendants, e.g., all nodes that comprise an active qubit of type X at index zero, all nodes that comprise an active qubit of type Y at index one, all nodes that comprise an active qubit of type Z at index two, and so on. In some exemplary embodiments, Multitree Data Structure 400 may comply with the exhaustiveness requirement, at least since Multitree Data Structure 400 may not comprise two nodes that share more than one child node. In some exemplary embodiments, Multitree Data Structure 400 may comply with the succinecy requirement, at least since Multitree Data Structure 400 may not comprise a non-leaf node (such as Nodes 450 and 460) with exactly one parent node.

In some exemplary embodiments, a quantum circuit that is synthesized according to Multitree Data Structure 400, may comprise a quantum gate for each root node of Multitree Data Structure 400, but not for non-leaf nodes or leaf nodes of Multitree Data Structure 400. In some exemplary embodiments, in order to create Multitree Data Structure 400, one or more auxiliary graphs, data structures, or the like, may or may not be used. For example, the auxiliary graph of FIG. 5A may be used as a support tool for the creation of Multitree Data Structure 400.

Referring now to FIG. 5A, showing an exemplary DAG for ordered Pauli-terms, in accordance with some exemplary embodiments of the disclosed subject matter.

In some exemplary embodiments, FIG. 5A depicts an exemplary auxiliary graph that comprises a DAG, e.g., DAG 500. In some exemplary embodiments, DAG 500 may represent the same ordered Pauli-terms of FIG. 4, "XYZXYZ", "IIIIIX", "XYZXII", "IIZXYZ". In some exemplary embodiments, once ordered in a defined order, a DAG such as DAG 500 may be formed.

In some exemplary embodiments, DAG 500 may represent a quantum circuit of the ordered Pauli-terms, in which each Pauli-term is considered a high-level function acting on its qubits. In some exemplary embodiments, each vertex, or node, of DAG 500 may represent a respective ordered Pauli-term. In some exemplary embodiments, the positions of the nodes may be ordered according to their defined order. For example, a first node at a leftmost position, Node 510, may represent the firstly ordered Pauli-term "XYZXYZ", a consecutive node, e.g., Node 520, may represent the subsequent Pauli-term "IIIIIX", a consecutive node, e.g., Node 530, may represent the subsequent Pauli-term "XYZXII", and a consecutive node, e.g., Node 540, may represent the subsequent Pauli-term "IIZXYZ".

In some exemplary embodiments, DAG 500 may be used for constructing a multitree data structure. For example, DAG 500 may be used for constructing a multitree data structure such as Multitree Data Structure 400 of FIG. 4. In other cases, a multitree data structure may be constructed based on any other auxiliary data structure, or directly, e.g., without utilizing DAG 500. In some exemplary embodiments, DAG 500 of FIG. 5A may be utilized to determine which leaf nodes in Multitree Data Structure 400 of FIG. 4 can cancel out each other. In some exemplary embodiments, in case two leaf nodes correspond to basis change gates that cancel out each other, they may be replaced by a single leaf node. For example, Nodes 442 and 424 of FIG. 4 may both represent a same qubit: an active qubit of index five that undergoes a basis change of the Pauli operator "Z". In some exemplary embodiments, the active qubit represented by Nodes 442 and 424 of FIG. 4 may be represented by separate leaf nodes and not by a single leaf node, at least since, as depicted in DAG 500 of FIG. 5A, Node 520 separates Nodes 510 and 540, which are both applied on the active qubit of index five. According to this example, since Node 520 separates Nodes 510 and 540, Nodes 510 and 540 cannot cancel out each other, and separate leaf nodes are maintained for the same qubit.

In some exemplary embodiments, in order to synthesize a quantum circuit according to Multitree Data Structure 500, Multitree Data Structure 500 may be converted to an ordered binary multitree, and the quantum circuit may be synthesized according to ordered binary trees therefrom.

Another technical solution provided by the disclosed subject matter comprises enabling to convert any set of a plurality of ordered Pauli-terms into a multitree data structure that complies with associated constraints, requirements, or the like, and has the desired properties of a consistent gate count and a maximization of gate cancellations. For example, the disclosed subject matter provides one or more algorithms that enable to convert any set of Pauli-terms into a compliant multitree data structure that complies with the exhaustiveness requirement, the succinecy requirement, the additional requirements, or the like. The compliant multitree data structure may be used to create a respective quantum circuit with a reduced a number of gates, a reduced a number of CX gates, or the like.

Figure 11:
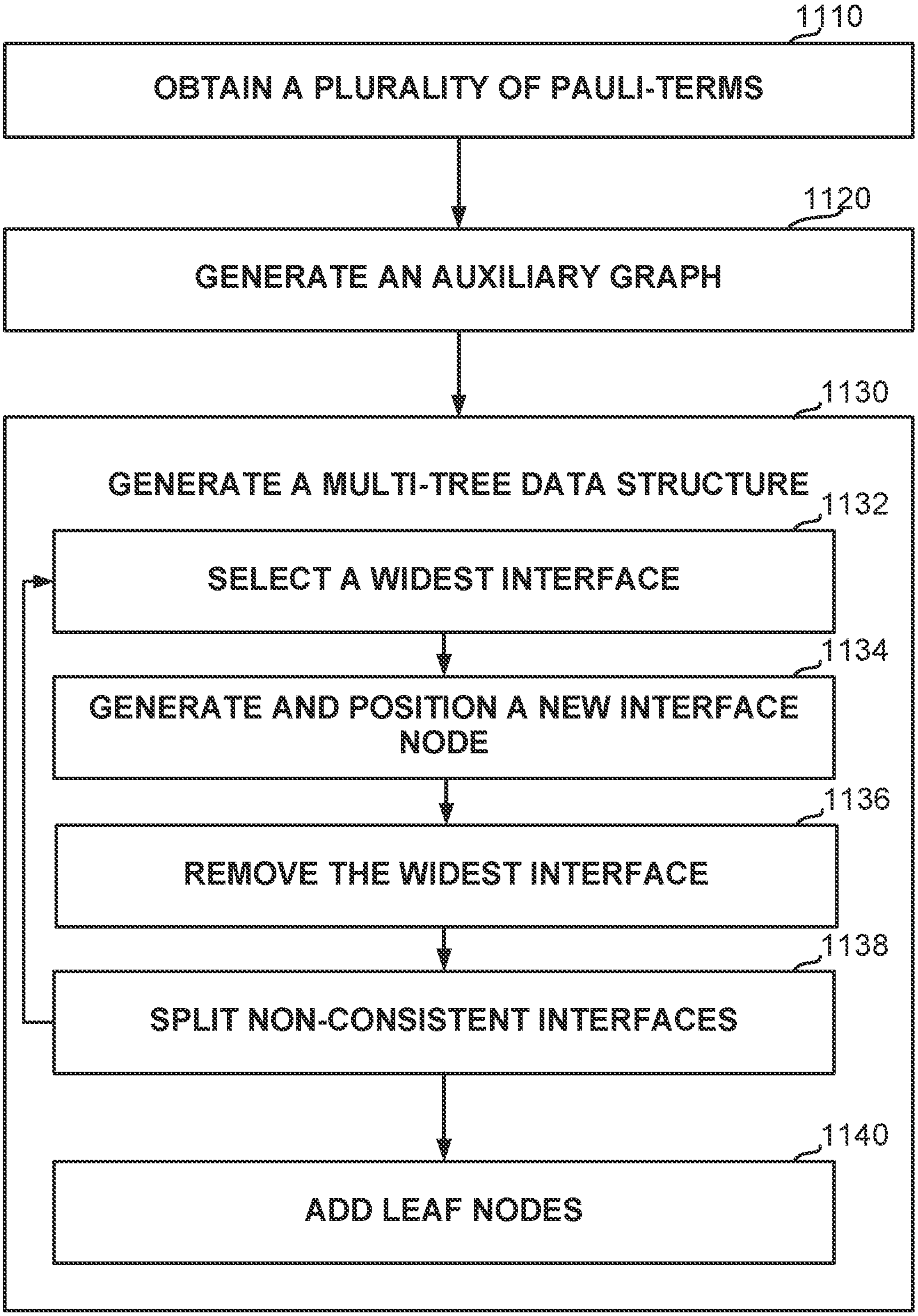

In some exemplary embodiments, a multitree data structure may be generated based on the plurality of Pauli-terms and a defined order between the plurality of Pauli-terms, e.g., according to FIG. 11. In some exemplary embodiments, the defined order may be determined locally, e.g., by a same software agent that generates the multitree data structure, may be obtained from a third party such as a remote server, or the like. In some exemplary embodiments, a greedy algorithm may be used for constructing a multitree data structure with a reduced number of gates, e.g., according to FIGS. 6A-6I. In other cases, any other schemes, algorithms, or techniques may be used to generate a multitree data structure that represents the plurality of Pauli-terms.

In some exemplary embodiments, in order to generate a multitree data structure, an auxiliary graph such as DAG 500 of FIG. 5A may be first generated, and interfaces thereof may be determined, visually marked, textually marked, or the like. For example, FIG. 5B depicts the interfaces of DAG 500 of FIG. 5A, between the ordered set of Pauli-terms: "XYZXYZ", "IIIIIX", "XYZXII", "IIZXYZ".

In some exemplary embodiments, the DAG diagram of FIG. 5A may be created, by placing nodes that represent respective Pauli-terms consecutively, according to their defined order along the X cycle axis, e.g., with non-overlapping cycles. In some exemplary embodiments, a number of qubits that corresponds to the largest Pauli-term, e.g., six in the current case, may be set along the Y axis, and may be attached or wired to the respective nodes. For example, indexes of qubits that are active in a node, may be attached to the node. In some exemplary embodiments, after creating the DAG diagram, interfaces between the DAG nodes may be determined, e.g., as depicted in FIG. 5B.

Referring now to FIG. 5B, showing exemplary DAG interfaces, in accordance with some exemplary embodiments of the disclosed subject matter. In some exemplary embodiments. DAG diagram 501 may correspond to DAG diagram 500, with an addition of marked interfaces between DAG nodes. In other cases, interfaces between DAG nodes may be marked in any other way, or may not be marked visually. For example, the interfaces may be stored in a separate data object, such as in a list, or may be marked with non-visual markings, such as by synthesized audio.

In some exemplary embodiments, an interface between DAG nodes may refer to a set of qubits of a same index and Pauli operator, that are shared between two consecutive DAG nodes. In some exemplary embodiments, the set of qubits may be considered shared in case that the set of qubits are active in both consecutive DAG nodes. In some exemplary embodiments, first and second nodes may be considered consecutive with respect to one or more qubits, in case no other node separates the one or more qubits between the first and second nodes. For example, in FIG. 5B, a Pauli-term that is represented by Node 510 indicates that Qubit 560 (e.g., an active qubit of index zero) is active, and the consecutive node portion with respect to Qubit 560, e.g., Node 530, also indicates that Qubit 560 is active. According to this example, an interface between Node 510 and Node 530 or portions thereof, e.g., Interface 515, may comprise Qubit 560, and may be marked accordingly. In the depicted scenario, Interface 515 may further comprise Qubits 561-563 (e.g., active qubits with indexes 1-3), which may all be shared between Nodes 510 and 530.

As another example, Nodes 510 and 520 may not have any interface, at least since the only active qubit of Node 520 may be Qubit 565 of index five and a basis change of type X (Pauli operator "X"), while in Node 510, Qubit 565 of index five may be of type Z (Pauli operator "Z"). In such a scenario, Nodes 510 and 520 do not share any qubit, and Qubit 565 may not be part of any interface. As another example, Nodes 510 and 540 may share an Interface 525, including Qubit 564 of index four and a basis change of type Y. As another example, Interface 535 may interface between Nodes 530 and 540, since they both comprise Qubits 562 and 563 with the same index and basis change.

In some exemplary embodiments, after creating a DAG with respective interfaces, a corresponding multitree data structure may be generated. For example, an algorithm for generating the multitree data structure may be configured to initialize the multitree data structure with a plurality of root nodes that represent the plurality of Pauli-terms, respectively. In some cases, each generated root node may represent a different Pauli-term.

In some exemplary embodiments, a candidate list that represents the interfaces between consecutive node portions of the DAG may be determined, generated, or the like, e.g., based on the generated DAG. In some exemplary embodiments, a widest interface from the candidate list may be selected. For example, the widest interface may comprise a greatest number of active qubits compared to any remaining interface in the candidate list. In some exemplary embodiments, the selected interface may be remove from the candidate list, and a new node representing the widest interface may be added to the multitree data structure. In some exemplary embodiments, the widest interface may be an interface between first and second nodes of the DAG, and the new interface node may be configured to be a descendant node of first and second nodes of the multitree data structure that correspond to the first and second nodes of the DAG, e.g., representing the same Pauli-terms.

In some exemplary embodiments, the selection of the widest interface may be performed iteratively. For example, every iteration, a next widest interface from the candidate list may be determined, removed from the candidate list, and a respective node may be added to the multitree data structure, until no more interfaces remain in the candidate list.

In some exemplary embodiments, in response to a determination that the candidate list is empty, the created multitree data structure may be analyzed, to determine for each node of the multitree data structure, whether all active qubits of the node are represented by its descendant nodes. In some exemplary embodiments, in case that an active qubit of a node is not represented by any of its descendant nodes, a leaf node that represents the active qubit may be added to the multitree data structure, as a child node of the node. In some cases, each root node of the resulting multitree data structure may be an ancestor of all its active qubits, and each non-leaf node may be an ancestor of all its active qubits. In some cases, in the resulting multitree data structure, no two nodes of the multitree data structure may share more than one child node, and no non-leaf node of the multitree data structure may have exactly one parent node, e.g., thus complying with the exhaustiveness and succinecy requirements.

In some exemplary embodiments, an exemplary scenario of utilizing the disclosed algorithm may be depicted in FIGS. 6A-6I.

Referring now to FIGS. 6A-6I, showing an exemplary generation of a multitree data structure, in accordance with some exemplary embodiments of the disclosed subject matter.

In some exemplary embodiments, a multitree data structure may be generated for a set of a plurality of Pauli-terms, e.g., the Pauli-terms "XYZZI", "XYZXY", and "IYZXY" (e.g., each having an associated 1 parameter). In some exemplary embodiments, the algorithm may start with constructing an auxiliary graph, e.g., DAG 600 of FIG. 6A. In some exemplary embodiments, the nodes of DAG 600, e.g., Nodes 610, 620, and 630, may represent the Pauli-terms in their respective order, and Qubits 660-664 may represent the active qubits of the Pauli-terms from index zero to index four.

In some exemplary embodiments, based on DAG 600, the multitree data structure may be initialized with Root Nodes 611, 621, and 631 of FIG. 6B, each of which representing a respective Pauli-term. As depicted in FIG. 6B, Root Nodes 611, 621, and 631 may be an initial multitree before any edges, non-leaf nodes, and leaf nodes are added.

Figure 6C:
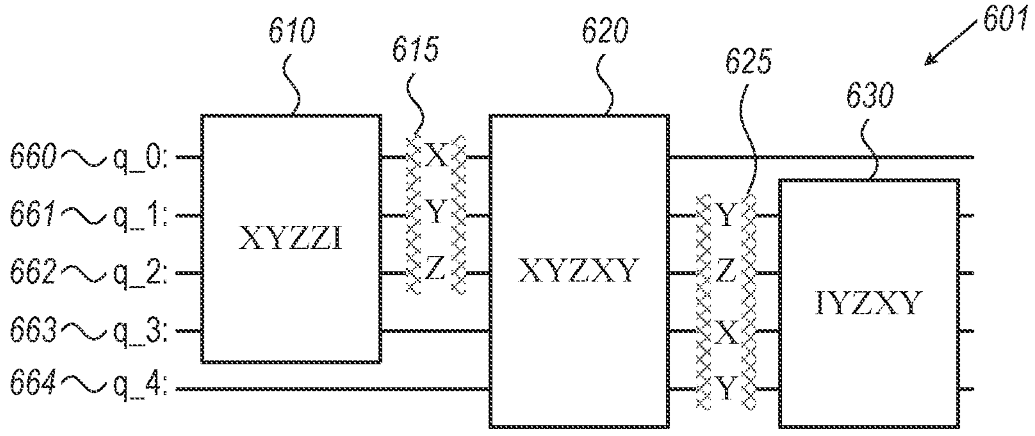

In some exemplary embodiments, DAG 600 may be analyzed to add thereto interfaces, thereby creating DAG 601 of FIG. 6C. For example, as depicted in FIG. 6C, Interface 615 may be constructed between Nodes 610 and 620, and Interface 625 may be constructed between Nodes 620 and 630. For example, Interface 615 may represent Qubits 660-662, which may be the maximal interface between Nodes 610 and 620 (e.g., representing the "XYZ" portion of the Pauli-terms "XYZZI" and "XYZXY"). Interface 625 may represent Qubits 661-664, which may be the maximal interface between Nodes 620 and 630 (e.g., representing the "YZXY" portion of the Pauli-terms "XYZXY" and "IYZXY").

Figure 6D:
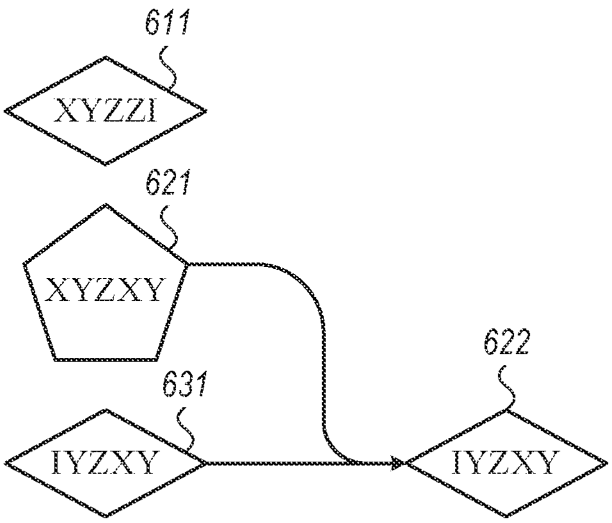

In some exemplary embodiments, a candidate list of interface may be created to comprise all the maximal interfaces between nodes of DAG 600; Interfaces 615 and 625. In some exemplary embodiments, a widest interface may be selected from the candidate list, resulting with a selection of Interface 625, e.g., since it includes four qubits, while Interface 615 includes three qubits. In some exemplary embodiments, a new node representing Interface 625 may be added to the multitree data structure. For example, as depicted in FIG. 6D, Node 622 representing the "YZXY" portion of Interface 625 may be added. In some exemplary embodiments, Node 622 may be added as a descendant of Nodes 621 and 631, which represent the Pauli-terms that share Interface 625.

Figure 6E:
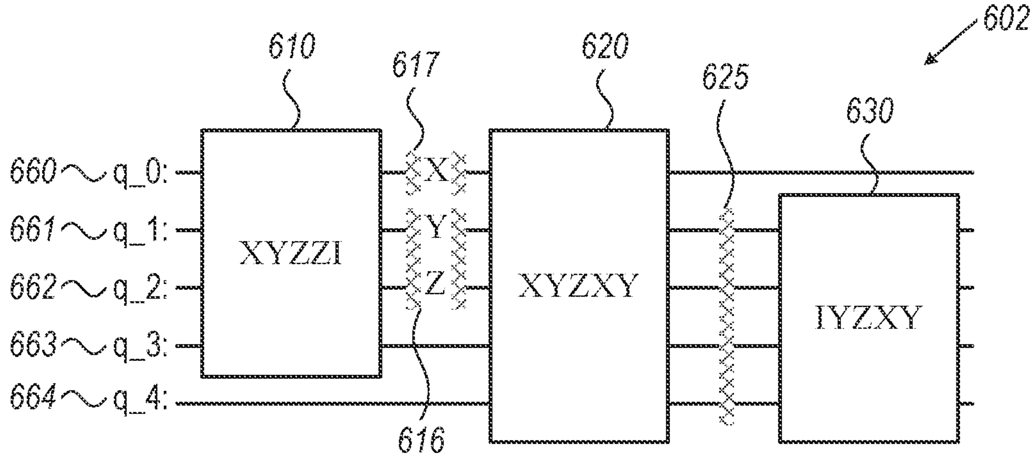

In some exemplary embodiments, Interface 625 may be removed from the candidate list, e.g., as depicted in FIG. 6E. In other cases, the removal of Interface 625 may be represented in any other way, such as by entirely removing any visual or non-visual marking between Nodes 620 and 630. In other cases, the DAG may not be modified, and only a separate list of candidates may be modified to remove therefrom an indication of Interface 625. In some exemplary embodiments, the remaining candidate interfaces may be analyzed to determine whether they are consistent with Interface 625. In some exemplary embodiments, in case a candidate interface has overlapping qubits with Interface 625, and at least one non-overlapping qubit with Interface 625, the candidate interface may be considered inconsistent with Interface 625, and may be split into two candidate interfaces that are consistent with Interface 625. For example, in DAG 602 of FIG. 6E, Interface 615 may be determined to be inconsistent with Interface 625 since it shares Qubits 661 and 662 with Interface 625, but does not share Qubit 660 with Interface 625. In such a case, Interface 615 may be split into two candidate interfaces that are consistent with Interface 625: Interfaces 616 and 617. Interface 616 may comprise the overlapping qubits that are included in both Interfaces 615 and 625, e.g., Qubits 661 and 662. Interface 617 may comprise the non-overlapping qubits that are not included in Interface 625 but are included in Interface 615: Qubit 660. In some exemplary embodiments, in case of a split, the candidate list may be modified to include the new interfaces and exclude the inconsistent interface.

Figure 6F:
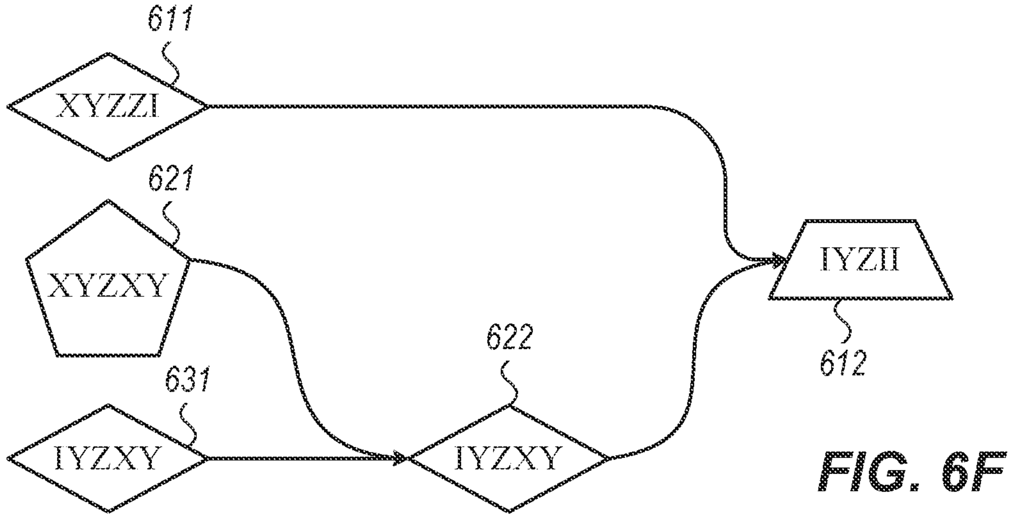

In some exemplary embodiments, after ensuring that all candidate interfaces are consistent with Interface 625, a next iteration may be performed. In some exemplary embodiments, the next iteration may comprise a new selection of the widest interface from the candidate list. In the current scenario, the remaining candidate interfaces in the candidate list may include Interfaces 616 and 617, resulting with a selection of Interface 616 (e.g., since Interface 616 includes two qubits, while Interface 617 includes one qubit). In some exemplary embodiments, a new node representing Interface 616 may be added to the multitree data structure. For example, as depicted in FIG. 6F, Node 612 representing Interface 616 may be added. In some exemplary embodiments, Node 612 may be added as a descendant of Nodes 611 and 622, which represent the Pauli-terms that share Interface 616. For example, Node 612 may be added to parent nodes so that a distance between Node 612 and the root nodes is as great as possible. According to this example, parent nodes may be selected as long as they include the active qubits represented by Interface 616, and are descendants of the root nodes that represent the Pauli-terms that share Interface 616.

Figure 6G:
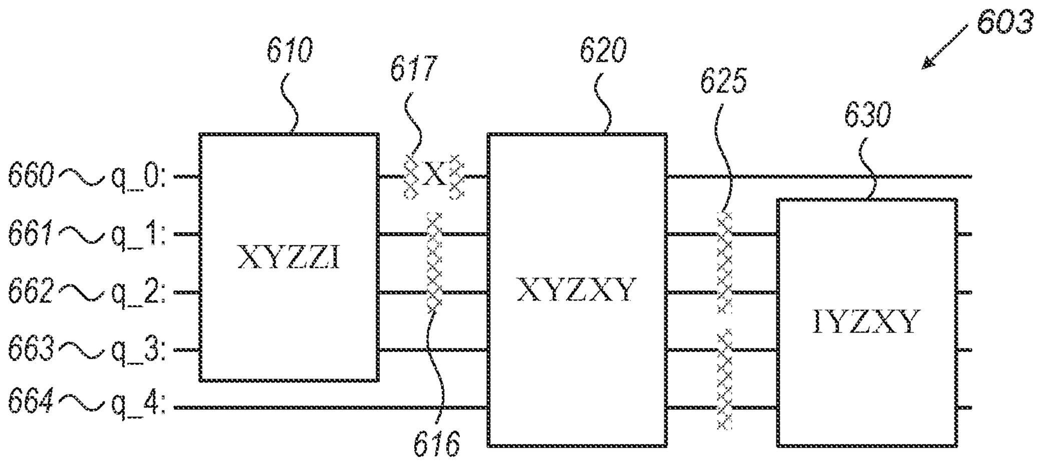

In some exemplary embodiments, Interface 616 may be removed from the candidate list, e.g., as depicted in DAG 603 of FIG. 6G. In some exemplary embodiments, the remaining candidate interfaces may be analyzed to determine whether they are consistent with Interface 616. For example, in the scenario of FIG. 6G, Interface 616 may be determined to be consistent with Interface 617, at least since Interfaces 616 and 617 may not have overlapping qubits. As depicted in FIG. 6G, Interfaces 616 and 625 are removed, and only Interface 617 remains as a candidate interface.

Figure 6H:
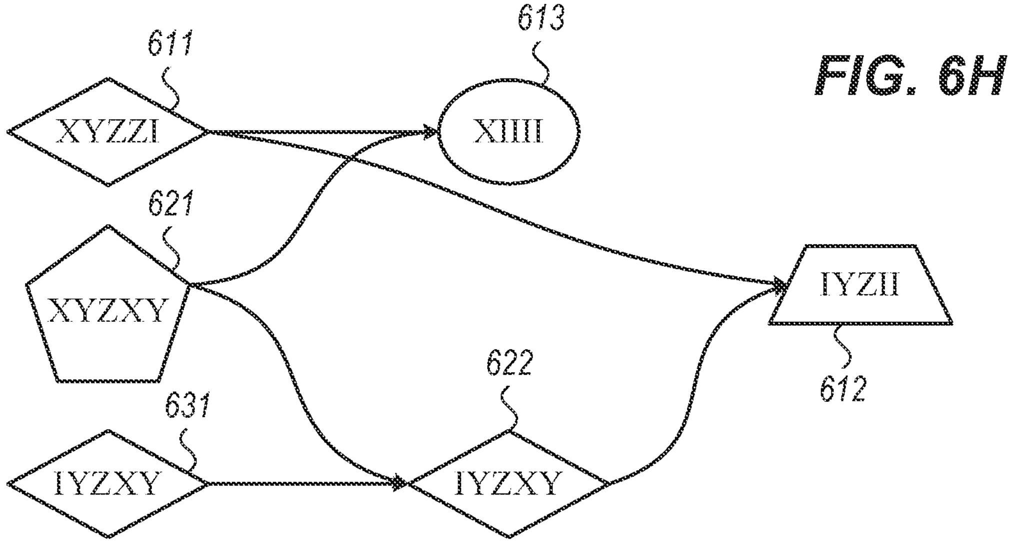

In some exemplary embodiments, after ensuring that all candidate interfaces are consistent with Interface 616, a next iteration of the algorithm may be performed. In some exemplary embodiments, the next iteration may comprise a new selection of the widest interface from the candidate list. In the current scenario, a single candidate interface may remain: Interface 617, resulting with a selection of Interface 617. In some exemplary embodiments, a new node representing Interface 617 may be added to the multitree data structure. For example, as depicted in FIG. 6H, Node 613 representing Interface 617 is added. In some exemplary embodiments, Node 613 may be added as a descendant of Nodes 611 and 621, which represent the Pauli-terms that share Interface 617.

Figure 6I:
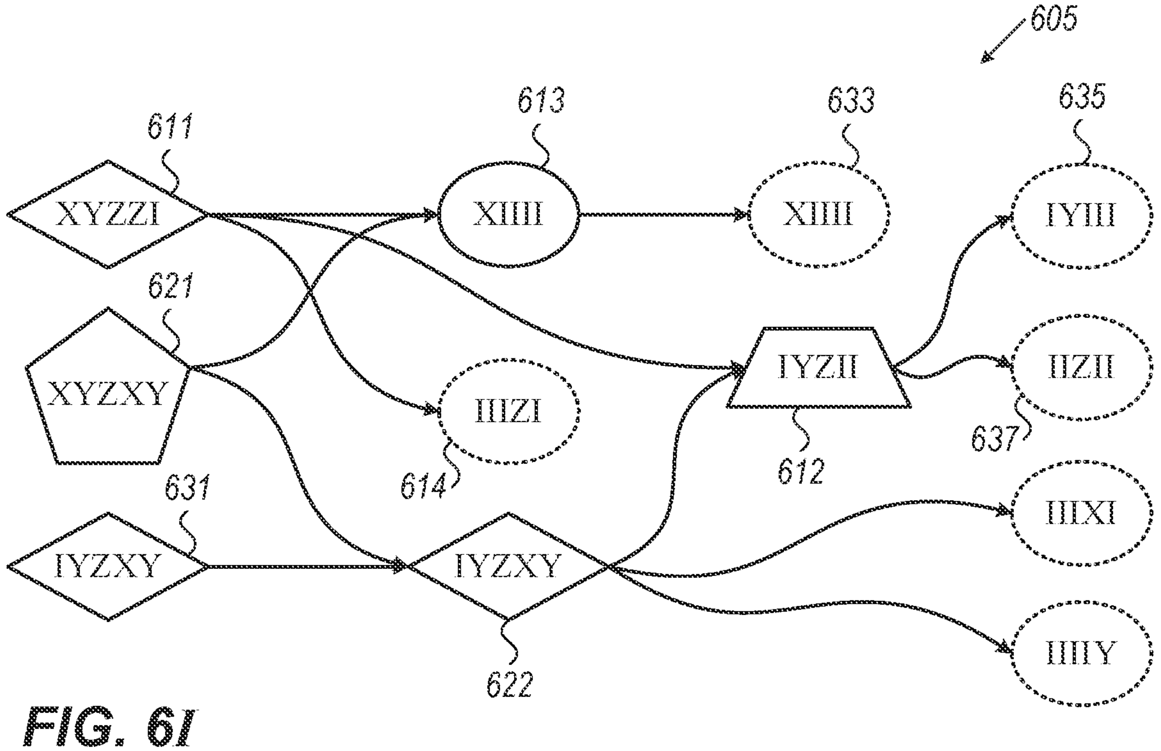

In some exemplary embodiments, Interface 617 may be removed from the candidate list, thereby rendering the list empty. In some exemplary embodiments, since no candidate interfaces may remain, leaf nodes may be added to the multitree data structure, e.g., as depicted in FIG. 6I. For example, an analysis may be performed to determine which leaf nodes should be added to each node of the multitree data structure, e.g., from top to bottom, or in any other order of analysis. For example, the nodes may be traversed according to a Depth-First Search (DFS).

For example, a root node such as Node 611 may be first analyzed to determine whether it has active qubits that are not represented by any child node of Node 611. In the case of Node 611, which represents the Pauli-term "XYZZI", child node 612 may represent the second and third active qubits of Node 611 (the portion "YZ"), and child Node 613 may represent the first active qubit of Node 611 (the portion "X"). In this case, the fourth qubit of Node 611 (the portion "Z") may not be represented by any child node of Node 611, and thus Leaf Node 614 may be generated as a child node of Node 611, to represent the fourth qubit of Node 611. In a next level of the multitree data structure, the child nodes of Node 611, e.g., Node 612 and 613, may be analyzed, to determine whether they have active qubits that are not represented by any of their child nodes. Neither of Node 612 and 613 may have child nodes at all, and thus leaf nodes may be added for all of the active qubits represented thereby. For example, Leaf Node 633 may be added as a child node of Node 613, and Leaf Nodes 335 and 337 may be added as child nodes of Node 612. Similar analyses may be performed for the remaining root nodes, e.g., Nodes 621 and 631, and their descendants, thereby resulting with the multitree data structure of FIG. 6I, e.g., Multitree Data Structure 605.

In some exemplary embodiments, Multitree Data Structure 605 may be an advantageous multitree data structure that complies, by construction, with the additional constraints, with the exhaustiveness and succinecy requirements, retains the consistent gate count property, and enables to reduce a number of gates of a respective quantum circuit. In some exemplary embodiments, Multitree Data Structure 605 may be advantageous also compared to other multitree data structures that comply with the additional, exhaustiveness, and succinecy requirements, at least since the quantum circuit represented by Multitree Data Structure 605 may utilize less resources, utilize less cycles, have a lower error rate, or the like, compared to quantum circuits represented by alternative generated multitree data structures. For example, a multitree data structure that is generated according to a naïve method of FIGS. 7A-7D, may represent a quantum circuit that is more resource consuming compared to a multitree data structure that is generated according to the method of FIGS. 6A-6I. In some cases, the generation process of Multitree Data Structure 605 itself may be shorter and more resource conserving compared to alternative methods of construction that may be used to represent the same Pauli-terms.

Referring now to FIGS. 7A-7D, showing an exemplary generation of a multitree data structure, in accordance with some exemplary embodiments of the disclosed subject matter.

In some exemplary embodiments, using the same Pauli-terms that were used to construct Multitree Data Structure 605 of FIG. 6I, e.g., the Pauli-terms "XYZZI", "XYZXY", and "IYZXY", a different multitree data structure may be generated using a naïve method, e.g., without using or generating an auxiliary graph.

Figure 7A:
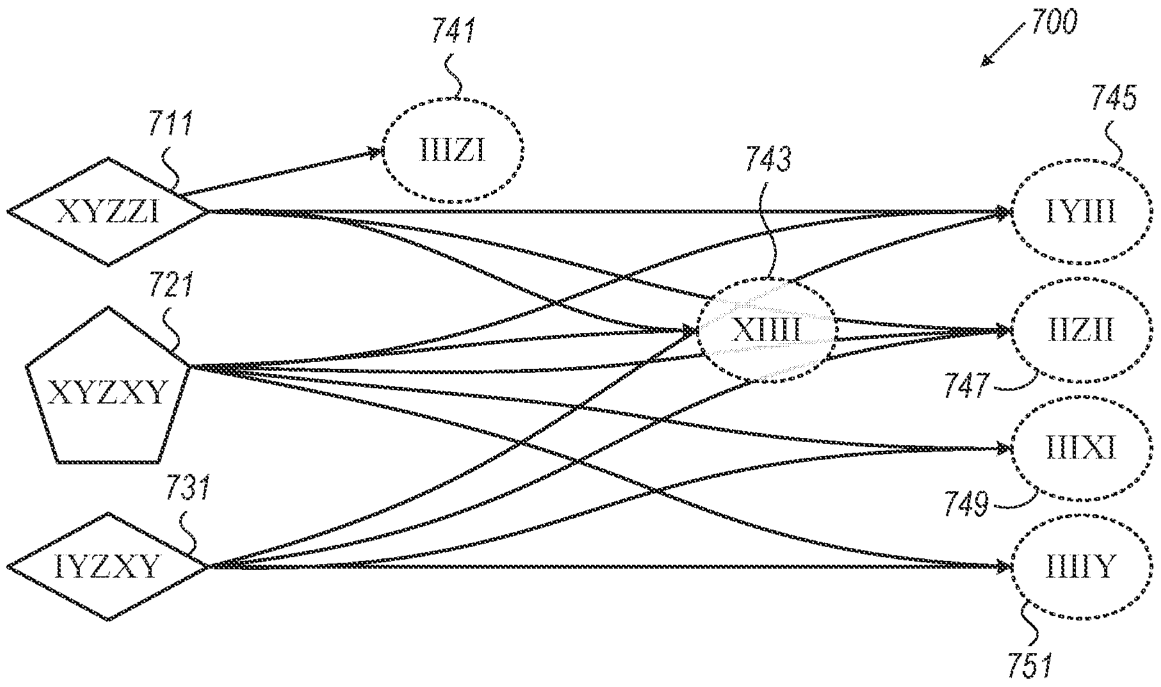
FIGS. 7A-7D depict an exemplary generation of a multitree data structure, in accordance with some exemplary embodiments of the disclosed subject matter.

In some exemplary embodiments, the naïve method may be initialized with Root Nodes 711, 721, and 731 of FIG. 7A, each of which representing a respective Pauli-term. For example, Root Nodes 711, 721, and 731 may correspond to Root Nodes 611, 621, and 631 of FIGS. 6A-6I. In some exemplary embodiments, leaf nodes representing each active qubit of each Pauli-term may be generated. For example, in the scenario of FIG. 7A, Leaf Nodes 741, 743, 745, 747, 749, and 751 are created to represent the active qubits of Pauli-terms "XYZZI", "XYZXY", and "IYZXY". In some exemplary embodiments, each root node may be connected, e.g., via an edge, directly to respective leaf nodes that represent its active qubits.

In some exemplary embodiments, at a next stage, Multitree Data Structure 700 may be analyzed to detect any same active qubit (e.g., having a same index qubit and a same type of Pauli operator) is utilized by two or more Pauli-terms. In case such a qubit is found, such as the qubit represented by the basis change: "X" at index zero of Pauli-terms "XYZZI" and "XYZXY", both Pauli-terms "XYZZI" and "XYZXY" may be attached to a same leaf node that represents the qubit "X". e.g., Leaf Node 743.

In some exemplary embodiments, Multitree Data Structure 700 of FIG. 7A comprises a valid multitree data structure that complies with the additional constraints, but not with one or more advantageous requirements such as the exhaustiveness requirement. In some exemplary embodiments, Multitree Data Structure 700 may be converted to a compliant multitree data structure. For example, in order to comply with the exhaustiveness requirement, the nodes of Multitree Data Structure 700 may be iteratively analyzed to identify node pairs with more than one shared child node. In some exemplary embodiments, in case such a pair is identified, a new node may be added as a child node of the pair, and the previous child nodes of the pair may become child nodes of the new node. In some exemplary embodiments, the nodes may be traversed according to one or more defined orders, searches, or the like, such as according to a Depth-First Search (DFS). In some exemplary embodiments, the resulting multitree data structure may comply with the exhaustiveness requirement.

Figure 7B:
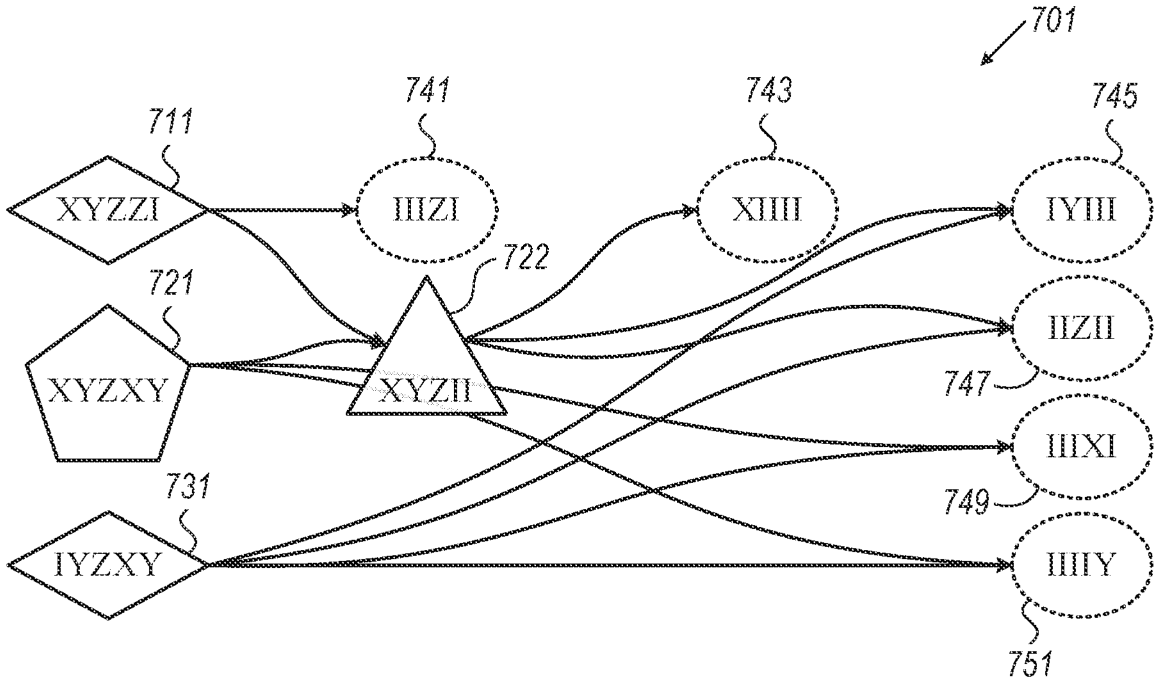

In some exemplary embodiments, Multitree Data Structure 700 may be analyzed to identify that Nodes 711 and 721 share three child nodes: Leaf Nodes 743, 745, and 747. According to this example, a new node may be added to represent the shared child nodes of Nodes 711 and 721. For example, as depicted in FIG. 7B, Node 722 is added as a child node of Nodes 711 and 721, and Leaf Nodes 743, 745, and 747 are moved to now be child nodes of Node 722.

Figure 7C:
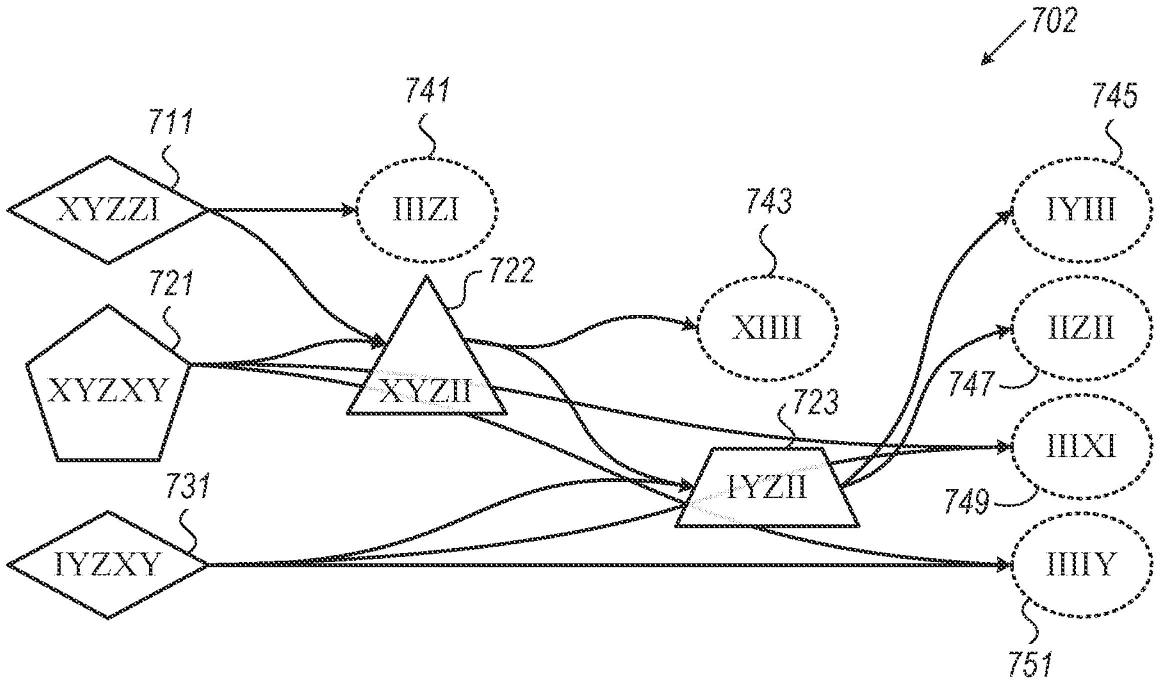

In some exemplary embodiments, Multitree Data Structure 701 may be further analyzed to identify that Nodes 722 and 731 share more than one shared child node: Leaf Nodes 745 and 747. According to this example, a new node may be added to represent the shared child nodes of Nodes 722 and 731. For example, as depicted in FIG. 7C, Node 723 is added as a child node of Nodes 722 and 731, and Leaf Nodes 745 and 747 are moved to now be child nodes of Node 723.

Figure 7D:
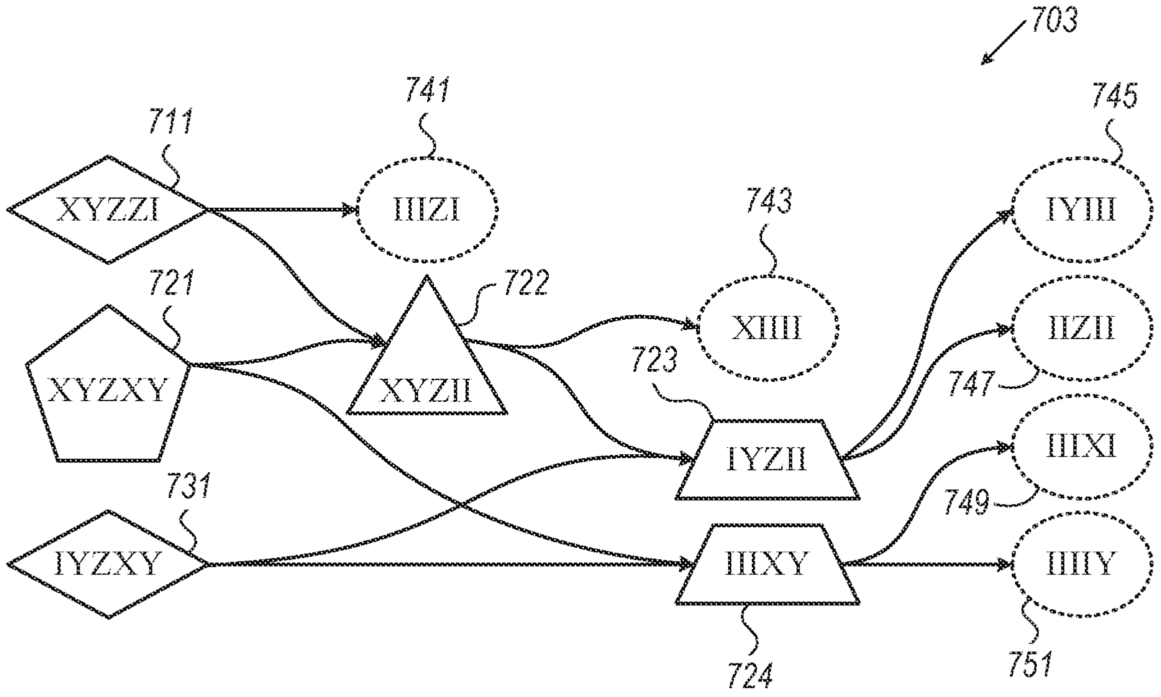

In some exemplary embodiments, Multitree Data Structure 702 may be further analyzed to identify that Nodes 721 and 731 share more than one shared child node: Leaf Nodes 749 and 751. According to this example, a new node may be added to represent the shared child nodes of Nodes 721 and 731. For example, as depicted in FIG. 7D, Node 724 is added as a child node of Nodes 721 and 731, and Leaf Nodes 749 and 751 are moved to now be child nodes of Node 724.

In some exemplary embodiments, Multitree Data Structure 703 may comply with the exhaustiveness requirement, and the naïve algorithm may terminate. In some exemplary embodiments, although Multitree Data Structure 703 may comprise a proper multitree data structure that is exhaustive, Multitree Data Structure 703 may be suboptimal compared to Multitree Data Structure 605 of FIG. 6I, at least since the a quantum circuit represented by Multitree Data Structure 703 may be suboptimal compared to a quantum circuit represented by Multitree Data Structure 605, e.g., due to Multitree Data Structure 703 utilizing more memory resources, computational resources, time resources, power resources, or the like.

Yet another technical solution provided by the disclosed subject matter comprises converting any multitree data structure into a respective ordered binary multitree that that can be used to synthesize a quantum circuit. In some exemplary embodiments, in order to implement a quantum circuit with a reduced number of gates, according to the respective multitree data structure, the multitree data structure may be converted to one or more ordered binary trees. In some exemplary embodiments, an ordered binary multitree may refer to a multitree in which each non-leaf node has an outgoing degree of two, e.g., having exactly two child nodes.

In some exemplary embodiments, an ordered binary multitree that is created based on a multitree data structure, may represent a certain implementation of the multitree data structure. In some exemplary embodiments, there may be an exponential number of realizations adhering to a given multitree data structure, all of which may be represented by a respective ordered binary tree. In some exemplary embodiments, any ordered binary multitree that implements a multitree data structure, may benefit from a same reduced number of gates, e.g., due to the consistent gate count property.

In some cases, although all such ordered binary multitree may have a same gate count, some may be more optimal than others. For example, although resulting quantum circuits may have a same gate count, they may vary in their number of cycles, e.g., their circuit depth. In some cases, some ordered binary multitrees may result with quantum circuits that have less cycles than quantum circuits generated from other ordered binary multitrees. In some cases, some ordered binary multitrees may result with quantum circuits that have produce an output state with a lower error rate than quantum circuits generated from other ordered binary multitrees. In some exemplary embodiments, any other property of a resulting quantum circuit, besides the number of gates, may vary between ordered binary multitrees.

In some exemplary embodiments, one or more exemplary algorithms for constructing an ordered binary multitree from a multitree data structure are provided by the disclosed subject matter. In some exemplary embodiments, one or more basic requirements may be required to be fulfilled by an ordered binary multitree. For example, every node of the multitree data structure may be required to correspond to a respective node in the ordered binary multitree. In some exemplary embodiments, an ordered binary multitree may be formed from a multitree data structure, such as by thickening the multitree data structure until an ordered binary multitree is generated, and thus nodes of the multitree data structure may not be excluded from the respective ordered binary multitree. As another example, a reachability of each pair of nodes in the multitree data structure may be required to be preserved in the ordered binary multitree. As another example, all descendants of each root node of the ordered binary multitree may be required to form an ordered binary tree, also referred to as a 'CX-tree'.

In some exemplary embodiments, a CX-tree may comprise an ordered binary tree that can be interpreted as an abstract representation as of a quantum circuit that implements the basis-change and parity summation stages of a single Pauli-term. In some exemplary embodiments, a CX-tree may represent a selection of an order of CX gates of a parity summation stage. In some exemplary embodiments, for each CX gate of a parity summation stage, a CX-tree may comprise a corresponding non-leaf node. In some exemplary embodiments, for each active qubit of a Pauli-term, a CX-tree may comprise a corresponding leaf node, representing the qubit's basis change stage.

In some exemplary embodiments, edges between nodes of a CX-tree may represent which qubits are manipulated by which gates. In some cases, the ordering of the CX-tree may enable to distinguish target qubits from control qubits. In some exemplary embodiments, the edges exiting non-leaf nodes of the ordered binary multitree may have a defined pattern, or order, indicating which qubit is a control qubit and which qubit is a target qubit. For example, a first edge exiting a node may indicate a control qubit, while a second edge may indicate a target qubit. In some cases, the role of each qubit may be indicated via an agreed upon visual indication, such as a dashed or dotted indication, an agreed upon order such as a left edge being a target qubit, a textual indication, or the like.

In some exemplary embodiments, a search problem that is configured to identify an ordered binary multitree that is associated with a reduced utilization of resources, e.g., a lesser numbers of cycles, may be defined. In some exemplary embodiments, a selection of a realization of a given multitree data structure may be represented by a selection of an ordered binary multitree that corresponds to multitree data structure. In some exemplary embodiments, the disclosed subject matter provides one or more algorithms for selecting an ordered binary multitree realization of any given multitree data structure, in a manner that reduces a resource utilization of the resulting quantum circuit, e.g., a circuit depth thereof. For example, the algorithm may be used to build the selected ordered binary multitree from the multitree data structure, thereby obtaining a selection of a realization of a multitree data structure. In some exemplary embodiments, the algorithms may or may not be greedy, recursive, or the like.

In some exemplary embodiments, the search algorithm may utilize one or more definitions associated with CX-trees. For example, the definitions may relate to a depth of CX-trees, a width of CX-trees, a key for selecting CX-trees, or the like.

In some exemplary embodiments, a depth of a CX-tree may be defined as the maximal depth of all paths in the CX-tree such that a leaf at the end of each path contributes a weighted, defined depth. For example, a "Z" basis-change leaf may be defined as contributing a depth of 0, while a "X" or "Y" basis-change leaf may be defined as contributing a depth of 1. As another example, the "X", "Y", and "Z" basis-change leaves may be all be defined as contributing a depth of 0. As another example, the "Z" basis-change leaf may be defined as contributing a depth of 0, the "X" basis-change leaf may be defined as contributing a depth of 1, and the "Y" basis-change leaf may be defined as contributing a depth of 2. In other cases, any other values may be assigned to each type of basis change leaf depth or weight, e.g., potentially including non-integer values.

In some exemplary embodiments, a width of a full subtree of a node may refer to a maximal width of a full binary tree with a depth that is equal to the depth of the full subtree, e.g., a power of two by a saturated binary tree. In some cases, a width of a full subtree of a node may refer to a maximal number of Pauli operators of type "Z" (e.g., Pauli Operator 230 of FIG. 2) that can be instantiated into a full binary tree of a same depth.

In some exemplary embodiments, each full subtree may be ordered according to one or more defined orders, keys, or the like. For example, without limiting the scope of the disclosed subject matter, the following keys may be defined and used throughout an exemplary implementation of the algorithm:

First by depth from high to low.

Secondly by type of full subtree; full subtrees that are not leaf nodes before subtrees that are leaf nodes.

Third by type of qubit; target qubits before control qubits.

In other cases, any other key may be used. For example, control qubits may be selected before target qubits.

In some exemplary embodiments, an exemplary recursive algorithm may be defined for constructing an ordered binary multitree from a multitree data structure, e.g., based on the defined depth, width, and keys. In some exemplary embodiments, the recursive algorithm may generate, for each root node of the multitree data structure, a respective binary tree with its descendants. In some exemplary embodiments, a stack or other data structure may be utilized for storing nodes, node representations, or the like. For example, the stack may store each node representation with one or more properties, e.g., a property indicating whether the node is instantiated. In some cases, the properties may be stored in the stock, externally therefrom is separate metadata, or the like. In some exemplary embodiments, a node may be considered or marked as instantiated if it has no children, if the node is a leaf node, in case it was instantiated by the recursive algorithm, in case its full subtree was instantiated by the recursive algorithm, or the like.

In some exemplary embodiments, the stack may be initialized with all root nodes of the multitree data structure in any order, and with the respective instantiation status of each node, marks thereof, indications thereof, or the like.

In some exemplary embodiments, nodes of the stack may be iteratively inspected. For example, the objective of the recursive algorithm may be to convert the root nodes to respective binary trees, by instantiating all full subtrees of all root nodes to a respective binary tree. In some exemplary embodiments, nodes of the stack may be iteratively inspected to identify whether or not an inspected node has any child nodes in the multitree data structure that are not instantiated (e.g., are not leaf nodes). In some exemplary embodiments, in case one or more child nodes of the inspected node are not instantiated, such child nodes, or their representation, may be added to the stack, in any order, and a next element in the stack may be inspected.

In some exemplary embodiments, subsequent elements in the stack may be inspected until reaching a stack element without child nodes, or a stack element that all of its child nodes were already instantiated. In some exemplary embodiments, in case the node does not have a child node that is not instantiated, the node may be instantiated. For example, in case an inspected node has no child nodes at all, the node may be considered to not have any child nodes in the multitree data structure that are not instantiated, and may be considered instantiated.

In some exemplary embodiments, a node without child nodes may be instantiated by providing the node itself. In some exemplary embodiments, in case the ordered collection comprises only one element, e.g., the element itself, then the instantiation of the collection may comprise the element.

In some exemplary embodiments, a node with one or more child nodes may be instantiated by creating or constructing an ordered collection that comprises all the of the full subtrees of the child nodes of the node (which are by definition ordered binary trees). For example, the full subtrees of the child nodes of a node may correspond to Subtrees 810-850 of FIG. 8A. In some exemplary embodiments, each child node and its full subtree may be referred to as a 'child tree'.

In some exemplary embodiments, in case the ordered collection comprises more than one element, a new ordered binary tree may be created in the ordered collection. In some exemplary embodiments, the new ordered binary tree may be created by selecting the child tree that is ranked highest (e.g., according to the key defined above, such as a depth of each child tree), removing the child tree from the ordered collection, and adding it as a first child tree of a new root node of the new ordered binary tree.

In some exemplary embodiments, in case the ordered collection remains with a single child tree, the single child tree may be added as a second child of the new root node of the new ordered binary tree and may be removed from the ordered collection. In some exemplary embodiments, in case the ordered collection remains with a plurality of child trees, one or more second child trees that are ranked highest (according to the defined key) in the remaining ordered collection may be selected according to their ranks, as long as the total width of all the selected second child trees is lesser or equal to the width of the first child tree. In some exemplary embodiments, the second child trees may be removed from the ordered collection, and used to construct a second ordered collection, to which the algorithm may be applied recursively to create therefrom a CX-tree. In some exemplary embodiments, the resulting CX-tree may be used as a second child tree of the new root node of the new ordered binary tree. For example, the second ordered collection may be analyzed in an identical manner as described herein with respect to the original ordered collection. In some exemplary embodiments, the new ordered binary tree, consisting of the child tree that was ranked highest as the first child tree, and of the constructed CX-tree as the second child tree, may constitute an instantiation of the inspected node, and may be added back to the ordered collection recursively, until no more elements remaining in the ordered collection except for a single constructed CX tree.

In some exemplary embodiments, after instantiating all child nodes of root nodes, by constructing respective CX trees as described above, an ordered binary multitree may be constructed by adding an instantiation of each child node to the respective root node, thereby obtaining a plurality of binary trees that correspond to the plurality of root nodes. In some exemplary embodiments, the recursive algorithm described hereby enables to construct an ordered binary multitree that is maximally imbalanced amongst all corresponding trees with a minimum depth. In some exemplary embodiments, the recursive algorithm promotes away from the root node subtrees with more qubits, so that when cancelled out, they may have a greatest impact on the depth. In some exemplary embodiments, the generated ordered binary tree may ensure an effective depth, after gate cancelations, that is always lesser or equal to a depth of a corresponding minimum-depth binary tree without gate cancelations. In some cases, since the subtrees may be sorted before each iteration, the runtime of the algorithm may be bound to O(N*log(N)). In some exemplary embodiments, the recursive algorithm may be exemplified in FIGS. 8A-8C.

In other cases, any other schemes, algorithms, or techniques may be used to generate an ordered binary multitree from a multitree data structure.

Figure 8A:
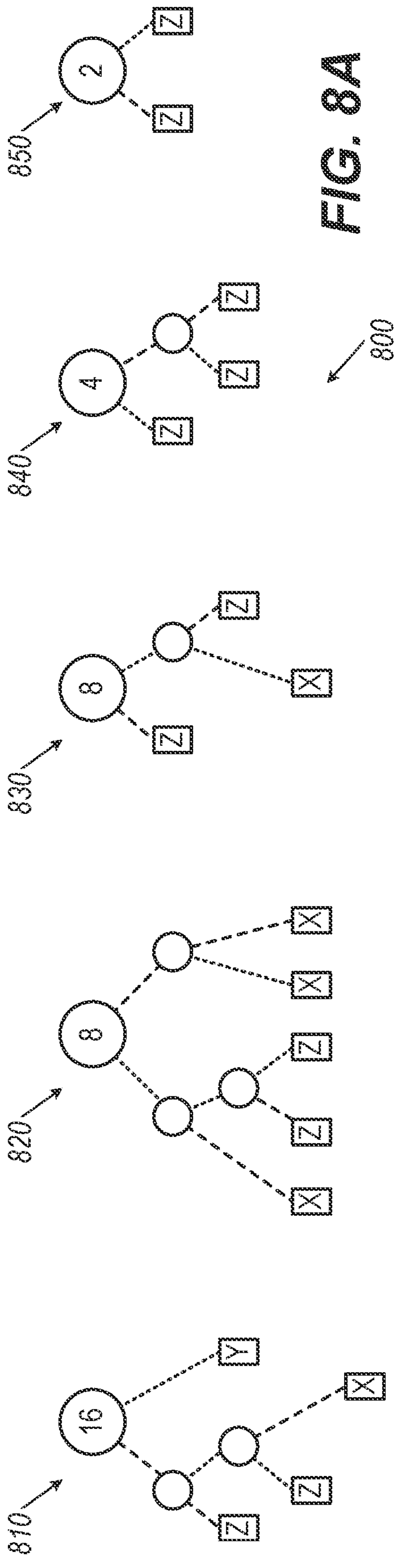
FIGS. 8A-8C depict an exemplary generation of an ordered binary multitree, in accordance with some exemplary embodiments of the disclosed subject matter.
Figure 8B:
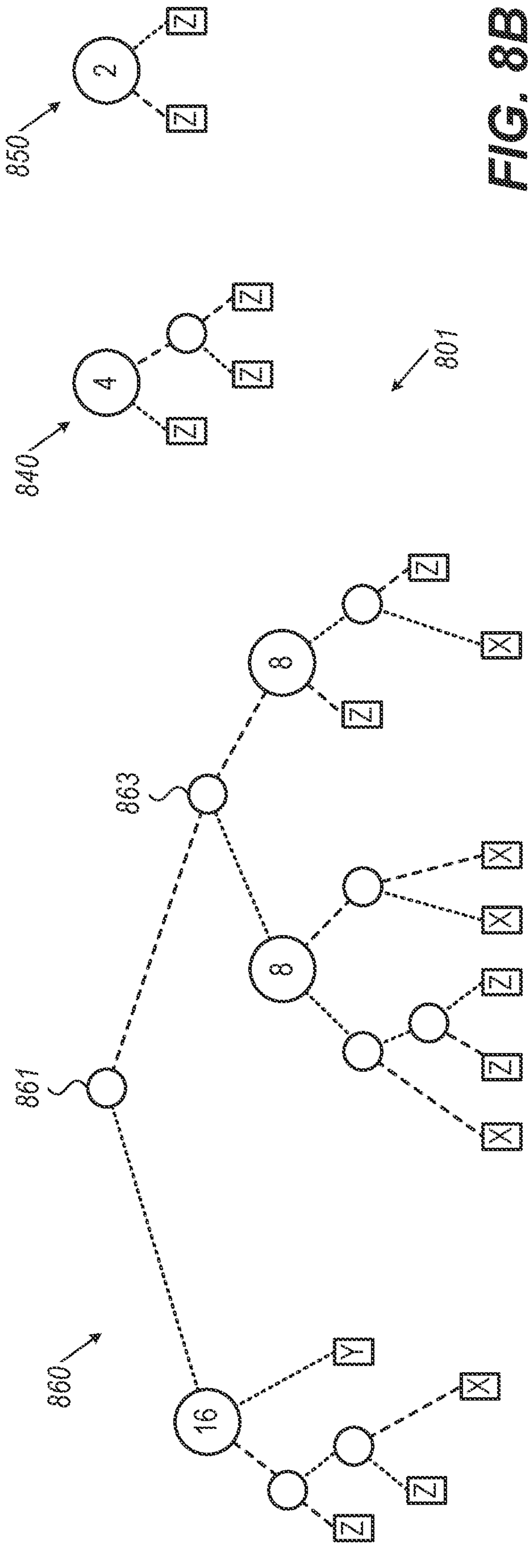
Figure 8C:
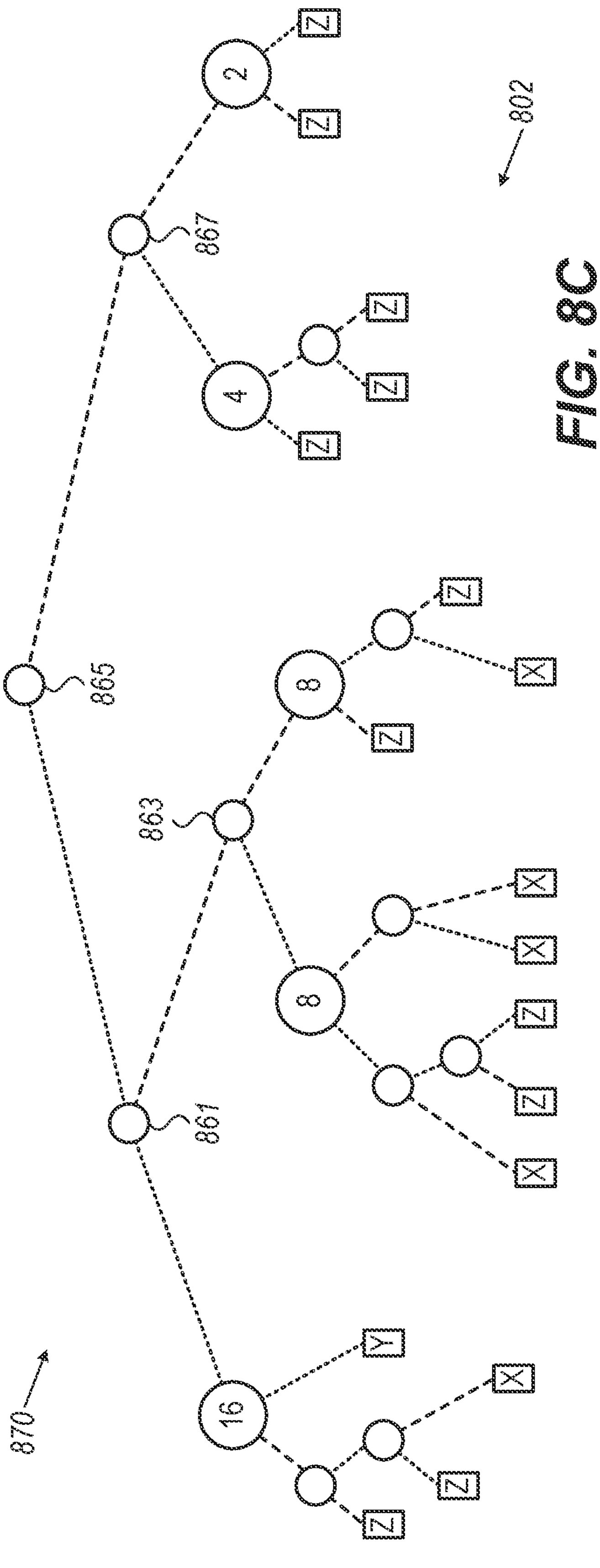

Referring now to FIGS. 8A-8C, showing exemplary creation of an ordered binary multitree from a multitree data structure, in accordance with some exemplary embodiments of the disclosed subject matter.

In some exemplary embodiments, FIG. 8A depicts a stage in the algorithm in which Ordered Collection 800 includes the following child trees: Subtrees 810, 820, 830, 840, and 850. In some exemplary embodiments, the child trees are ordered according to the defined key, in which Subtree 810 is ranked highest due to having a depth of 16, and Subtree 850 is ranked lowest due to having a depth of 2.

In some exemplary embodiments, in accordance with the above algorithm, the highest ranked subtree, e.g., Subtree 810, is selected and removed from Ordered Collection 800. One or more subsequently ranked subtrees are selected and used to construct a CX tree, as long as their combined width is lesser or equal to the width of Subtree 810. As depicted in FIG. 8B, Subtrees 820 and 830 together have a depth of 16, which is equal to the depth of Subtree 810. According to this example, Subtrees 820 and 830 are used to form a new subtree with a new root node, e.g., Node 863, and are removed from Ordered Collection 800. A new CX tree is created, e.g., CX Tree 860, in which the Subtree 810 constitutes a first child node of a new root node, e.g., Node 861, and a CX tree that is generated from the subsequent subtrees, e.g., Subtrees 820 and 830, constitutes the second child node of the Node 861. In some exemplary embodiments, CX Tree 860 may be added back to Ordered Collection 800, thereby creating Ordered Collection 801 that comprises CX Tree 860 and Subtrees 840 and 850.

In some exemplary embodiments, since Ordered Collection 801 comprises more than one element, a next iteration of the algorithm may be performed. In a next iteration, CX Tree 860 may be selected as a first child of a new root node, e.g., Node 865, of a new CX tree, e.g., Trec 870, at least since CX Trec 860 may be ranked higher that Subtrees 840 and 850 according to the defined key. As a second child node of Node 865, both Subtrees 840 and 850 may be selected. e.g., at least since their combined width is lesser than the width of CX Tree 860. In some exemplary embodiments, Subtrees 840 and 850 may be used to form a CX tree with a new root node, e.g., Node 867. For example, Subtrees 840 and 850 may be combined by considering them a separate ordered collection, and applying the disclosed algorithm on the ordered collection. In some exemplary embodiments, Subtrees 840 and 850 and CX Tree 860 may be removed from Ordered Collection 801, and Tree 870, formed thereby, may be added back to the ordered collection, e.g., creating Ordered Collection 802. In some cases, since Tree 870 may comprise a single element, Tree 870 may be returned as the instantiation of a respective stack element.

In some exemplary embodiments, Tree 870 may be maximally imbalanced amongst all respective binary trees with a minimum depth. In some exemplary embodiments, a circuit may be constructed from the obtained CX tree, e.g., Tree 870. In some exemplary embodiments, ordered binary trees, such as Tree 870, may be converted directly to a quantum circuit. In some exemplary embodiments, as depicted in FIGS. 9A-9B, ordered binary trees may represent quantum circuits and may enable to construct, or synthesize corresponding quantum circuits.

Figure 9A:
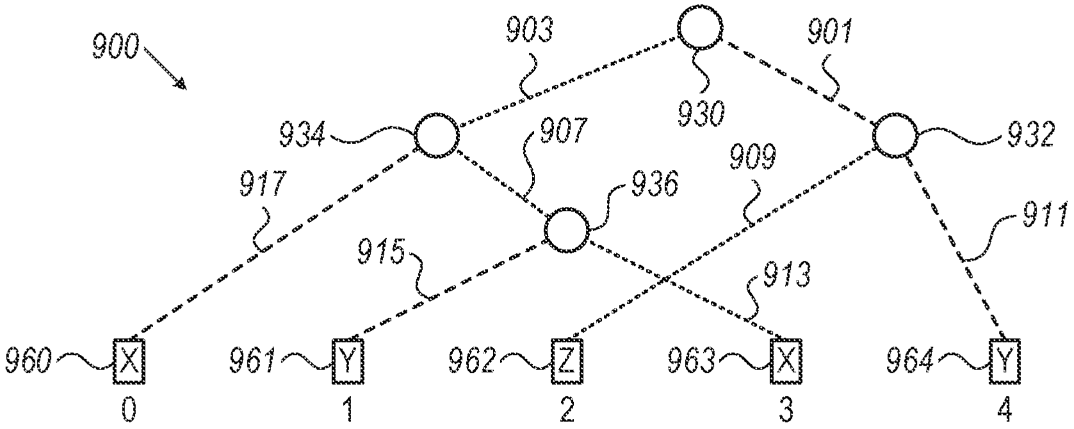
FIGS. 9A-9B depict an exemplary synthesis of a quantum circuit, in accordance with some exemplary embodiments of the disclosed subject matter.
Figure 9B:
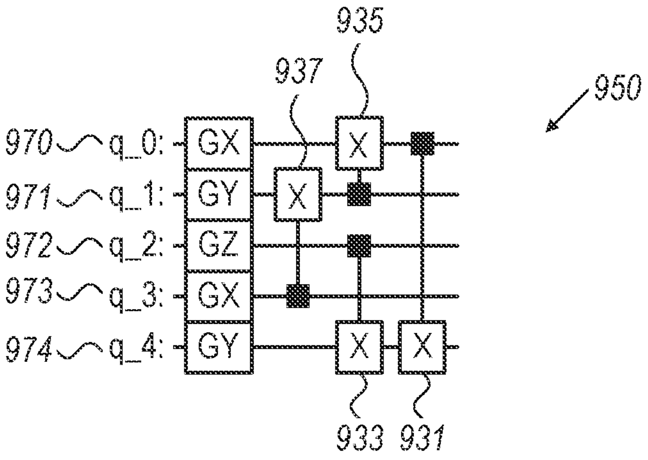

Referring now to FIGS. 9A-9B, showing an exemplary ordered binary tree and a corresponding quantum circuit, in accordance with some exemplary embodiments of the disclosed subject matter.

Figure 12:
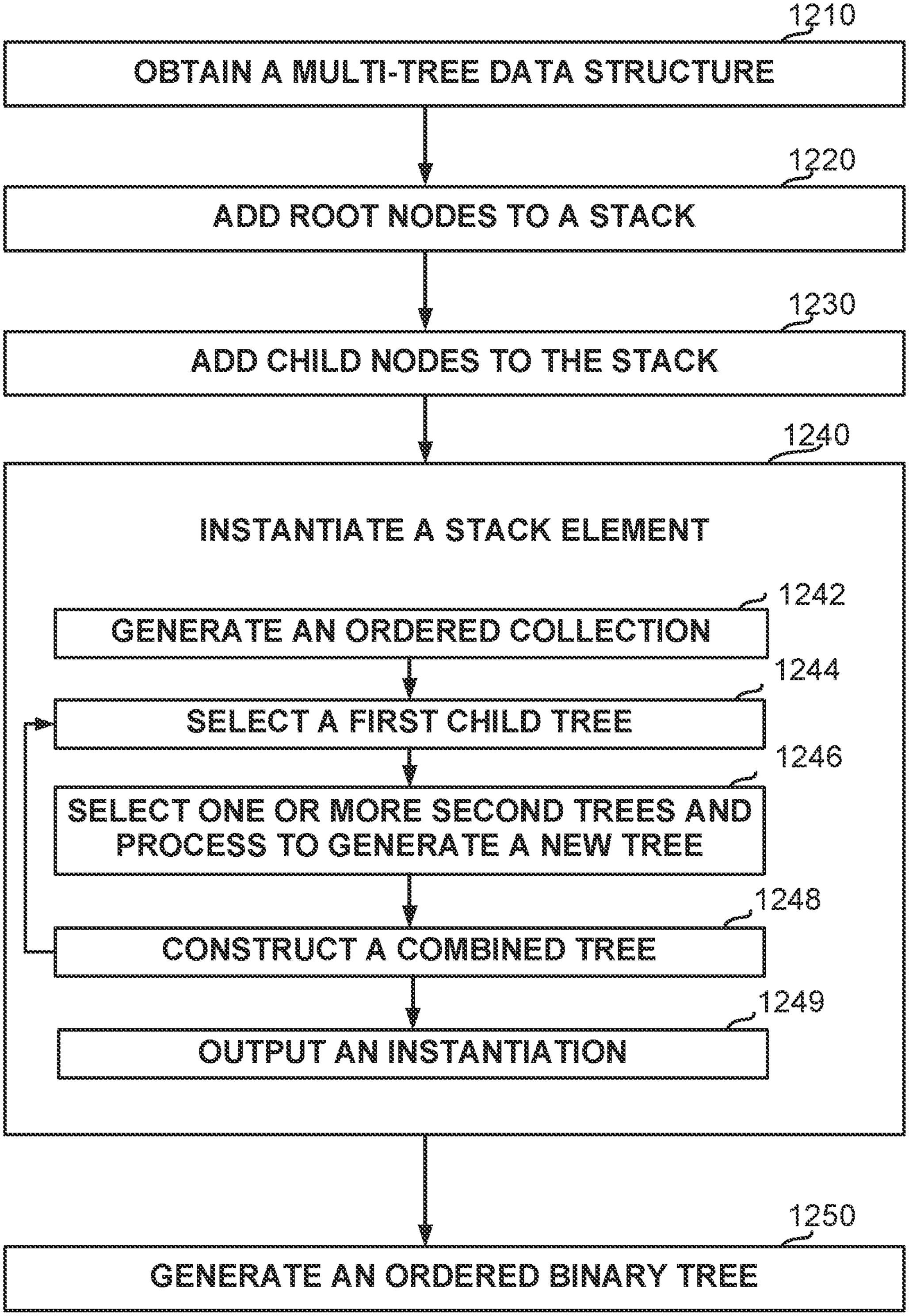

In some exemplary embodiments, FIG. 9A depicts an exemplary Ordered Binary Tree 900, which may be produced based on a multitree data structure, e.g., as described in FIG. 12. In some exemplary embodiments, Ordered Binary Tree 900 may comprise nodes, e.g., Nodes 930, 932, 934, and 936. In some exemplary embodiments, FIG. 9B depicts a Quantum Circuit 950 that is build, or synthesized, according to Ordered Binary Tree 900. In some exemplary embodiments, the nodes of Ordered Binary Tree 900 may represent gates in Quantum Circuit 950, while the leaf nodes of Ordered Binary Tree 900 may represent basis changes of qubits in Quantum Circuit 950.

In some exemplary embodiments, two edges may exit each node, one of which representing a control qubit of Quantum Circuit 950 and one of which representing a target qubit of Quantum Circuit 950. For example, in FIG. 9A, the control qubits may be marked by dotted edges, e.g., Edges 903, 907, 909, and 913, while the target qubits may be marked by dashed edges, e.g., Edges 901, 911, 915, and 917. In other cases, any other pattern, marking, or order may be used to indicate which edge represents a control qubit and which edge represents a target qubit. For example, all edges going left may represent a control qubit and all edges going right may represent a target qubit, or vice versa. It is noted that when two qubit are manipulated by a gate, a qubit that does not hold a result of the gate manipulation may be referred to as a control qubit, while a qubit that does hold the result of the gate manipulation may be referred to as a target qubit.

In some exemplary embodiments, in order to create Quantum Circuit 950 from Ordered Binary Tree 900, or convert Ordered Binary Tree 900 to Quantum Circuit 950, the leaf edges of Ordered Binary Tree 900 may be first used as the basis changes of qubits of Quantum Circuit 950. For example, Leaf Nodes 960-964 of Ordered Binary Tree 900 may be converted to basis changes of Qubits 970-974 in Quantum Circuit 950.

In some exemplary embodiments, gates may be placed in Quantum Circuit 950 according to tree levels of nodes in Ordered Binary Tree 900. For example, a synthesizer may analyze Ordered Binary Tree 900 bottom up, from top to bottom, or the like. In the scenario of FIG. 9B, a bottom up analysis may be performed, beginning with the lowest Node 936, from which Edges 913 and 915 flow to Leaf Nodes 963 and 961, respectively (Corresponding to Qubits 971 and 973 of Quantum Circuit 950). According to this example, a gate, e.g., Gate 937, that manipulates the corresponding Qubits 971 and 973, may be placed in Quantum Circuit 950. In some cases, since Edge 913 may be dotted and Edge 915 may be dashed, Qubit 973 may be the control qubit of Gate 937 and Qubit 971 may be the target qubit of Gate 937.

In some exemplary embodiments, in the next level of hierarchy in Ordered Binary Tree 900. Nodes 932 and 934 may be found. Edges 909 and 911 may flow from Node 932 to Leaf Nodes 962 and 964, respectively, and Edges 907 and 917 may flow from Node 934 to Leaf Node 960 and to Node 936. According to this example, a first gate, e.g., Gate 933, that manipulates the corresponding Qubits 972 and 974, may be placed in Quantum Circuit 950, in parallel with a second gate, e.g., Gate 935, that manipulates the Qubit 970 and the target qubit of Gate 937 (e.g., which corresponds to Node 936 of Ordered Binary Tree 900), e.g., Qubit 970. In some cases, the target qubit of Gate 933 may be Qubit 974, and the target qubit of Gate 935 may be Qubit 970, e.g., since both Edges 911 and 917 may be dashed.

In some exemplary embodiments, in the next level of hierarchy in Ordered Binary Tree 900, the root node, e.g., Node 930, may be found. Edges 901 and 903 may flow from Node 930 to Nodes 932 and 934, respectively. According to this example, another gate, e.g., Gate 931, that manipulates the target qubits of Gates 933 and 935 (e.g., which corresponds to Nodes 932 and 934 of Ordered Binary Tree 900), Qubits 974 and 970, respectively, may be placed in Quantum Circuit 950. In some cases, since Edge 901 may be dashed, the target qubit of Gate 931 may be Qubit 974.

Yet another technical solution provided by the disclosed subject matter comprises determining an order, referred to as scheduling, between a plurality of Pauli-terms, in a manner that increases gate cancellations, reduces resource usages (e.g., cycles) of corresponding implementations, or the like. In some exemplary embodiments, it may be desired to determine an order between Pauli-terms, such that a multitree data structure that is generated based on the Pauli-terms, in their determined order, is enhanced. In some cases, an enhanced multitree data structure may refer to a multitree data structure that represents a quantum circuit with reduced number of gates, and may be synthesized to a resource conserving quantum circuit.

In some exemplary embodiments, optimal or nearly optimal scheduling of Pauli-terms may enable to reduce a number of gates in the quantum implementation of the Pauli-terms. For example, as depicted in FIG. 3A, ordering the Pauli-term “XYZ” before Pauli-term “IYL” enables to cancel out gates of Portion 330 (e.g., basis change gates such as gates of FIG. 2), which further enables to cancel CX gates of Portions 336 and 338 (FIG. 3C).

In some exemplary embodiments, a scheduling scheme may be configured to schedule the Pauli-terms. In some exemplary embodiments, the scheduling scheme may be configured to utilize a pair-based algorithm, e.g., in order to determine an optimal or nearly optimal order between two ordered collection of Pauli-terms. In some exemplary embodiments, a pair-based algorithm may comprise any scheduling algorithm that is configured to determine, for two ordered collection of Pauli-terms, whether or not they should be concatenated to form a larger ordered collection. In some exemplary embodiments, candidates for concatenation may comprise any subset of the set of all possible pairs of Pauli-terms, a selected subset with higher priority, or the like.

An exemplary pair-based algorithm is disclosed in G. Li, Paulihedral: A Generalized Block-Wise Compiler Optimization Quantum Simulation Kernels. arXiv: 2109.03371 (September 2021), in which Pauli-terms are collected into sets referred to as ‘blocks’, and then two decisions are made. An ordered collection of blocks is greedily created, by iteratively analyzing some blocks as candidates for being appended to the ordered collection. A second decision that is made include ordering the Pauli-terms within each block.

In some cases, the pair-based algorithm may utilize the multitree data structure, as defined herein, in order to perform the scheduling, to assist the scheduling scheme in its calculations, or the like. For example, the defined multitree data structure may be used by the pair-based algorithm in order to determine an optimal or nearly optimal order between two ordered collection of Pauli-terms. In some exemplary embodiments, the pair-based algorithm may determine whether or not two groups of one or more Pauli-terms should be concatenated according to effects of the concatenation on the resulting multitree data structures, e.g., as described in FIG. 13, on resulting quantum circuits, or the like.

As a first example, the pair-based algorithm may obtain two groups of one or more Pauli-terms, and generate a shared multitree data structure that implements both groups of Pauli-terms. In addition, the pair-based algorithm may generate separate multitree data structures for each group of Pauli-terms. According to this example, based on a number of resources (e.g., CX gates) that is saved by using the shared multitree data structure, compared to using separate multitree data structures, the groups of Pauli-terms may be determined to be or not to be concatenated. In some cases, a threshold may be set to determine whether the difference is resources is significant. For example, in case the threshold is set to three, the shared multitree data structure utilizes ten CX gates, and the separate multitree data structures utilize, together, twenty CX gates, the Pauli-terms may be determined to be concatenated. In other cases, any other pair-based algorithm may be used to determine whether or not two groups of one or more Pauli-terms should be concatenated.

As a second example, the pair-based algorithm may obtain two groups of one or more Pauli-terms, and determine whether or not they should be concatenated based on a predicted or measured depth of associated quantum circuits. For example, an abstract CX-tree may be generated for each Pauli-term candidate, e.g., according to the methods of FIGS. 11-12, and the CX-tree may be used to construct a respective quantum circuit, e.g., according to FIGS. 9A-9B. According to this example, two separate quantum circuits may be generated separately for the Pauli-term candidates, and a single quantum circuit may be generated for both Pauli-term candidates. According to this example, a depth (e.g., a number of cycles) of each generated circuit may be measured, and the groups of Pauli-terms may be determined to be or not to be concatenated based on a number of resources (e.g., cycles) that is saved by using the shared quantum circuit, compared to using separate quantum circuits. In other cases, instead of measuring a depth of resulting quantum circuits, a predictor may be trained to predict, for a Pauli-term candidate, a depth of its associated quantum circuit, and the predictions may be used instead of depth measurements. For example, the predictor may be trained on a dataset that comprises Pauli-terms that are labeled with a depth of the respective quantum circuit.

In other cases, any other method or combination of methods may be used to determine whether or not two groups of one or more Pauli-terms should be concatenated. For example, a weighted combination of the first and second examples, relating both to the gates and to the circuit depth, may be used to determine whether or not two groups of one or more Pauli-terms should be concatenated.

In some exemplary embodiments, the pair-based algorithm may be utilized in one or more manners. In one scenario, an order between the plurality of Pauli-terms may be determined by generating a candidate list with the plurality of Pauli-terms. On each iteration, pairs of elements in the candidate list may be sent to the pair-based algorithm. In case that the pair-based algorithm indicates that a pair of Pauli-terms should be concatenated, both Pauli-terms may be removed from the candidate list, and replaced with a concatenation of the pair of Pauli-terms. In any subsequent iteration, the remaining elements in the candidate list may be paired and sent to the pair-based algorithm, until a single element that comprise a concatenation of the plurality of Pauli-terms remains in the candidate list.

In a second scenario, instead of sending all possible pairs of Pauli-term elements in the candidate list, Pauli-term elements may be sent according to one or more priority scores that may be assigned to each candidate Pauli-term element. In some exemplary embodiments, priority scores may be used to select candidates to the pair-based algorithm, to determine an order of sending the candidates to the pair-based algorithm, or the like. In some exemplary embodiments, any prioritization may be defined in constructing the set of candidates. In some exemplary embodiments, priority scores may be determined based on heuristics, a gate cancellation predictor, a classifier, randomly, a scheduling algorithm, or the like. For example, partially overlapping Pauli-terms, which comprise matching active qubits with the same basis change gates, may be prioritized and sent to the pair-based algorithm before Pauli-terms that have no overlap in their active qubits. According to this example, since Pauli-terms that do not share active qubits may not be affected by the multitree data structures, concatenating them may not result with mutual gate cancellations. Aa another example, longest Pauli-terms, which comprise a greatest number of active qubits, may be prioritized and sent to the pair-based algorithm before Pauli-terms that have a lesser number of active qubits.

In a third scenario, each Pauli-term may be implemented by a corresponding multitree data structure, and the priority scores may be assigned to the multitree data structures, or based thereon, e.g., according to a size of the multitree data structures, according to a number of child nodes of each non-leaf node in the multitree data structure. According to the third scenario, Pauli-terms associated with high priority multitree data structures may be prioritized and sent to the pair-based algorithm before Pauli-terms that are associated with lower priority multitree data structures.

One technical effect obtained by the disclosed subject matter is enabling to reduce resources that are used for implementing an exponentiation module. For example, the disclosed subject matter enables to utilize a multitree data structure in order to increase gate cancellations of parity summations in a quantum circuit that implements the exponentiation module, for any quantum implementation that adheres to the multitree data structure. The disclosed subject matter may provide, for Pauli-terms from which the exponentiation module is comprised, a generated quantum circuit that has an increased number of mutual gate cancellations (e.g., compared to other circuits implementing the exponentiation module), that is smallest in size (e.g., including less gates and cycles than other circuits implementing the exponentiation module), or the like.

In some exemplary embodiments, any quantum implementation of the multitree data structure may have a same fixed gate-count that does not depend on the specific implementation of the multitree data structure, e.g., due to the adherence to the additional, exhaustiveness and succinecy requirements. Executing the resulting quantum circuit may be resource conserving compared to executing other quantum circuits that implement the same Pauli-terms of the exponentiation module, at least since the resulting quantum circuit may enable to cancel out various gates from parity summation stages, e.g., similarly to FIG. 3C.

Another technical effect obtained by the disclosed subject matter is enabling to reduce resources that are used for implementing an exponentiation module, due to an enhanced selection of an order between Pauli-terms that define the exponentiation module. The disclosed subject matter enables to select, for each Pauli-term that constitutes the exponentiation module, a circuit implementation, and select an order between the circuit implementations. For example, the disclosed subject matter provides one or more methods, such as the method of FIG. 13, which enable to select an optimal or nearly optimal order between Pauli-terms. For example, implementing the determined order may result with an ordered set of Pauli-terms that can be synthesized to a resource conserving quantum circuit, which may cancel out basis change gates from basis change stages of the exponentiation module, e.g., similarly to FIG. 3A.

Yet another technical effect obtained by the disclosed subject matter is providing an architecture for implementing an exponentiation module, which may be used by various quantum algorithms, programs, or the like. In some exemplary embodiments, the platform may be used to optimize modules that are based on the exponentiation module, the Hamiltonian simulation, or the like. Utilizing the disclosed subject matter, an exponentiation module may be enhanced, such as by enabling the exponentiation module to utilize less resources, have a faster execution, or the like.

Yet another technical effect obtained by the disclosed subject matter is enabling to construct, for any set of Pauli-terms, a compliant multitree data structure that can be used to synthesize a resource conserving quantum circuit, e.g., in which CX gates may be cancelled in some scenarios.

Yet another technical effect obtained by the disclosed subject matter is enabling to construct, for any multitree data structure, a respective ordered binary tree that reduces the number of cycles of the associated quantum circuit. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 10:
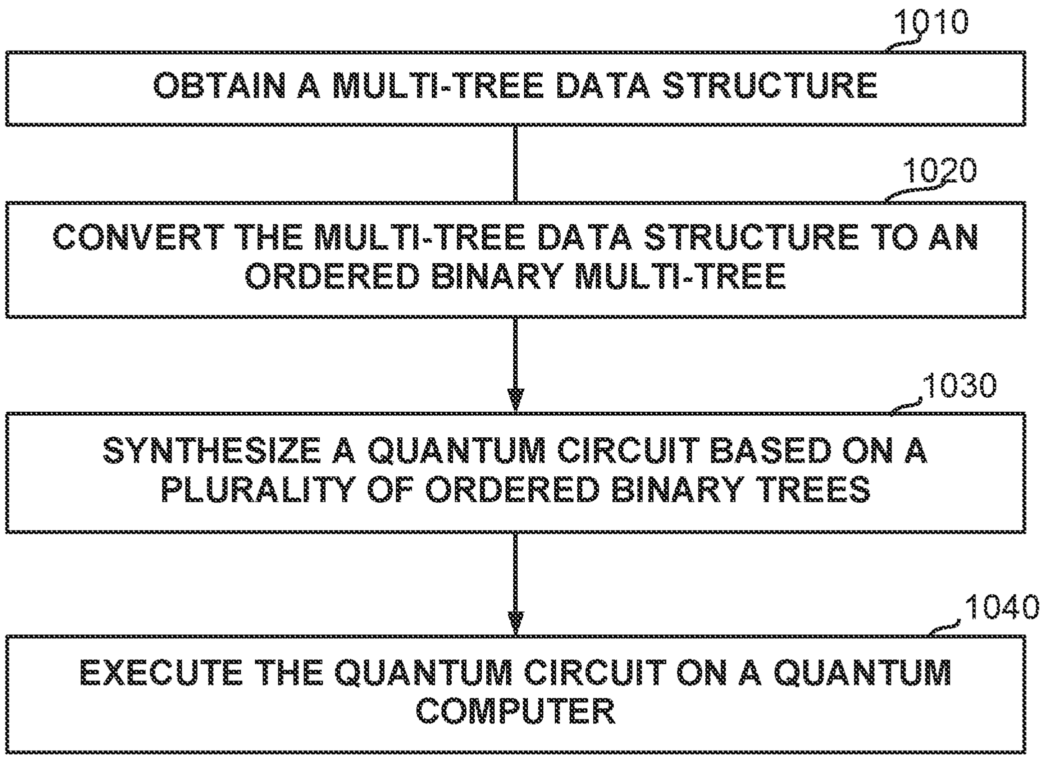
FIGS. 10-13 depict exemplary flowchart diagrams of methods, in accordance with some exemplary embodiments of the disclosed subject matter.

Referring now to FIG. 10, showing an exemplary flowchart diagram of a method, in accordance with some exemplary embodiments of the disclosed subject matter.

On Step 1010, a multitree data structure that represents a plurality of ordered Pauli-terms may be obtained, determined, generated, or the like. In some exemplary embodiments, the plurality of ordered Pauli-terms may be ordered according to a defined order, e.g., determined locally, obtained from a server, obtained via a user interface, or the like. In some exemplary embodiments, the plurality of ordered Pauli-terms may represent an exponentiation module, and may be associated with a plurality of qubits. In some exemplary embodiments, each Pauli-term of the plurality of ordered Pauli-terms may define at least one active qubit from the plurality of qubits, e.g., a qubit represented by a Pauli-operator that is not “I”.

In some exemplary embodiments, a Pauli-term of the plurality of ordered Pauli-terms may be represented by a parameter t and a string that defines for each qubit of the plurality of qubits a Pauli operator selected from: “X”, “Y”, “Z”, and “I”. For example, a Pauli-term may be represented as “YXX”, indicating three active qubits of type “Y”, “X”, and “X”, and indexes 0, 1, and 2 (indicating an order between the qubits). In some exemplary embodiments, the string may define, for at least one qubit, a Pauli-operator that is not “I”, e.g., thereby including at least one active qubit.

In some exemplary embodiments, implementing a Pauli-term in a quantum circuit may require to implement a basis change stage of active qubits of the exponentiation module according to their respective Pauli-operators, and to implement a parity summation stage of the active qubits in the exponentiation module. In some exemplary embodiments, the parity summation stage may comprise at least one CX gate that is used to manipulate the at least one active qubit. For example, pairs of active qubits may be manipulated, during the parity summation stage, by at least one CX gate.

In some exemplary embodiments, the multitree data structure may comprise a plurality of root nodes representing the plurality of Pauli-terms, respectively, and a plurality of leaf nodes representing the plurality of qubits, respectively. In some exemplary embodiments, the multitree data structure may comprise at least one non-leaf node representing a subset of active qubits of a parent node, e.g., a parent of the non-leaf node. In some exemplary embodiments, every leaf node that represents an active qubit of a given Pauli-term may be required to be a descendant of a root node that represents the given Pauli-term. In some exemplary embodiments, every non-leaf node of the multitree data structure may be required to form a connected tree that comprises all descendants of the non-leaf node.

On Step 1020, the multitree data structure may be converted to an ordered binary multitree, e.g., in case that the multitree data structure does not already constitute an ordered binary tree. For example, in case that the multitree data structure has a form of an ordered binary multitree, Step 1020 may be omitted.

In some exemplary embodiments, in case a conversation is performed, the ordered binary multitree may be converted to an ordered binary multitree according to the method of FIG. 12. For example, the ordered binary multitree may generated to comprise a thickened version of the multitree data structure, e.g., obtained by thickening the multitree data structure. In some exemplary embodiments, the ordered binary multitree may comprise at least the plurality of leaf nodes, the plurality of root nodes, and the non-leaf node of the multitree data structure. In some exemplary embodiments, every node of the multitree data structure may correspond to a respective node in the ordered binary tree. In some exemplary embodiments, the ordered binary multitree may comprise at least one additional node that is not included in the multitree data structure.

In some exemplary embodiments, the conversion may comprise replacing two sibling nodes with a single parent node and connecting the two sibling nodes as child nodes of the single parent node. In some exemplary embodiments, the at least one additional node may comprise the single parent node. In some exemplary embodiments, every root node of the ordered binary multitree and its descendants may define a respective ordered binary tree, whereby defining a plurality of ordered binary trees.

In some exemplary embodiments, converting the multitree data structure to the ordered binary multitree may comprise iteratively adding non-leaf nodes to the ordered binary multitree for every two nodes in the multitree data structure that share more than one child node.

On Step 1030, a quantum circuit may be synthesized based on a plurality of ordered binary trees of the ordered binary multitree. For example, the quantum circuit may comprise a gate-level representation of a circuit, a functional-level representation of a circuit, or the like.

In some exemplary embodiments, a plurality of ordered binary trees in the ordered binary multitree may be processed as a set of CX trees, in order to synthesize a quantum circuit that represents the Pauli-terms. In some exemplary embodiments, synthesizing the quantum circuit may comprise interpreting each ordered binary tree of the plurality of ordered binary trees as a representation of a quantum program.

In some exemplary embodiments, a quantum circuit that is generated, or synthesized, based on the multitree data structure, may utilize the active qubits of each Pauli-term. In some exemplary embodiments, every non-leaf node of the ordered binary multitree may correspond to a gate of a quantum circuit. In some exemplary embodiments, non-leaf nodes of the binary tree may represent CX gates of the quantum program, and leaf nodes of the binary tree may represent basis changes of the quantum program. In some exemplary embodiments, edges of the binary tree may represent a target or a control of a CX gate, whereby the quantum program represents an implementation of the parity summation stage and an implementation of the basis change stage.

In some exemplary embodiments, synthesizing the quantum circuit may comprise interpreting the plurality of ordered binary trees as a plurality of respective representations of quantum programs, and synthesizing the quantum circuit from the plurality of respective representations of the quantum programs. In some exemplary embodiments, the quantum circuit may implement the exponentiation module using a small number of the CX gates. For example, CX gates may cancel out each other, resulting with a quantum circuit with a reduced gate count.

On Step 1040, the quantum circuit may be executed on a quantum computer, a simulator, or the like. For example, the conversion of the multitree data structure to an ordered binary multitree may be performed on classical computer, as well as the synthesis of the quantum circuit, while the quantum circuit may be executed on a quantum computer.

Referring now to FIG. 11, showing an exemplary flowchart diagram of a method, in accordance with some exemplary embodiments of the disclosed subject matter.

On Step 1110, a plurality of Pauli-terms may be obtained. In some exemplary embodiments, the plurality of Pauli-terms may be ordered according to a defined order, e.g., obtained from a third party, determined locally (e.g., according to the method of FIG. 13), or the like. For example, the defined order may be stored in a multi-directed graph, or in any other temporary or non-temporary data structure.

In some exemplary embodiments, the plurality of Pauli-terms may be associated with a plurality of qubits. In some exemplary embodiments, each Pauli-term of the plurality of Pauli-terms may define at least one active qubit from the plurality of qubits, e.g., represented by a corresponding Pauli operator. In some exemplary embodiments, a qubit of a Pauli-term of the plurality of Pauli-terms may be considered an active qubit of the Pauli-term in case that the qubit is not marked by the Pauli-term as an identity gate, e.g., by the Pauli operator "r".

In some exemplary embodiments, in order to construct multitree data structure representing the plurality of Pauli-terms, Steps 1120 and 1130 may be performed.

On Step 1120, an auxiliary graph may be generated, determined, constructed, or the like, to represent the plurality of Pauli-terms. For example, the auxiliary graph may constitute a DAG, or any other type of diagram, data structure, or the like. In some exemplary embodiments, the auxiliary graph may be constructed to comprise a plurality of graph nodes that represent the plurality of Pauli-terms, respectively. In some exemplary embodiments, the plurality of graph nodes may be ordered consecutively according to the defined order, e.g., without overlapping node portions. In some exemplary embodiments, each Pauli-term may be placed on its native qubits, according to their order, index, or the like. For example, the Pauli-Term "IIIIX" relates to a qubit with index four (when counting from zero), and a graph node representing the Pauli-Term "IIIIX" may be placed in the qubit of index four. In other cases, the graph nodes may be set in any other manner.

In some exemplary embodiments, the auxiliary graph may be constructed to represent interfaces between consecutive graph nodes. For example, in case first and second consecutive graph nodes of the plurality of graph nodes represent first and second Pauli-terms from the plurality of Pauli-terms, then an interface between the first and second consecutive graph nodes may comprise qubits that are active in the first Pauli-term and in the second Pauli-term. As another example, in case a qubit of a same index and a same Pauli operator (e.g., "X") is included in both first and second Pauli-terms, the qubit may be included in an interface between the respective graph nodes. In some exemplary embodiments, nodes may be considered consecutive with respect to one or more qubits, in case no other node separates the one or more qubits. For example, in case a first node in the auxiliary graph represents six qubits, and a second node represents two qubits, then the second node may be considered consecutive only with respect to the two qubits. According to this example, a third node that relates to the remaining four qubits may be considered consecutive with respect to these qubits, and an interface between the first and third node may be established.

On Step 1130, a multitree data structure may be generated, e.g., by a classical computer. In some exemplary embodiments, the multitree data structure may be generated based on the auxiliary graph, e.g., according to Steps 1132-1140.

In some exemplary embodiments, the multitree data structure may be generated by first generating a plurality of root nodes of the multitree data structure. In some exemplary embodiments, the plurality of root nodes may represent the plurality of Pauli-terms, respectively. In some exemplary embodiments, a candidate list that represents the interfaces between consecutive node portions of the auxiliary graph may be generated, determined, or the like. For example, the candidate list may be stored in a sorted dictionary, a stack, or in any other data structure. According to this example, the interfaces may be sorted according to a size parameter, e.g., indicating a number of active qubits in each respective interface.

On Step 1132, a widest interface from the candidate list may be selected, e.g., having a greatest number of active qubits compared to remaining candidate interfaces. In some exemplary embodiments, the widest interface may represent a largest number of active qubits compared to any remaining interface in the candidate list.

On Step 1134, a new interface node may be added to the multitree data structure. In some exemplary embodiments, the new interface node may represent the widest interface that was selected from the candidate list.

In some exemplary embodiments, the auxiliary graph may be utilized to determine that the widest interface is located between first and second graph nodes of the auxiliary graph, which represent first and second respective Pauli-terms. In some exemplary embodiments, based on this determination, or based on any other analysis, a position of new interface node with respect to the remaining nodes of the multitree data structure may be determined. For example, in case the remaining nodes of the multitree data structure comprise first and second root nodes that represent the first and second respective Pauli-terms, the new interface node may be configured to be positioned as a descendant node of the first and second root nodes. In some cases, a position of the new interface node may be determined so as to have a greatest distance as possible from the first root node and from the second root node, as long as the parent nodes of the new interface node comprise all active qubits of the widest interface. In this scenario, during a first iteration of the construction of the multitree data structure, the new interface node may be positioned as a direct child of the first and second root nodes, e.g., at least since in the first iteration there may not be any non-root nodes.

On Step 1136, the widest interface may be removed from the candidate list.

On Step 1138, prior to removing the widest interface, or subsequently thereto, an analysis may be performed to determine whether the remaining candidate interfaces in the candidate list are consistent with the widest interface. In some exemplary embodiments, the analysis may be performed iteratively, e.g., on all remaining candidate interfaces. In some exemplary embodiments, a candidate interface may be considered consistent with the widest interface, in case it does not share one or more first qubits with the widest interface, while not sharing one or more second qubits with the widest interface.

For example, in response to a determination that the widest interface shares one or more active qubits with a second interface of the candidate list, and that the second interface comprises one or more remaining active qubits that are excluded from the widest interface, the second interface may be determined to be inconsistent with the widest interface, and may be split into two candidate interfaces. According to this example, the two candidate interfaces may comprise a first candidate interface that represents the one or more active qubits, and a second candidate interface that represents the one or more remaining active qubits of the second interface, both of which may be consistent with the widest interface. According to this example, the candidate list may be modified to comprise the two candidate interfaces and to exclude the second interface. In some exemplary embodiments, all candidate interfaces in the candidate list may be analyzed, e.g., iteratively, to identify whether or not they should be split. For example, the candidate interfaces may be analyzed in a defined order, such as according to the size parameter.

As another example, in case that the widest interface shares an active qubit with a third interface of the candidate list, and the third interface does not comprise any active qubits that are excluded from the widest interface, the third interface may be considered consistent with the widest interface, and may retained without being split into two separate candidate interfaces. According to this example, the third interface may not be modified in the candidate list.

In some exemplary embodiments, Steps 1132-1138 may be performed iteratively, until the candidate list is empty. For example, in each iteration, a widest interface may be selected from the candidate list, and Steps 1132-1138 may be performed with respect to the newly selected widest interface.

On Step 1140, in response to a determination that the candidate list is empty, the nodes of the multitree data structure may be analyzed to determine whether or not all active qubits of the each node are represented by descendant nodes of the node. In some exemplary embodiments, in case an active qubit of the each node is not represented by any of the descendant nodes, a leaf node representing the active qubit may be added to the multitree data structure. In some exemplary embodiments, the leaf node may be added as a child node of the analyzed node.

In some exemplary embodiments, the nodes of the multitree data structure may be analyzed iteratively, from a top of the multitree data structure and downwards, or according to any other order, to determine whether all active qubits of each node are represented by descendant nodes of the node. For example, the nodes may be traversed according to a DFS. In some exemplary embodiments, leaf nodes may be added in each iteration, e.g., if required.

In some exemplary embodiments, the resulting multitree data structure may be an advantageous data structure that, by construction, may represent an implementation of the Pauli-terms that includes a cancelation of one or more CX gates. In some exemplary embodiments, the resulting multitree data structure may represent a selection of CX gates that are cancelled, as such CX gates will never be created for any implementation of the multitree data structure. In some exemplary embodiments, the gate cancellation may be enabled since the multitree data structure may comply with one or more advantageous requirements such as the exhaustiveness requirement. For example, resulting multitree data structure may not have two nodes that share more than one child node, may not have a non-leaf node that has exactly one parent node, and every root node may be an ancestor of all its active qubits.

In some exemplary embodiments, based on the multitree data structure, a quantum circuit may be synthesized, e.g., according to FIG. 12. In some exemplary embodiments, the quantum circuit may implement an exponentiation module represented by the plurality of Pauli-terms, with a reduced number of CX gates. In some exemplary embodiments, the quantum circuit may be executed on a quantum compute, e.g., similarly to Step 1040 of FIG. 10. In some exemplary embodiments, since the number of CX gates of the parity summation stage may be reduced, the execution of the quantum circuit may be resource conserving.

In some exemplary embodiments, the method of FIG. 11 may be represented by an exemplary algorithm, e.g., in a generalized non-limiting form, as follows:

1. Initialize the multitree data structure with one root node for each Pauli-term.
2. Consider as candidate interfaces all maximal interfaces between all neighboring Pauli-term roots, as represented by the auxiliary graph.
3. Repeat for all candidate interfaces:
   a. Select the widest interface between first and second Pauli-terms from the candidate interfaces.
   b. Add a new node as a descendant of first and second root nodes that represent the first and second Pauli-terms.
   c. Remove the widest interface from the candidate interfaces.
   d. Repeat for all remaining candidate interfaces:
      i. If a candidate interface has overlapping qubits with the widest interface, and at least one non-overlapping qubit, split the candidate interface into two candidate interfaces: a first candidate interface that includes the overlapping qubits, and a second candidate interface that includes the non-overlapping qubit. This may ensure that all candidates interfaces are consistent with the multitree data structure, and are eligible candidates.

4. For each active qubit of a node that is not an active qubit of any of its child nodes, add a leaf node representing the active qubit directly to the node.

In some cases, the candidate interfaces may be stored in a sorted dictionary, or in any other data structure, by an order of their sizes. In some cases, the adjacency, or order, of the Pauli-terms, may be stored in a multi-directed graph, or in any other data structure. In such scenarios, a runtime complexity may be bound to O(N*log(N)).

In some exemplary embodiments, one or more alternative algorithms, techniques, or the like, may be used to construct the multitree data structure. For example, while the above algorithm adds leaf nodes at an ending stage of the algorithm, a second algorithm may be configured to add leaf nodes at each stage of the construction, thereby generating a multitree data structure that is valid throughout the construction stages. In some exemplary embodiments, the second algorithm may correspond to the above algorithm, with some changes. For example, according to the second algorithm, after generating the root nodes of the multitree data structure, leaf nodes may be generated for each root node according to its active qubits. As another example, after generating the new interface node and placing the new node in the multitree data structure, leaf nodes representing the active qubits in the widest interface may be added as child nodes of the new interface node, e.g., by moving the respective leaf nodes from their previous positions to become child nodes of the new interface node, by removing the leaf nodes from the multitree data structure and reconstructing them as child nodes of the new interface node, or the like.

For example, the second algorithm may be represented by an exemplary algorithm, e.g., in a generalized non-limiting form, as follows:

1. Initialize the multitree data structure with one root node for each Pauli-term.
2. For each active qubit of a root node, add a respective leaf node as a child node of the root node.
3. Consider as candidate interfaces all maximal interfaces between all neighboring Pauli-term roots, as represented by the auxiliary graph.
4. Repeat for all candidate interfaces:
   a. Select the widest interface between first and second Pauli-terms from the candidate interfaces.
   b. Add a new node as a descendant of first and second root nodes representing the first and second Pauli-terms.
   c. Add leaf nodes for respective active qubits of the widest interface, as children of the new node.
   d. Remove the leaf nodes as children of the first and second root nodes.
   e. Remove the widest interface from the candidate interfaces.
   f. Repeat for all remaining candidate interfaces:
      i. If a candidate interface has overlapping qubits with the widest interface (which was removed on Step e.), and at least one non-overlapping qubit, split the candidate interface into two candidate interfaces: a first candidate interface that includes the overlapping qubits, and a second candidate interface that includes the non-overlapping qubit. This may ensure that all candidates interfaces are consistent with the multitree data structure, and are eligible candidates.

Referring now to FIG. 12, showing an exemplary flowchart diagram of a method, in accordance with some exemplary embodiments of the disclosed subject matter.

On Step 1210, a multitree data structure that represents a plurality of Pauli-terms may be obtained. In some exemplary embodiments, the plurality of Pauli-terms may represent an exponentiation module. In some exemplary embodiments, the plurality of Pauli-terms may be associated with a plurality of qubits. In some exemplary embodiments, the multitree data structure may comprise a compliant multitree data structure, e.g., which comprises a plurality of root nodes representing the plurality of Pauli-terms, respectively, and a plurality of leaf nodes representing the plurality of qubits, respectively. In some exemplary embodiments, every leaf node that represents a qubit of a Pauli-term may be a descendant of a root node that represents the Pauli-term, and every non-leaf node of the multitree data structure may form a connected tree that comprises all descendants of the non-leaf node.

On Step 1220, in order to convert the multitree data structure to an ordered binary multitree, a software stack, or any other data structure, may be generated. In some exemplary embodiments, the stack may be initialized with representations of the plurality of root nodes of the multitree data structure, to thereby obtaining a stack with candidate nodes.

In some exemplary embodiments, the candidate nodes may be iteratively analyzed, to determine whether the candidate nodes have one or more child nodes in the multitree data structure that are not instantiated.

On Step 1230, upon identifying a candidate node that has at least one child node in the multitree data structure that is not instantiated, representations of the at least one child node may be added, or inserted, into the stack. In some exemplary embodiments, the representations of the at least one child node may be inserted to the stack in any order. In some exemplary embodiments, after adding to the stack the representations of the at least one child node, a next candidate node in the stack may be inspected, until reaching a candidate node that does not have one or more child nodes in the multitree data structure that are not instantiated.

On Step 1240, upon reaching a candidate node that has one or more child nodes in the multitree data structure that are not instantiated, the candidate node may be instantiated, e.g., according to Steps 1242-1249. In case the candidate node has no child nodes at all, the candidate node may be instantiated by returning the candidate node.

On Step 1242, upon determining that all child nodes of the candidate node are instantiated, an ordered collection may be generated. In some exemplary embodiments, the ordered collection may be generated to comprise all child trees of the candidate node, each one as a separate element in the ordered collection. In some exemplary embodiments, the elements of the ordered collection may be ordered according to keys of the one or more trees. In some exemplary embodiments, a sorting algorithm may be used for ordering the elements of the ordered collection according to the scores of the elements, as determined by defined keys. For example, the keys may define the score of an element according to its width. In some exemplary embodiments, a width of a tree may comprise a maximal width of a full binary tree that corresponds to the tree. In some exemplary embodiments, a score of a tree may be based on a maximal depth of paths of the tree, and on an assigned weight of a leaf of a path of the tree. In other cases, the ordered collection may be ordered in any other way, according to any parameters, keys, weights, or the like.

In some exemplary embodiments, in case that the ordered collection comprises a single child tree, the single tree may be instantiated by outputting the single tree. In some exemplary embodiments, in case the ordered collection comprises two or more trees, an iterative process may be performed by Steps 1244-1248. Otherwise, Steps 1244-1248 may be omitted.

On Step 1244, a first child tree may be selected from the ordered collection. In some exemplary embodiments, the first child tree may be ordered first in the ordered collection, as having a highest score. For example, the first child tree may have a largest weight compared to remaining trees of the ordered collection, or may score highest according to any other key or scoring method. In some exemplary embodiments, the first child tree may be removed from the ordered collection, and added as a first child node of a newly generated root node of a new binary tree.

On Step 1246, one or more second child trees of the ordered collection may be selected, as having the highest scores compared to the remaining elements in the ordered collection. In some exemplary embodiments, the one or more second trees may be ordered subsequently to the first tree in the ordered collection as having second highest scores. In some exemplary embodiments, the one or more second trees may be selected in case that a sum of widths of the one or more second trees is lesser or equal than a width of the first child tree. In some exemplary embodiments, the one or more second trees may be removed from the ordered collection.

In some exemplary embodiments, in case the one or more second trees comprise a single child tree, the method may directly flow to Step 1248. In some exemplary embodiments, in case the one or more second trees comprise a plurality of child trees, the one or more second trees may be converted to an auxiliary ordered binary tree. In some exemplary embodiments, converting the one or more second trees to the auxiliary ordered binary tree may comprise considering the one or more second trees as an auxiliary ordered collection, as performed on Step 1242, and applying Steps 1244-1249 on the auxiliary ordered collection, thereby obtaining a single auxiliary ordered binary tree. In some exemplary embodiments, the auxiliary ordered binary tree may be added as a second child node of the new root node of the new binary tree.

On Step 1248, the new binary tree, which is formed from the first child tree and the one or more second child trees, may be added to the ordered collection, e.g., as a single element. In some exemplary embodiments, adjusted ordered collection may be processed iteratively, according to Steps 1242-1248, until the ordered collection retains a single element, e.g., a binary tree that is constructed from all of the original elements.

On Step 1249, in case a single element remains in the ordered collection, the single element comprising a binary tree that is constructed from all of the original elements of the ordered collection, the single element may be outputted as an instantiation of the inspected candidate node.

In some exemplary embodiments, the stack may be continually inspected, iterating over all candidate elements, until the stack is empty. For example, in case a candidate element in the stack was already instantiated, the candidate element may be removed from the stack. In other cases, the stack may be continually inspected until all root nodes are marked as instantiated.

On Step 1250, an ordered binary multitree may be created by replacing each root node of the multitree data structure with its instantiation. In some cases, the ordered binary multitree may be created by replacing each child node of a root node of the multitree data structure, with its instantiation.

In some exemplary embodiments, the resulting ordered binary multitree may be maximally imbalanced amongst all trees with a minimum depth. In some exemplary embodiments, the ordered binary multitree may comprise a plurality of ordered binary trees. In some exemplary embodiments, each tree of the plurality of ordered binary trees may be formed by a child node of a root node of the multitree data structure.

In some exemplary embodiments, the quantum circuit may be synthesized based on the ordered binary multitree. In some exemplary embodiments, the quantum circuit may be synthesized by interpreting non-leaf nodes of a binary tree within the ordered binary multitree as CX gates of the quantum program, interpreting leaf nodes of the binary tree as basis changes of the quantum program, and interpreting edges of the binary tree as a target or a control of a CX gate. In some exemplary embodiments, interpreting the edges may comprise interpreting an edge of the binary tree as the target of the CX gate or as the control of the CX gate based on whether the edge is associated with a first child node or with a second child node.

In some exemplary embodiments, the ordered binary multitree may represent a quantum circuit that implements the exponentiation module. In some exemplary embodiments, the ordered binary multitree may be created by thickening the multitree data structure, thereby affecting a number of cycles of a resulting quantum circuit. For example, the ordered binary multitree may comprise the plurality of leaf nodes of the multitree data structure, the plurality of root nodes of the multitree data structure, and at least one additional node.

In some cases, the disclosed subject matter may be represented by an exemplary recursive algorithm, e.g., in a generalized non-limiting form, as follows:

1. Create a stack of nodes and initialize the stack with all root nodes of the multitree in any order.
2. Iterate over the nodes in the stack:
   a. If the inspected node is already instantiated, pop the node out the stack and continue iterating.
   b. Scan child nodes of the node in the multitree data structure, to determine whether they are instantiated (have no child nodes or are leaf nodes).
      i. If at least one child node of the node is not instantiated, push such child node into the stack in any order and continue iterating;
      ii. In case the node has no children, instantiate the node by returning the node and continue iterating.
      iii. In case all child nodes of the node are instantiated, instantiate the node by creating an ordered collection comprising of all the child trees (e.g., a child node and its descendants). Each child tree constitute an ordered binary tree. The ordered collection is created by:
         i. If the ordered collection has only one element, e.g., a single child tree, output the child tree as the instantiation of the ordered collection;
         ii. Otherwise, if the ordered collection includes more than one element, perform the following:

1. Select the child tree that is ordered first according to the used key;
2. Remove the child tree from the ordered collection and add the child tree as a first child of a new CX-root node (This will correspond to a target or control of the corresponding CX gate).
3. Select one or more second child trees by order of key, such that the total width of the selected trees is lesser or equal to the width of the first child tree;
4. In case the one or more second child trees comprise a single child tree, move to Step 6.
5. Generate an auxiliary CX-tree from the one or more child trees recursively, by considering the one or more child trees as an auxiliary ordered collection, and applying Steps i and ii on the auxiliary ordered collection.
6. Remove the selected one or more child trees from the ordered collection and use the generated auxiliary CX-tree as the second child node of the CX-root node, thereby obtaining a new CX tree;
7. Add the new CX tree back to the ordered collection, and move to Step i.

Figure 13:
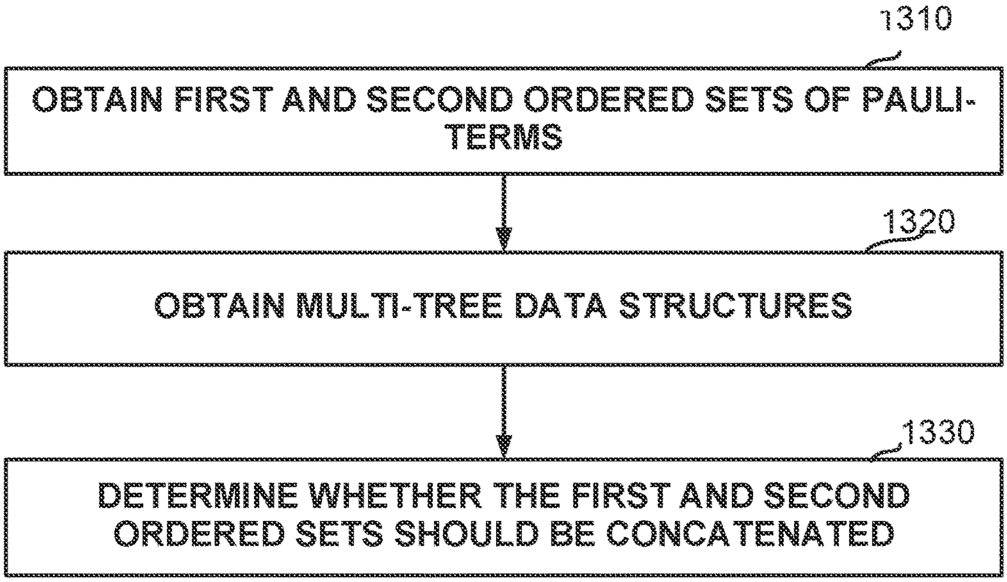

Referring now to FIG. 13, showing an exemplary flowchart diagram of a method, in accordance with some exemplary embodiments of the disclosed subject matter.

On Step 1310, first and second ordered sets of one or more Pauli-terms may be obtained. In some exemplary embodiments, it may be desired to schedule, or order, the first and second ordered sets. In some exemplary embodiments, the first and second ordered sets of Pauli-terms may belong to a plurality of Pauli-terms that are being ordered.

On Step 1320, two or more multitree data structures may be obtained, determined, generated, or the like. In some exemplary embodiments, the two or more multitree data structures may comprise first and second multitree data structures that implement, or represent, the first and second ordered sets of Pauli-terms, respectively. For example, the two or more multitree data structures may be generated according to the method of FIG. 11. As another example, the two or more multitree data structures may be obtained from a third party, e.g., a server, a cloud, a user interface, or the like.

In some exemplary embodiments, each multitree data structure that is created to represent, or implement, a set of Pauli-terms, may comprise a compliant multitree data structure. In some exemplary embodiments, the multitree data structure may comply with the exhaustiveness requirement, the succinecy requirement, the additional constraints, or the like. For example, the multitree data structure may comprise at least a set of root nodes representing the set of Pauli-terms, respectively, and a plurality of leaf nodes representing a plurality of active qubits associated with the set of Pauli-terms. In some exemplary embodiments, every leaf node that represents an active qubit of a Pauli-term may be a descendant of a root node that represents the Pauli-term. In some exemplary embodiments, every non-leaf node of the multitree data structure may form a connected tree that comprises all descendants of the non-leaf node.

On Step 1330, a determination as to whether or not the first and second ordered sets of Pauli-terms should be concatenated, may be performed. In some exemplary embodiments, in order to determine whether or not the first and second ordered sets of Pauli-terms should be concatenated, a third multitree data structure that represents all Pauli-terms of the first and second ordered sets may be generated, obtained, or the like. For example, the third multitree data structure may be generated from scratch based on the first and second ordered sets, e.g., according to the method of FIG. 11. As another example, the third multitree data structure may be generated by utilizing the first multitree data structure as a basis, and modifying the first multitree data structure according to the second ordered set of Pauli-terms, e.g., using the method of FIG. 11.

In some exemplary embodiments, a difference between a resource utilization score of the third multitree data structure and between resource utilization scores of the first and second multitree data structures may be determined, calculated, or the like. In some exemplary embodiments, a resource utilization score of a multitree data structure may be determined based on a number of CX gates in the multitree data structure, or based on any other weighted or non-weighted combination of resources utilized by the multitree data structure, e.g., cycles, qubits, other gate types, or the like.

Additionally or alternatively, a number of cycles that are estimated to be included in quantum circuits that correspond to each multitree data structure may be predicted, measured, or the like. According to this example, a resource utilization score of a multitree data structure may be determined based on a number of cycles in a respective quantum circuit, alone or in combination with the number of CX gates in the multitree data structure. For example, a weighted or non-weighted combination of the number of cycles and the number of CX gates may be combined in order to determine a calibrated or normalized resource utilization score.

In some exemplary embodiments, the difference between the resource utilization score of the third multitree data structure and between the resource utilization scores of the first and second multitree data structures may be calculated by subtracting a sum of the resource utilization scores of the first and second multitree data structures from the resource utilization score of the third multitree data structure, or vice versa.

In some exemplary embodiments, based on the difference between the resource utilization score of the third multitree data structure and between the resource utilization scores of the first and second multitree data structures, a determination may be made, determining whether or not the first and second ordered sets of Pauli-terms should be concatenated. For example, in case that an absolute value of the difference is greater than a threshold, the first and second ordered sets of Pauli-terms may be determined to be concatenated. As another example, in case that an absolute value of the difference is lesser than a threshold, the first and second ordered sets of Pauli-terms may be determined not to be concatenated.

In some cases, the disclosed subject matter may be represented by an exemplary algorithm, e.g., in a generalized non-limiting form, as follows:

3. Given a pair of ordered collections of Pauli-terms which are candidates for concatenation, construct two multitree data structures for the two ordered collections.
4. Perform one of the following operations:
   a. Construct, anew, a multitree data structure implementing both ordered collections.
   b. Generate a copy of one of the two existing multitree data structures (e.g., the larger one) and update the copy to implement the other ordered collection. Update the selected multitree data structure according to the algorithm of FIG. 11, starting with making all its interfaces eligible (e.g., in case they are inconsistent).

5. Assess a number of CX gates saved by this selection by comparing a CX count of the multitree data structure that implements both ordered collections to a sum of the CX counts of the separate multitree data structures. For example, a CX count of a multitree data structure may be calculated as follows:

$$\Sigma_{n \in N} 2(\text{child}(n)-1) \tag{2}$$

wherein n is a non-leaf node selected from a set of non-leaf nodes, N, and wherein child (n) is a number of child nodes of non-leaf node n.

In some exemplary embodiments, the method of FIG. 13 (referred to as 'the pair-based algorithm') may enable to determine, for two sets of one or more of Pauli-terms, whether or not they should be concatenated. In some exemplary embodiments, one or more algorithms, such as search algorithm, may utilize the pair-based algorithm in order to select an ordering for a plurality of Pauli-terms that may or may not be classified into sets.

In some exemplary embodiments, according to an exemplary method, a plurality of multitree data structures may be generated for the plurality of Pauli-terms, respectively. In other cases, multitree data structures may be generated for a subset of the plurality of Pauli-terms. In some cases, all pairs between the plurality of Pauli-terms may be sent to the pair-based algorithm, in one or more orders, e.g., randomly, according to a size of the Pauli-terms, or the like. In other cases, the pair-based algorithm may be applied on pairs of Pauli-terms that selected according to one or more criteria, such as a priority score. For example, highly ranked multitree data structures may be selected before lower ranked multitree data structures. In some exemplary embodiments, pair-based algorithm may be performed iteratively for first and second ordered sets from the candidate multitree data structures, e.g., the two top priority candidate multitree data structures.

For example, a priority of the Pauli-terms may be scored, such as based on a size thereof (e.g., increasing the score), a number of overlapping active qubits between two Pauli-terms (e.g., increasing the score), based on one or more properties of the plurality of multitree data structures, such as a size thereof, a number of nodes of each multitree data structure, or the like. For example, greater sized multitree data structures may score higher than smaller multitree data structures. As another example, in case multitree data structures have overlapping active qubits, e.g., a greatest number of overlapping active qubits compared to other pairs, their priority score, as a couple, may be increased. As another example, a priority score of a multitree data structure may be determined based on a number of child nodes of each non-leaf node in the multitree data structure. For example, the priority score of a Pauli-term associated with a multitree data structure may be calculated according to Equation 2. In other cases, any other technique may be used to score or select first and second multitree data structures from the plurality of multitree data structures.

In some exemplary embodiments, in case that applying the pair-based algorithm on the candidate multitree data structures results with a determination that the candidate multitree data structures should be concatenated, the plurality of multitree data structures may be modified to exclude the first and second multitree data structures, and instead include a third multitree data structure that implements the Pauli-terms of the first and second multitree data structures in a single multitree data structure. In some exemplary embodiments, the modified plurality of multitree data structures may be analyzed to further assign priorities to its members, select therefrom candidates, determine properties that assist in assigning priorities to respective Pauli-terms, or the like.

In some exemplary embodiments, the selection of candidate multitree data structures may be performed iteratively, until only one candidate multitree data structure remains. In some exemplary embodiments, each iteration may comprise assigning priority ranks to the candidate multitree data structures (e.g., or the respective Pauli-terms), selecting first and second candidate multitree data structures from the candidate multitree data structures, applying the pair-based algorithm, and determining whether or not to concatenate the first and second candidate multitree data structures to a third candidate multitree data structure based on a result from the pair-based algorithm.

Figure 14:
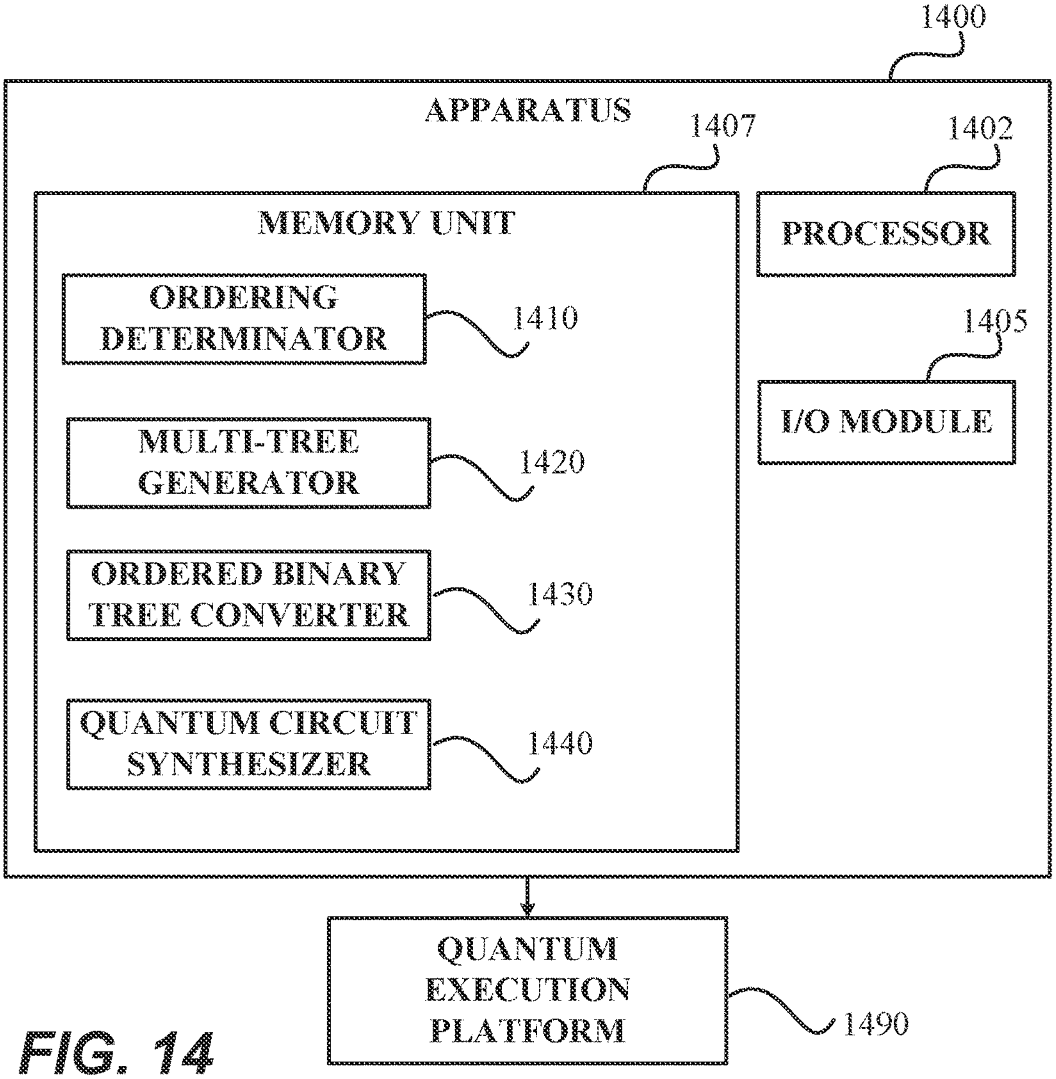
FIG. 14 depicts an exemplary block diagram of an apparatus, in accordance with some exemplary embodiments of the disclosed subject matter.

Referring now to FIG. 14 showing a block diagram of an apparatus, in accordance with some exemplary embodiments of the disclosed subject matter.

In some exemplary embodiments, Apparatus 1400 may comprise one or more Processor(s) 1402. Processor 1402 may be a Central Processing Unit (CPU), a microprocessor, an electronic circuit, an Integrated Circuit (IC) or the like. Processor 1402 may be utilized to perform computations required by Apparatus 1400 or any of its subcomponents. It is noted that Processor 1402 may be a traditional classical processor, and not necessarily a quantum processor.

In some exemplary embodiments of the disclosed subject matter, Apparatus 1400 may comprise an Input/Output (I/O) module 1405. I/O Module 1405 may be utilized to provide an output to and receive input from a user, an apparatus, or the like, such as, for example to obtain a user-defined accuracy requirement for quantum states, to obtain an indication of a quantum circuit, to obtain an indication of initial states for qubits of the quantum circuit, or the like.

In some exemplary embodiments, Apparatus 1400 may comprise Memory 1407. Memory 1407 may be a hard disk drive, a Flash disk, a Random Access Memory (RAM), a memory chip, or the like. In some exemplary embodiments, Memory 1407 may retain program code operative to cause Processor 1402 to perform acts associated with any of the subcomponents of Apparatus 1400. Memory 1407 may comprise one or more components as detailed below, implemented as executables, libraries, static libraries, functions, or any other executable components.

In some exemplary embodiments, Memory 1407 may comprise one or more components, such as an Ordering Determinator 1410, which may be configured to select an order between a set of Pauli-terms, e.g., according to the method of FIG. 13.

In some exemplary embodiments, Memory 1407 may comprise a Multi-Tree Generator 1420, which may be configured to generate a multitree data structure for the set of Pauli-terms, e.g., according to an order determined by Ordering Determinator 1410, according to an order obtained via I/O Module 1405, according to an order obtained from a server, or the like. For example, Multi-Tree Generator 1420 may generate the multitree data structure according to the method of FIG. 11.

In some exemplary embodiments, Memory 1407 may comprise an ordered Binary Tree Converter 1430, which may be configured to obtain a multitree data structure, such as the multitree data structure generated by Multi-Tree Generator 1420. In other cases, Binary Tree Converter 1430 may obtain a multitree data structure from any other source, e.g., I/O Module 1405, a server, a cloud, a different component of Apparatus 1400, or the like. In some exemplary embodiments, Binary Tree Converter 1430 may be configured to convert the multitree data structure to one or more corresponding ordered binary trees, e.g., according to the method of FIG. 12.

In some exemplary embodiments, Memory 1407 may comprise a Quantum Circuit Synthesizer 1440, which may be configured to synthesize a quantum circuit according to the ordered binary trees that were determined by Binary Tree Converter 1430. For example, Quantum Circuit Synthesizer 1440 may interpret each ordered binary tree as a CX tree. In some exemplary embodiments, Quantum Circuit Synthesizer 1440 may synthesize a quantum circuit similarly to FIGS. 9A-9B.

In some exemplary embodiments, the resulting modified circuit may be executed or simulated on a Quantum Execution Platform 1490.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:

obtaining a multitree data structure that represents a plurality of ordered Pauli-terms, the plurality of ordered Pauli-terms representing an exponentiation module, the plurality of ordered Pauli-terms are associated with a plurality of qubits, a Pauli-term of the plurality of ordered Pauli-terms defines at least one active qubit from the plurality of qubits, wherein implementing the Pauli-term in a quantum circuit requires to implement a basis change stage and a parity summation stage, the parity summation stage utilizing at least one Controlled-X (CX) gate to manipulate the at least one active qubit, wherein the multitree data structure comprises:

a plurality of root nodes representing the plurality of Pauli-terms, respectively;

a plurality of leaf nodes representing the plurality of qubits, respectively; and a non-leaf node representing a subset of active qubits of a parent node, the parent node is a parent of the non-leaf node, wherein every leaf node that represents an active qubit of a given Pauli- term is a descendant of a root node that represents the given Pauli-term, wherein every non-leaf node of the multitree data structure forms a connected tree that comprises all descendants of the non-leaf node;

converting the multitree data structure to an ordered binary multitree, the ordered binary multitree comprising the plurality of leaf nodes, the ordered binary multitree comprising the plurality of root nodes, the ordered binary multitree comprising the non-leaf node, the ordered binary multitree comprising at least one additional node, wherein said converting comprises replacing two sibling nodes with a single parent node and connecting the two sibling nodes as child nodes of the single parent node, wherein the at least one additional node comprises the single parent node, wherein every root node of the ordered binary multitree and its descendants define a respective ordered binary tree, whereby defining a plurality of ordered binary trees;

synthesizing, by a classical computer, the quantum circuit based on the plurality of ordered binary trees, said synthesizing comprising generating the quantum circuit in accordance with an ordered binary tree of the plurality of ordered binary trees, said synthesizing comprising:

placing, based on non-leaf nodes of the ordered binary tree, respective CX gates of in the quantum circuit, placing, based on leaf nodes of the ordered binary tree, respective basis-change operations in the quantum circuit, and determining, based on edges of the ordered binary tree, respective target qubits and control qubits of the CX gates, whereby the quantum circuit comprises an implementation of the parity summation stage, an implementation of an inverse parity-summation stage, and an implementation of the basis change stage, wherein the quantum circuit is synthesized to implement at least one cancellation of a first CX gate of the parity summation stage and a second CX gate of the inverse parity summation stage, the first CX gate and the second CX gate cancelling each other; and executing the quantum circuit on a quantum computer to implement the exponentiation module, said executing comprising applying the basis-change operations and the CX gates of the quantum circuit to respective qubits of the plurality of qubits.

2. The method of claim 1, wherein said synthesizing comprises interpreting the plurality of ordered binary trees as a plurality of respective representations of quantum circuits, and synthesizing the quantum circuit from the plurality of respective representations of the quantum circuits.

3. The method of claim 1, wherein every node of the multitree data structure complies with an exhaustiveness requirement requiring that no two nodes of the multitree data structure can share more than one child node.

4. The method of claim 1, wherein every node of the multitree data structure complies with a succinecy requirement requiring that no non-leaf node can have exactly one parent node.

5. The method of claim 1, wherein every node of the multitree data structure corresponds to a respective node in the ordered binary tree.

6. The method of claim 1, wherein said converting the multitree data structure to the ordered binary multitree comprises iteratively adding non-leaf nodes to the ordered binary multitree for every two nodes in the multitree data structure that share more than one child node.

7. The method of claim 1, wherein the Pauli-term defines the at least one active qubit by defining for the at least one active qubit a respective Pauli operator that is selected from the group consisting of X, Y and Z.

8. The method of claim 1, wherein a Pauli-term of the plurality of ordered Pauli-terms is defined using a parameter/ and at least one Pauli operator that is selected from a group consisting of X, Y and Z.

9. The method of claim 1, wherein a Pauli-term of the plurality of ordered Pauli-terms is represented by a parameter i and a string that defines for each qubit of the plurality of qubits a Pauli operator selected from the group consisting of X, Y, Z and l, wherein the string defines for at least one qubit a non-/Pauli-operator.

10. The method of claim 1, wherein said converting is performed by the classical computer.

11. An apparatus comprising a classical processor and coupled memory, said classical processor being adapted to:

obtain a multitree data structure that represents a plurality of ordered Pauli-terms, the plurality of ordered Pauli-terms representing an exponentiation module, the plurality of ordered Pauli-terms are associated with a plurality of qubits, a Pauli-term of the plurality of ordered Pauli-terms defines at least one active qubit from the plurality of qubits, wherein implementing the Pauli-term in a quantum circuit requires to implement a basis change stage and a parity summation stage, the parity summation stage utilizing at least one Controlled X (CX) gate to manipulate the at least one active qubit, wherein the multitree data structure comprises:

a plurality of root nodes representing the plurality of Pauli-terms, respectively;

a plurality of leaf nodes representing the plurality of qubits, respectively; and a non-leaf node representing a subset of active qubits of a parent node, the parent node is a parent of the non-leaf node, wherein every leaf node that represents an active qubit of a given Pauli- term is a descendant of a root node that represents the given Pauli-term, wherein every non-leaf node of the multitree data structure forms a connected tree that comprises all descendants of the non-leaf node;

convert the multitree data structure to an ordered binary multitree, the ordered binary multitree comprising the plurality of leaf nodes, the ordered binary multitree comprising the plurality of root nodes, the ordered binary multitree comprising the non-leaf node, the ordered binary multitree comprising at least one additional node, wherein said converting comprises replacing two sibling nodes with a single parent node and connecting the two sibling nodes as child nodes of the single parent node, wherein the at least one additional node comprises the single parent node, wherein every root node of the ordered binary multitree and its descendants define a respective ordered binary tree, whereby defining a plurality of ordered binary trees;

synthesize, by the classical processor, the quantum circuit based on the plurality of ordered binary trees, said synthesizing comprising generating the quantum circuit in accordance with an ordered binary tree of the plurality of ordered binary trees, said synthesize comprising:

placing, based on non-leaf nodes of the ordered binary tree, respective CX gates in the quantum circuit, placing, based on leaf nodes of the ordered binary tree, respective basis-change operations in the quantum circuit, and determining, based on edges of the ordered binary tree, respective target qubits and control qubits of the CX gates, whereby the quantum circuit comprises an implementation of the parity summation stage, an implementation of an inverse parity-sommation stage, and an implementation of the basis change stage, wherein the quantum circuit is synthesized to implement at least one cancellation of a first CX gate of the parity summation stage and a second CX gate of the inverse parity summation stage, the first CX gate and the second CX gate cancelling each other; and cause execution of the quantum circuit on a quantum computer to implement the exponentiation module, said execution comprising applying the basis-change operations and the CX gates of the quantum circuit to respective qubits of the plurality of qubits.

12. The apparatus of claim 11, wherein the plurality of ordered Pauli-terms are ordered according to a defined order.

13. A method comprising:

obtaining a multitree data structure that represents a plurality of Pauli-terms, the plurality of Pauli-terms represent an exponentiation module, wherein the plurality of Pauli-terms are associated with a plurality of qubits, the multitree data structure comprising:

a plurality of root nodes representing the plurality of Pauli-terms, respectively; and a plurality of leaf nodes representing the plurality of qubits, respectively, wherein every leaf node that represents a qubit of a Pauli-term is a descendant of a root node that represents the Paull-term, wherein every non-leaf node of the multitree data structure forms a connected tree that comprises all descendants of the non-leaf node;

converting the multitree data structure to an ordered binary multitree, wherein the ordered binary multitree represents a quantum circuit that implements the exponentiation module, the ordered binary multitree comprising the plurality of leaf nodes, the ordered binary multitree comprising the plurality of root nodes, the ordered binary multitree comprising at least one additional node, said converting comprising:

inserting representations of the plurality of root nodes of the multitree data structure to a stack in any order, thereby obtaining a stack with candidate nodes;

iterating over the candidate nodes to determine whether the candidate nodes have one or more child nodes in the multitree data structure that are not instantiated, wherein a given leaf node is instantiated;

upon identifying, during said iterating, a first candidate node that has at least one child node in the multitree data structure that is not instantiated, inserting representations of the at least one child node to the stack;

upon determining, during said iterating, that all child nodes of a second candidate node are instantiated, generating an ordered collection of child trees associated with the child nodes, respectively, the ordered collection is ordered according to scores of the child trees; and instantiating the ordered collection of the child trees at least by iteratively performing:

in case the child trees comprises a single tree, outputting the single tree; and in case the child trees comprises two or more trees, iteratively performing:

selecting a firat tree from the child trees, the first tree is ordered first in the ordered collection, the first tree having a largest score compared to remaining trees of the child trees;

removing the first tree from the ordered collection;

adding the first tree as a first child of a newly generated root node of a new binary trec;

selecting one or more second trees from the child trees, the one or more second trees are ordered subsequently to the first tree in the ordered collection, wherein a sum of widths of the one or more second trees is lesser or equal than a width of the first tree;

removing the one or more second trees from the ordered collection;

generating an auxiliary ordered binary tree from the one or more second trees, the auxillary ordered binary tree comprising a single ordered binary tree;

adding the auxiliary ordered binary tree as a second child of the newly generated root node of the new binary tree; and adding the new binary tree to the ordered collection;

synthesizing, by a classical computer, the quantum circuit based on the ordered binary multitree, said synthesizing comprising generating the quantum circuit by:

placing, based on non-leaf nodes of a binary tree within the ordered binary multitree, respective CX gates in the quantum circuit, placing, based on leaf nodes of the binary tree, respective basis-change operations in the quantum circuit, and determining, based on edges of the binary tree, respective target qubits and control qubits of the CX gates; and executing the quantum circuit on a quantum computer to implement the exponentiation module, said executing comprising applying the basis-change operations and the CX gates of the quantum circuit to respective qubits of the plurality of qubits.

14. The method of claim 13, wherein the ordered binary multitree comprises a plurality of ordered binary trees, the plurality of ordered binary trees comprising the new binary trec.

15. The method of claim 13, wherein a sorting algorithm is used for ordering the child trees according to the scores, wherein a width of a tree comprises a maximal width of a full binary tree that corresponda to the tree.

16. The method of claim 13, wherein a score of a tree is based on at least one of:

a maximal depth of paths of the tree, and an assigned weight of a leaf node in a path of the tree.

17. The method of claim 13, wherein said generating the auxiliary ordered binary tree comprises performing said instantiating the ordered collection with respect to the one or more second trees.

18. The method of claim 13, wherein in case the one or more second trees comprise a single second tree, said generating the auxiliary ordered binary tree comprises providing the single second tree.

19. The method of claim 13 further comprising, upon determining that a third. candidate node is instantiated, removing the third candidate node from the stack.

20. The method of claim 13, wherein said instantiating the ordered collection is performed until the stack is empty.

21. The method of claim 13, wherein said determining the target qubits and the control qubits comprises interpreting an edge of the binary tree as the target of a CX gate or as the control of the CX gate based on whether the edge is associated with a first child node or with a second child node.

* * * * *